United States Patent
Yeh

(10) Patent No.: US 10,649,566 B2
(45) Date of Patent: May 12, 2020

(54) IN-CELL TOUCH DISPLAY PANEL

(71) Applicants: HannStar Display (Nanjing) Corporation, Nanjing (CN); HannStar Display Corporation, Taipei (TW)

(72) Inventor: Cheng-Yen Yeh, Taichung (TW)

(73) Assignees: HannStar Display (Nanjing) Corporation, Nanjing (CN); HannStar Display Corporation, Taipei (TW)

(*) Notice: Subject to any disclaimer, the term of this patent is extended or adjusted under 35 U.S.C. 154(b) by 158 days.

(21) Appl. No.: 15/836,933

(22) Filed: Dec. 11, 2017

(65) Prior Publication Data

US 2018/0188867 A1   Jul. 5, 2018

(30) Foreign Application Priority Data

Dec. 29, 2016 (CN) .......................... 2016 1 1244094

(51) Int. Cl.
 *G06F 3/041* (2006.01)
 *G06F 3/047* (2006.01)
 *G06F 3/044* (2006.01)

(52) U.S. Cl.
 CPC ............ *G06F 3/0412* (2013.01); *G06F 3/047* (2013.01); *G06F 3/0416* (2013.01); *G06F 3/044* (2013.01)

(58) Field of Classification Search
 None
 See application file for complete search history.

(56) References Cited

U.S. PATENT DOCUMENTS

| | | | | |
|---|---|---|---|---|
| 10,423,258 B2* | 9/2019 | Huang | ................ | G02F 1/13338 |
| 2012/0249444 A1* | 10/2012 | Lee | ........................ | G06F 3/0412 |
| | | | | 345/173 |
| 2016/0062520 A1* | 3/2016 | Choi | ........................ | G09G 5/003 |
| | | | | 345/174 |
| 2016/0109993 A1* | 4/2016 | Hung | ..................... | G06F 3/0412 |
| | | | | 345/174 |
| 2016/0188061 A1* | 6/2016 | Cho | ........................ | G06F 3/0412 |
| | | | | 345/173 |
| 2017/0176798 A1* | 6/2017 | Ahn | ........................ | G02F 1/1345 |
| 2018/0181277 A1* | 6/2018 | Ahn | ........................ | G06F 3/0488 |

* cited by examiner

*Primary Examiner* — Kent W Chang
*Assistant Examiner* — Benjamin Morales
(74) *Attorney, Agent, or Firm* — CKC & Partners Co., LLC

(57) ABSTRACT

The in-cell touch display panel has a display area and a non-display area. Multiple pixel structures are disposed in the display area. Transparent conductive layers, metal layers, and first to fourth insulation layers are disposed in the pixel structures. The thickness of the third insulation layer is greater than or equal to that of the second insulation layer. The thickness of the third insulation layer is 1.2 or more times of that of the fourth insulation layer. The thickness of the third insulation layer is greater than or equal to 5000 Å. The sum of the thickness of the third insulation layer and the thickness of the fourth insulation layer is greater than or equal to 7000 Å.

22 Claims, 40 Drawing Sheets

IN-CELL TOUCH DISPLAY PANEL

RELATED APPLICATIONS

This application claims priority to China Application Serial Number 201611244094.2 filed Dec. 29, 2016, which is herein incorporated by reference.

BACKGROUND

Field of Invention

The present invention relates to a display and touch panel. More particularly, the present invention relates to an in-cell touch display panel with a narrow border.

Description of Related Art

A TDDI (Touch with Display Driver Integration) single chip is configured to connect all of data lines and touch sensing lines which are connected to touch electrodes, thereby enabling the single chip to control both functions of touch and display. However, the data lines and the touch sensing lines would concentrate toward the chip area in a non-display area, and thus are overlapped with each other. The signals transmitted on the data lines and the touch sensing lines may be interfered by each other, and therefore the functions of display and touch are both affected. It is an issue in the art that how to address the problems of overlapped trace routes and the interference between the data lines and the touch sensing lines in the non-display area.

SUMMARY

To solve the trace route problem, the invention provides an in-cell touch display panel, in which the conducting lines in the non-display are not overlapped with each other.

Embodiments of the invention provide an in-cell touch display panel having a display area and a non-display area, in which the in-cell touch display panel includes the following units. Multiple gate lines and multiple data lines are intersected with each other on a first substrate. Multiple touch sensing lines are disposed on the first substrate, in which the touch sensing lines are not spatially connected with the data lines in the display area. Multiple pixel regions are disposed in areas where the gate lines are intersected with the data lines in the display area, in which each of the pixel regions has a pixel structure, each of the pixel structures includes a pixel electrode formed by a first transparent conductive layer. A common electrode is formed by a patterned second transparent conductive layer, in which the common electrode includes multiple touch electrodes in the display area, each of the touch electrodes corresponds to more than one of the pixel electrodes, each of the pixel electrodes corresponds to a sub-common electrode which is a portion of the touch electrode, and each of the touch electrodes is electrically connected to at least one of the touch sensing lines. A thin film transistor is disposed in one of the pixel structures, in which the thin film transistor includes a gate, a source, a drain and a semiconductor layer, the source is electrically connected to one of the data lines, and one of the pixel electrodes is electrically connected to the drain. Multiple display pads and multiple touch pads are disposed in the non-display area. A liquid crystal layer is disposed between the first substrate and a second substrate. A first insulation layer is disposed between the gate and the semiconductor layer. A second insulation layer is disposed on the first insulation layer. A third insulation layer is disposed on the second insulation layer. A fourth insulation layer is disposed on the third insulation layer. The sub-common electrodes are disposed on one of the third insulation layer and fourth insulation layer. The thickness of the third insulation layer is greater than or equal to the thickness of the second insulation layer. The thickness of the third insulation layer is 1.2 or more times of the thickness of the fourth insulation layer. The thickness of the third insulation layer is greater than or equal to 5000 Å. The sum of the thickness of the third insulation layer and the thickness of the fourth insulation layer is greater than or equal to 7000 Å.

In some embodiments, each of the data lines is electrically connected to one of the display pads. Each of the touch lines is electrically connected to one of the touch pads. The non-display area includes a signal line transferring area and a fan-out area, in which the signal line transferring area is located between the display area and the fan-out area, and the touch pads and the display pads are disposed in the fan-out area. One of the display pads is disposed between two of the touch pads, and one of the touch pads is disposed between two of the display pads.

In some embodiments, the number of the touch pads is less than the number of the display pads, the display pads and the touch pads are arranged as multiple rows, and one of the rows consists of a portion of the touch pads.

In some embodiments, the display pads are disposed between the touch pads and the display area.

In some embodiments, the touch pads are disposed between the display pads and the display area.

In some embodiments, the number of the touch pads is less than a number of the display pads. The display pads and the touch pads are arranged as multiple rows, a first row of the rows consists of a portion of the display pads, and a second row of the rows includes a portion of the display pads and a portion of the touch pads.

In some embodiments, the in-cell touch display panel further includes a driving circuit disposed in the non-display area and being electrically connected to the display pads and the touch pads. In a display period, the driving circuit transmits pixel data to one of the pixel electrodes through one of the data lines and the thin film transistor. In the touch sensing period, the driving circuit generates a touch sensing signal according to a voltage variation of the touch electrode.

In some embodiments, a first metal layer is disposed on the first substrate, in which the first metal layer includes a gate. A first insulation layer is disposed on the first metal layer, and a semiconductor layer is disposed on the first insulation layer. A second metal layer disposed on the semiconductor layer, in which the second metal layer includes a source and a drain. A second insulation layer is disposed on the second metal layer, and the second insulation layer has a first contact hole to expose the drain. A third insulation layer is disposed on the second insulation layer, and the third insulation layer has a second contact hole corresponding to the first contact hole. The pixel electrodes are disposed on the third insulation layer, and one of the pixel electrodes is electrically connected to the drain through the second contact hole and the first contact hole. A third metal layer is disposed on the third insulation layer, in which the third metal layer includes the touch sensing lines. A fourth insulation layer is disposed on the third metal layer, and the fourth insulation layer has a third contact hole to expose the touch sensing lines. The sub-common electrodes are disposed on the fourth insulation layer, and one of the sub-common electrodes is electrically connected to one of the touch sensing lines through the third contact hole.

In some embodiments, a first metal layer is disposed on the first substrate, in which the first metal layer includes a gate. A first insulation layer is disposed on the first metal layer, and a semiconductor layer is disposed on the first insulation layer. A second metal layer is disposed on the semiconductor layer, the second metal layer includes a source and a drain. A second insulation layer is disposed on the second metal layer, and the second insulation layer has a first contact hole to expose the drain. A third metal layer is disposed on the second insulation layer, in which the touch sensing lines are formed by the third metal layer in the display area. A third insulation layer is disposed on the third metal layer, the third insulation layer has a second contact hole to expose the touch sensing lines, and the third insulation layer has a third contact hole corresponding to the first contact hole. The sub-common electrodes are disposed on the third insulation layer, one of the sub-common electrodes is electrically connected to one of the touch sensing lines through the second contact hole. A fourth insulation layer is disposed on the sub-common electrodes, and the fourth insulation layer has a fourth contact hole corresponding to the third contact hole. The pixel electrodes are disposed on the fourth insulation layer, one of the pixel electrodes is electrically connected to the drain through the fourth contact hole, the third contact hole and the first contact hole.

In some embodiments, a first metal layer is disposed on the first substrate, in which the first metal layer includes a gate. A first insulation layer is disposed on the first metal layer, and a semiconductor layer is disposed on the first insulation layer. A second metal layer is disposed on the semiconductor layer, in which the second metal layer includes a source and a drain. A second insulation layer is disposed on the second metal layer, and the second insulation layer has a first contact hole to expose the drain. A third insulation layer is disposed on the second insulation layer, the third insulation layer has a second contact hole corresponding to the first contact hole. The pixel electrodes are disposed on the third insulation layer, one of the pixel electrodes is electrically connected to the drain through the second contact hole and the first contact hole. A third metal layer disposed on the third insulation layer, in which the touch sensing lines are formed by the third metal layer in the display area. A fourth insulation layer is disposed on the third metal layer, and the fourth insulation layer has a third contact hole to expose the touch sensing lines. The sub-common electrodes are disposed on the fourth insulation layer, one of the sub-common electrodes is electrically connected to one of the touch sensing lines through the third contact hole, and one of the touch sensing lines is at least partially overlapped with one of the data lines along a normal vector of the in-cell touch display panel.

In some embodiments, a first metal layer is disposed on the first substrate, in which the first metal layer includes a gate. A first insulation layer is disposed on the first metal layer, and a semiconductor layer is disposed on the first insulation layer. A second metal layer is disposed on the semiconductor layer, in which the second metal layer includes a source and a drain. A second insulation layer is disposed on the second metal layer, and the second insulation layer has a first contact hole to expose the drain. A third insulation layer is disposed on the second insulation layer, the third insulation layer has a second contact hole corresponding to the first contact hole, and the sub-common electrodes are disposed on the third insulation layer. A fourth insulation layer is disposed on the sub-common electrodes and has a third contact hole and fourth contact hole, the third contact hole corresponds to the second contact hole, and the fourth contact hole exposes one of the sub-common electrodes. A third metal layer is disposed on the fourth insulation layer, in which the touch sensing lines are formed by the third metal layer in the display area, and one of the touch sensing lines is electrically connected to one of the sub-common electrodes through the fourth contact hole. A first transparent conductive layer includes the pixel electrodes and a touch sensing line protection layer, and disposed on the fourth insulation layer, in which one of the pixel electrodes is electrically connected to the drain through the third contact hole, the second contact hole and the first contact hole. The touch sensing line protection layer covers one of the touch sensing lines, and the one of the touch sensing lines is at least partially overlapped with one of the data lines along a normal vector of the in-cell touch display panel.

In some embodiments, a semiconductor layer is disposed on the first substrate, in which the semiconductor layer includes a source, a first lightly doped region, a channel region of a thin film transistor, a second lightly doped region, and a drain, in which the channel region is disposed between the first lightly doped region and the second lightly doped region. A first insulation layer is disposed on the semiconductor layer, in which the first insulation layer has a first contact hole to expose the source, and a second contact hole to expose the drain. A first metal layer is disposed on the first insulation layer, in which the first metal layer includes a gate. A second insulation layer is disposed on the first metal layer, and the second insulation layer has a third contact hole corresponding to the first contact hole and a fourth contact hole corresponding to the second contact hole and the pixel electrodes are disposed on the second insulation layer. A second metal layer is disposed on the second insulation layer, in which the data lines are formed by the second metal layer in the display area, one of the data lines is electrically connected to the source through the third contact hole and the first contact hole, in which the second metal layer includes a filling structure which is electrically connected to one of the pixel electrodes and is electrically connected to the drain through the fourth contact hole and the second contact hole, and a third insulation layer is formed on the second metal layer. A third metal layer is disposed on the third insulation layer, in which the touch sensing lines are formed by the third metal layer in the display area. A fourth insulation layer is disposed on the third metal layer, and the fourth insulation layer has a fifth contact hole to expose one of the touch sensing lines. The sub-common electrodes are disposed on the fourth insulation layer, and one of the sub-common electrodes is electrically connected to one of the touch sensing lines through the fifth contact hole, in which one of the touch sensing lines is at least partially overlapped with one of the data lines along a normal vector of the in-cell touch display panel.

In some embodiments, a semiconductor layer is disposed on the first substrate, in which the semiconductor layer includes a source, a first lightly doped region, a channel region of a thin film transistor, a second lightly doped region, and a drain, in which the channel region is disposed between the first lightly doped region and the second lightly doped region. A first insulation layer is disposed on the semiconductor layer, in which the first insulation layer has a first contact hole to expose the source and a second contact hole to expose the drain. A first metal layer is disposed on the first insulation layer, in which the first metal layer includes a gate. A second insulation layer is disposed on the first metal layer, and the second insulation layer has a third contact hole corresponding to the first contact hole, and a fourth contact hole corresponding to the second contact hole. A second metal layer is disposed on the second insulation layer, in which the data lines are formed by the second metal layer in the display area, one of the data lines is electrically connected to the source through the third contact hole and the first contact hole, in which the second metal layer includes a filling structure which is electrically connected to the drain through the fourth contact hole and the second contact hole. A third insulation layer is disposed on the second metal layer, the third insulation layer has a fifth contact hole to expose the filling structure, in which the sub-common electrodes are disposed on the third insulation layer. A fourth insulation layer is disposed on the sub-common electrodes, and the fourth insulation layer has a sixth contact hole corresponding to the fifth contact hole and a seventh contact hole to expose one of the sub-common electrodes. A third metal layer is disposed on the third insulation layer, in which the touch sensing lines are formed by the third metal layer in the display area, one of the touch sensing lines is electrically connected to one of the sub-common electrodes through the seventh contact hole. A first transparent conductive layer includes the pixel electrodes and a touch sensing line protection layer, the pixel electrodes are disposed on the fourth insulation layer, and one of the pixel electrodes is electrically connected to the filling structure through the sixth contact hole and the fifth contact hole. The touch sensing line protection layer covers the touch sensing lines, and one of the touch sensing lines is at least partially overlapped with one of the data lines along a normal vector of the in-cell touch display panel.

In some embodiments, a first metal layer is disposed on the first insulation layer, in which the first metal layer includes a gate. A first insulation layer is disposed on the first metal layer. A semiconductor layer is disposed on the first insulation layer, and the semiconductor layer is metal oxide including indium, gallium and zinc. A second insulation layer is disposed on the semiconductor layer, the second insulation layer has a first contact hole and a second contact hole to expose the semiconductor layer, and the pixel electrodes are disposed on the second insulation layer. A second metal layer is disposed on the second insulation layer to form a source, a drain and the data lines, in which the source and the drain are electrically connected to the second contact hole through the first contact hole and the semiconductor layer respectively, in which the drain is electrically connected to one of the pixel electrodes, and a third insulation layer is disposed on the second metal layer. A third metal layer is disposed on the third insulation layer, in which the touch sensing lines are formed by the third metal layer in the display area, a fourth insulation layer is disposed on the third metal layer, and the fourth insulation layer has a third contact hole to expose one of the touch sensing lines. The sub-common electrodes are disposed on the fourth insulation layer, one of the sub-common electrodes is electrically connected to one of the touch sensing lines through the third contact hole, and one of the touch sensing lines is at least partially overlapped with one of the data lines along a normal vector of the in-cell touch display panel.

In some embodiments, a first metal layer is disposed on the first substrate, in which the first metal layer includes a gate. A first insulation layer is disposed on the first metal layer, a semiconductor layer is disposed on the first insulation layer, and the semiconductor layer is metal oxide including indium, gallium and zinc, in which a second insulation layer is disposed on the semiconductor layer, and the second insulation layer has a first contact hole and a second contact hole to expose the semiconductor layer. A second metal layer is disposed on the second insulation layer to form a source, a drain and the touch sensing lines, in which the source and the drain are electrically connected to the semiconductor layer through the first contact hole and the second contact hole respectively. A third insulation layer is disposed on the second metal layer and has third contact hole to expose one of the touch sensing lines and a fourth contact hole to expose the drain. The pixel electrodes are disposed on the third insulation layer, one of the pixel electrodes is electrically connected to the drain through the fourth contact hole. A fourth insulation layer is disposed on the pixel electrodes, and the fourth insulation layer has a fifth contact hole corresponding to the third contact hole to expose one of the touch sensing lines. The sub-common electrodes are disposed on the fourth insulation layer, in which one of the touch sensing lines is electrically connected to one of the sub-common electrodes through the fifth contact hole and the third contact hole.

In some embodiments, one of the touch sensing lines includes a first portion and a second portion, the first portion is formed by a first metal layer, the second portion is formed by a third metal layer, and the in-cell touch display panel further includes a connection structure disposed in the signal line transferring area and being electrically connected to the first portion and the second portion. The connection structure includes: the first portion disposed on the first substrate; a first insulation layer having a first contact hole to expose the first portion; a second insulation layer having a second contact hole corresponding to the first contact hole; the second portion disposed on the second insulation layer; a fourth insulation layer having a third contact hole and a fourth contact hole, in which a third contact hole corresponds to the second contact hole, and a fourth contact hole exposes the second portion; and a second transparent conductive layer being electrically connected to the second portion through the fourth contact hole, and being electrically connected to the first portion through the first contact hole, the second contact hole, and the third contact hole.

In some embodiments, one of the touch sensing lines includes a first portion and a second portion, the first portion is formed by a first metal layer, the second portion is formed by a third metal layer, and the in-cell touch display panel further includes a connection structure disposed in the signal line transferring area and being electrically connected to the first portion and the second portion. The connection structure includes: the first portion disposed on the first substrate; a first insulation layer disposed on a first metal layer and having a first contact hole to expose the first portion; a metal electrode formed by a second metal layer, and being electrically connected to the first portion through a first contact hole; a second insulation layer disposed on the second metal layer, and having a second contact hole to expose the first portion; the second portion being electrically connected to the first portion through the second contact hole; a third insulation layer having a third contact hole to expose the second portion; and an electric connecting portion formed by a second transparent conductive layer and being electrically connected to the second portion through the third contact hole.

In some embodiments, one of the touch sensing lines includes a first portion and a second portion, the first portion is formed by a second metal layer, the second portion is formed by a third metal layer, and the in-cell touch display panel further includes a connection structure disposed in the signal line transferring area and being electrically connected to the first portion and the second portion. The connection structure includes: a first insulation layer disposed on the first substrate; the first portion disposed on the first insulation layer; a second insulation layer disposed on the first portion and having a first contact hole to expose the first portion; the second portion disposed on a second insulation layer; a fourth insulation layer having a second contact hole and a third contact hole, in which the second contact hole corresponds to the first contact hole, and the third contact hole exposes the second portion; and a second transparent conductive layer being electrically connected to the second portion through the third contact hole, and being electrically connected to the first portion through the first contact hole and the second contact hole.

In some embodiments, one of the touch sensing lines includes a first portion and a second portion, the first portion is formed by a second metal layer, the second portion is formed by a third metal layer, and the in-cell touch display panel further includes a connection structure disposed in the signal line transferring area and being electrically connected to the first portion and the second portion. The connection structure includes: a first insulation layer disposed on the first substrate; the first portion disposed on the first insulation layer; a second insulation layer disposed on the first portion and having a first contact hole to expose the first portion; the second portion disposed on the second insulation layer and being electrically connected to the first portion through the first contact hole; a fourth insulation layer having a second contact hole to expose the second portion; and a second transparent conductive layer being electrically connected to the second portion through the second contact hole.

In some embodiments, one of the touch sensing lines includes a first portion and a second portion, the first portion and the second portion are formed by a third metal layer, and the in-cell touch display panel further includes a connection structure disposed in the signal line transferring area and being electrically connected to the first portion and the second portion. The connection structure includes: a first insulation layer disposed on the first substrate; a second insulation layer disposed on the first insulation layer; the first portion and the second portion disposed on the second insulation layer; a fourth insulation layer disposed on the second insulation layer and having a first contact hole to expose the first portion and a second contact hole to expose the second portion; and a second transparent conductive layer being electrically connected to the first portion through the first contact hole, and being electrically connected to the second portion through the second contact hole.

In some embodiments, one of the touch sensing lines includes a first portion and a second portion, the first portion and the second portion are formed by a second metal layer, and the in-cell touch display panel further includes a connection structure disposed in the signal line transferring area and being electrically connected to the first portion and the second portion. The connection structure includes: a first insulation layer disposed on the first substrate; the first portion and the second portion disposed on the first insulation layer; a second insulation layer disposed on the first insulation layer, and having a first contact hole to expose the first portion and a second contact hole to expose the second portion; and a first transparent conductive layer being electrically connected to the first portion through the first contact hole, and being electrically connected to the second portion through the second contact hole.

In some embodiments, one of the touch sensing lines includes a first portion and a second portion, the first portion is formed by a first metal layer, the second portion is formed by a second metal layer, and the in-cell touch display panel further includes a connection structure disposed in the signal line transferring area and being electrically connected to the first portion and the second portion. The connection structure includes: a first insulation layer disposed on the first substrate; the first portion disposed on the first insulation layer; a second insulation layer disposed on the first portion, and having a first contact hole to expose the first portion; the second portion disposed on the second insulation layer; a third insulation layer having a second contact hole and a third contact hole, in which the second contact hole corresponds to the first contact hole, and the third contact hole exposes the second portion; and a first transparent conductive layer being electrically connected to the second portion through the third contact hole, and being electrically connected to the first portion through the first contact hole and the second contact hole.

In some embodiments, one of the data lines are parallel with one of the touch sensing lines in the display area, and are not overlapped with each other in the fan-out area.

In some embodiments, one of the data lines and one of the touch sensing lines are overlapped with each other in the display area along a normal vector of the in-cell touch display panel. The data lines and the touch sensing lines are formed by different metal layers in the display area.

In some embodiments, at least two of the touch sensing lines are electrically connected to each other and are electrically connected to one of the touch pads through a conducting line in the fan-out area.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology but are not referred to particular order or sequence.

Figure 1:
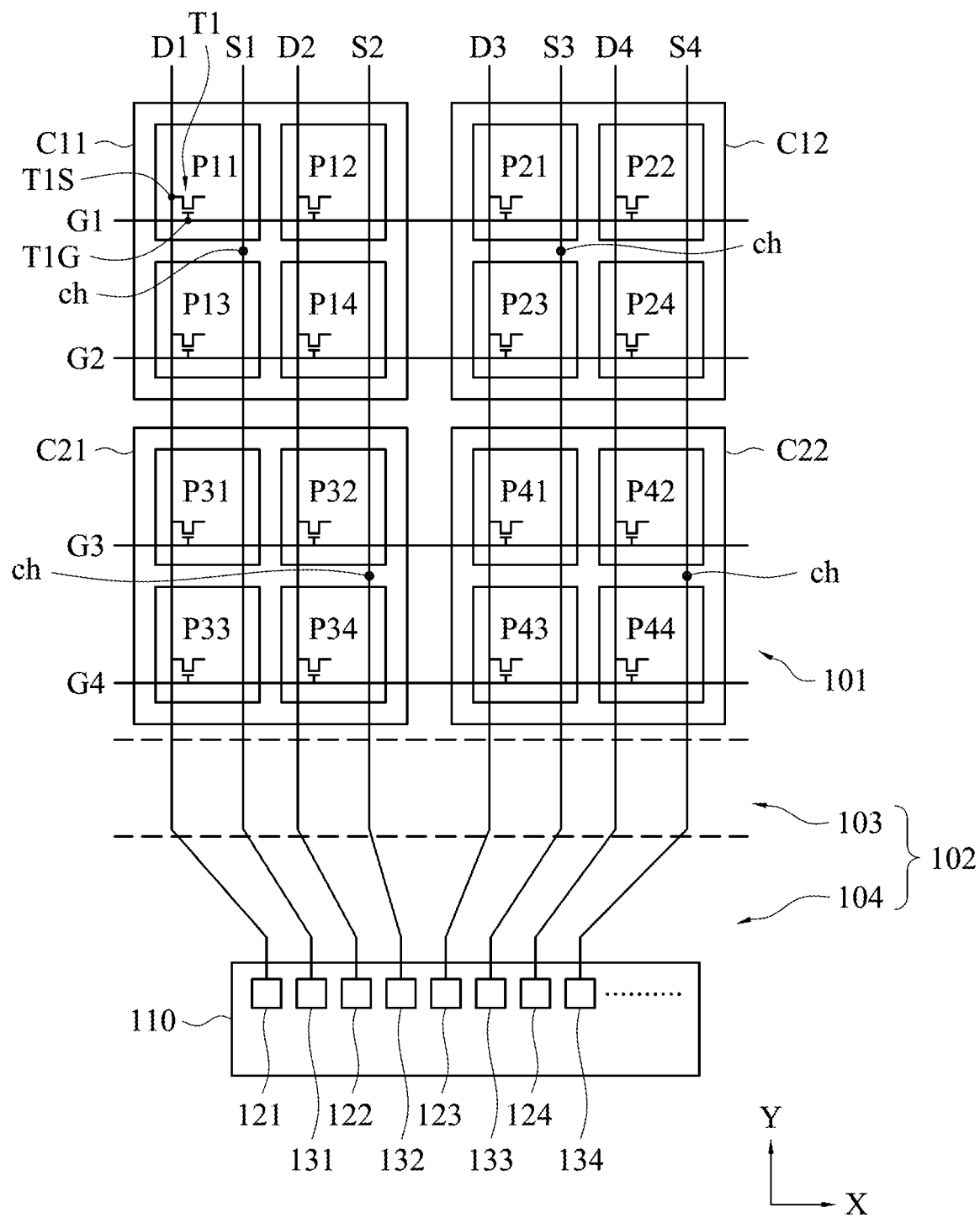
FIG. 1 is a schematic diagram illustrating connections of data lines and touch sensing lines in an in-cell touch display panel in accordance with an embodiment.

FIG. 1 is a schematic diagram illustrating connections of data lines and touch sensing lines in an in-cell touch display panel in accordance with an embodiment. Referring to FIG. 1, in an in-cell touch display panel 100, electrodes for detecting touch are disposed in pixel structures on a thin film transistor (TFT) substrate.

The in-cell touch display panel 100 has a display area 101 and a non-display area 102. The non-display area 102 includes a signal line transferring area 103 and a fan-out area 104. The display area 101 is described first. The display area 101 includes multiple pixel regions which are formed in area where the gate lines are intersected with the data lines. Each pixel region has a pixel structure. To be specific, the display area 101 includes: pixel structures P11-P14, P21-P24, P31-P34 and P41-P44; gate lines G1-G4 extending along an X direction (also referred to a first direction); data lines D1-D4 extending along a Y direction (also referred to a second direction), in which the data lines D1-D4 are not connected to each other spatially; and touch sensing lines S1-S4 extending along the Y direction. The data lines D1-D4 are intersected with the gate lines G1-G4 on the first substrate, and a pixel structure is disposed in one of the intersection areas. Each pixel structure includes a thin film transistor (TFT). Each of the data lines D1-D4 is electrically connected to the source of the TFT in the corresponding pixel structure, and each of the gate lines G1-G4 is electrically connected to the gate of the TFT in the corresponding pixel structure. For example, the pixel structure P11 includes a TFT T1 which has a gate T1G and a source T1S. The gate line G1 is electrically connected to the gate T1G, and the data line D1 is electrically connected to the source T1S. The display panel also includes a common electrode which is patterned to form touch electrodes C11, C12, C21 and C22 in the display area 101. Each touch electrode corresponds to multiple pixel electrodes and is electrically connected to at least one touch sensing line through a contact hole. For example, the pixel structures P11-P14 correspond to the touch electrode C11 which is electrically connected to the touch sensing line S1; the pixel structures P21-P24 correspond to the touch electrode C12 which is electrically connected to the touch sensing line S3; the pixel structures P31-P34 corresponds to the touch electrode C21 which is electrically connected to the touch sensing line S2; and the pixel structures P44-P44 corresponds to the touch electrode C22 which is electrically connected to the touch sensing line S4.

A period of a frame is at least divided into one or more display periods and one or more touch sensing periods. During the display period, a common voltage is applied to the touch electrodes C11, C12, C21, and C22, and the voltage on the gate lines G1-G4 are configured to turn on the TFTs in the corresponding pixel structures sequentially, and the driving circuit 110 transmits pixel data to the pixel electrodes in the corresponding pixel structures through the data lines D1-D4 in order to set grey levels of pixels. During the touch sensing period, the touch electrodes C11, C12, C21, and C22 are taken for detecting touch operations performed on the in-cell touch display panel 100, and the driving circuit 110 generates a touch sensing signal according to the voltage variation on the touch electrodes C11, C12, C21, and C22.

The signal line transferring area 103 is located between the display area 101 and the fan-out area 104. In the signal line transferring area 103, the data lines D1-D4 and the touch sensing lines S1-S4 may be transferred to other metal layers. For example, the touch sensing lines S1-S4 are in a third or second metal in the display area 101, but are transferred to a first metal layer in the fan-out area 104. Multiple connection structures are disposed in the signal line transferring area 103 for transferring the touch sensing lines S1-S4 from the third or second metal layer to the first metal layer. The embodiment of the connection structure would be described in detail below. In addition, a protection circuit and a transparent or opaque conductive layer may be disposed in the signal line transferring area 103 to prevent the in-cell touch display panel 100 from damage by static discharge. In some embodiments, the width of the signal line transferring area 103 is essentially equal to width of half pixel to one pixel, which is not limited in the invention.

A driving circuit 110 is disposed in the non-display area 102 on the in-cell touch display panel 100. The driving circuit 110 is electrically connected to display pads 121-124 and touch pads 131-134 which are disposed on the in-cell touch display panel 100. The display pads 121-124 are electrically connected to the data lines D1-D4 respectively and the touch pads 131-134 are electrically connected to the touch sensing lines S1-S4 respectively. In particular, along the X direction, one of the display pads is disposed between two of the touch pads, and one of the touch pads is disposed between two of the display pads. For example, the display pad 122 is disposed between the touch pad 131 and the touch pad 132, and the touch pad 131 is disposed between the display pad 121 and the display pad 122. In the embodiment of FIG. 1, the display pads 121-124 and the touch pads 131-134 are disposed in an interleaved way. In prior art (not shown), the display pads and the touch pads are arranged in a same row, and the display pads are continuously disposed, and then the touch pads are continuously disposed next to the display pad. Thus, the data lines D1-D4 would be overlapped with the touch sensing lines S1-S4 in the non-display area 102. However, as shown in FIG. 1, the data lines D1-D4 are parallel with the touch sensing lines S1-S4 in the display area 101, and they do not overlap with each other in the non-display area 102 because the display pads 121-124 and the touch pads 131-134 are disposed in the interleaved way.

In some embodiments, the driving circuit 110 is disposed on a flexible circuit board such as a Tape Carrier Package (TCP) or a Chip on Film (COF). Alternatively, the driving circuit 110 may be disposed on the thin film transistor substrate. In addition, the driving circuit 110 may be a Touch and Display Driver Integration (TDDI) single chip providing display and touch functions simultaneously. Or, the driving circuit 110 may include multiple chips which provide display function and touch function respectively. The driving circuit 110 may be a Gate-Driver In Plane (GIP) or an Integrated Gate Driver (IGD). Moreover, the number of the driving circuit 110 may be greater than one that are disposed at two sides (e.g. upper side and lower side, or left-hand side and right-hand side) of the panel or disposed just one side of the panel.

Figure 2:
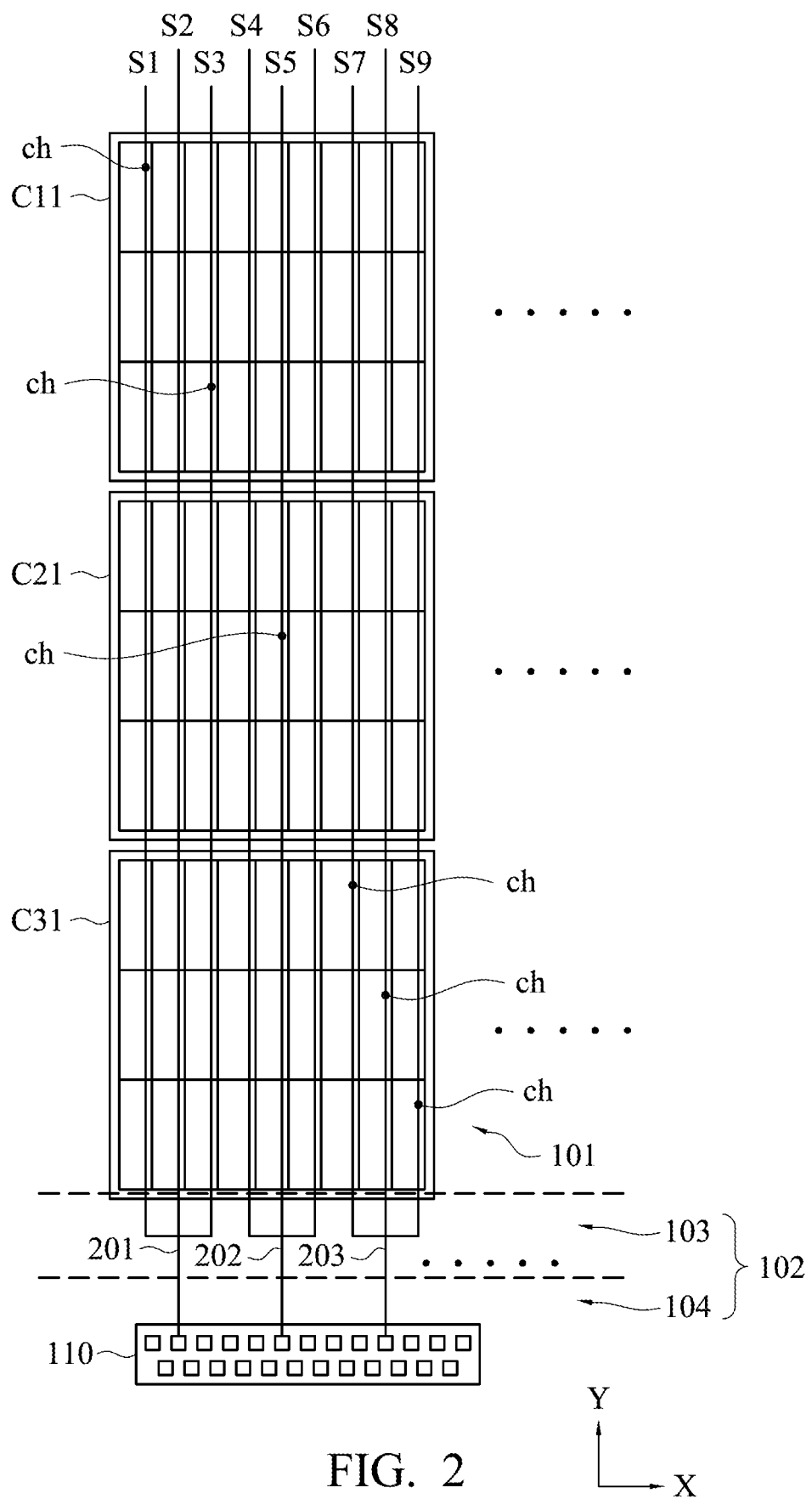
FIG. 2 is a schematic diagram illustrating connection between the touch sensing lines and the driving circuit in accordance with an embodiment.

Every four pixel structures share one touch electrode In FIG. 1, but more or less pixel structures may share one common electrode in other embodiments. In addition, the number of the data lines D1-D4 is equal to the number of the touch sensing lines S1-S4 in FIG. 1, but in practice, every pixel structure (also referred to sub-pixel) generally renders a single color, and a pixel is composed of three sub-pixels which are generally arranged along the X direction. Therefore, the resolution of the pixel structures along the X direction is greater than the resolution of that along the Y direction. In some embodiments, at least two of the touch sensing lines are connected to each other and then is electrically connected to one touch pad though a conductive line. For example, referring to FIG. 2, FIG. 2 is a schematic diagram illustrating connection between the touch sensing lines and the driving circuit in accordance with an embodiment. For simplification, conductive lines such as the data lines and the gate lines are not shown in FIG. 2. In the embodiment of FIG. 2, each of the touch electrodes C11, C21, and C31 includes 27 pixel structures arranged as 3 rows and 9 columns. At least one of the touch sensing lines S1-S3 is electrically connected to the touch electrode C11 through a contact hole ch, and the touch sensing lines S1-S3 are connected to each other in the signal line transferring area 103, and then is electrically connected to one touch pad through a conductive line 201. At least one of the touch sensing lines S4-S6 is electrically connected to the touch electrode C21 through the contact hole ch, and the touch sensing lines S4-S6 are connected to each other in the signal line transferring area 103, and then they are electrically connected to one touch pad through a conductive line 202. At least one of the touch sensing lines S7-S9 is electrically connected to the touch electrode C31 through the contact hole ch, and the touch sensing lines S7-S9 are connected to each other in the signal line transferring area 103, and then they are electrically connected to one touch pad through a conductive line 203. In the embodiment of FIG. 2, two of the touch sensing lines S1-S3 are electrically connected to the touch electrode C11 through two contact holes ch, one of the touch sensing lines S4-S6 is electrically connected to the touch electrode C21 through one contact hole ch, and three of the touch sensing lines S7-S9 are electrically connected to the touch electrode C31 through three contact holes ch. The number of touch sensing lines that each touch electrode is electrically connected to is not limited in the invention. For example, if there are five touch sensing lines passing through one touch electrode, then the touch electrode may be electrically connected to any number (ex. 1~5) of the five touch sensing lines.

In addition, each pixel structure has at least a data line, and each data line is connected to one display pad. In other words, the number of the display pads is more than the number of touch pads. In the embodiment of FIG. 2, one touch pad is disposed between every three display pads, and thus the touch sensing lines and the data lines are not overlapped with each other in the non-display area 102.

FIG. 3A to FIG. 3G is a schematic diagram illustrating disposition of display pads and touch pads in accordance with some embodiments. For simplification, the data lines and the touch sensing lines respectively connected to display pads DP and touch pads TP are not shown in FIG. 3A to FIG. 3G.

Figure 3A:
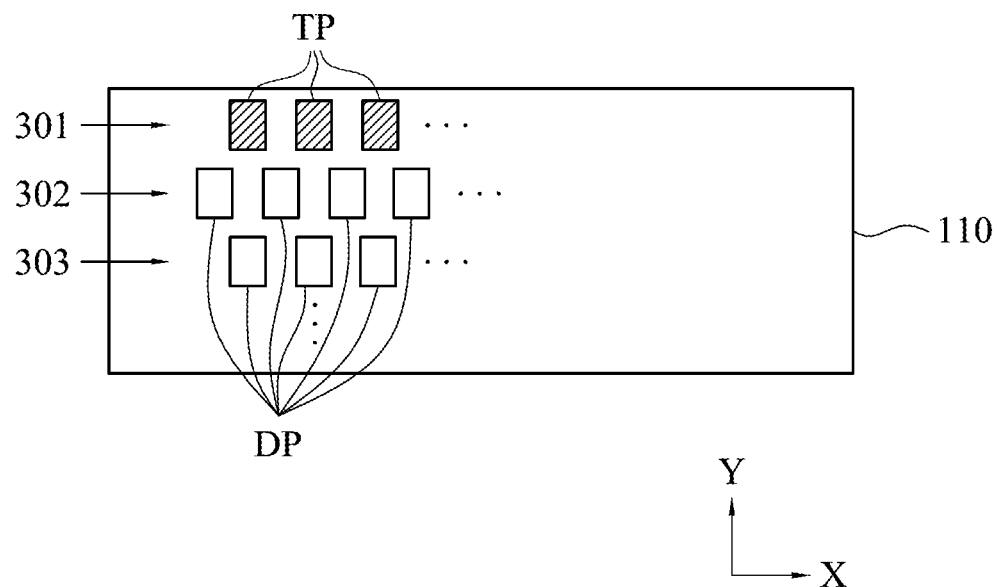
FIG. 3A to FIG. 3G is a schematic diagram illustrating disposition of display pads and touch pads in accordance with some embodiments.
Figure 3B:
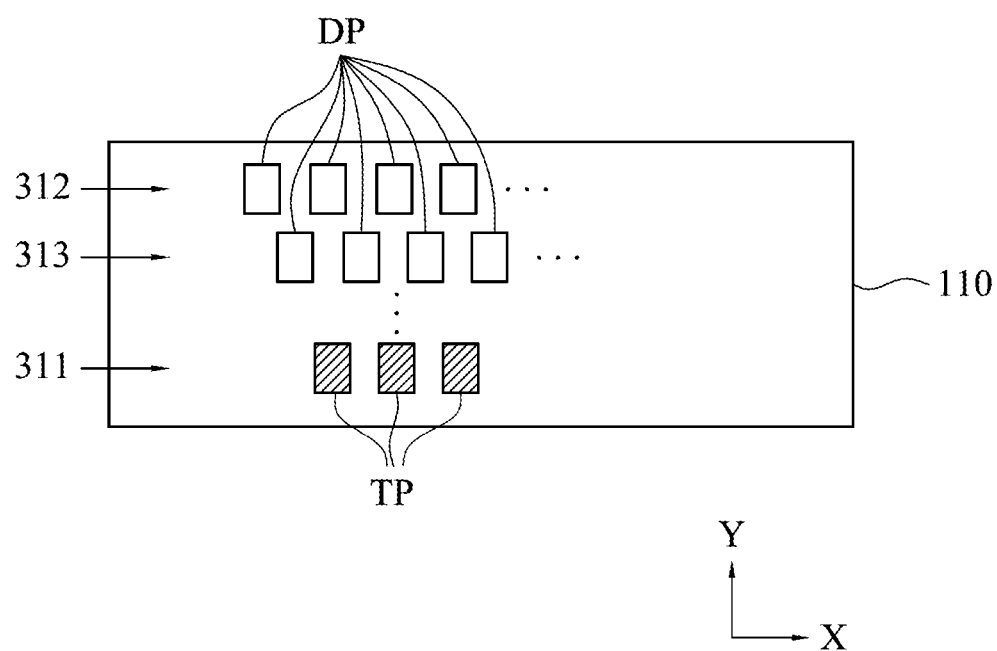

Referring to FIG. 3A, in some embodiments, the display pads and the touch pads are arranged, along the Y direction, as a first row 301, a second row 302, and a third row 303. The first row 301 only includes the touch pads TP, and the second row 302 and the third row 303 only include the display pads DP. In this embodiment, all touch pads are disposed in the first row 301, but all touch pads may be arranged as several rows in other embodiments. In addition, the touch pads TP are disposed on the top in FIG. 3A, that is, the touch pads TP are disposed between the display area and the display pads DP. FIG. 3B is similar to FIG. 3A, in which the display pads and the touch pads are arranged, along the Y direction, as a first row 311, a second row 312 and a third row 313. The second row 312 and the third row 313 only include the display pads DP, and the first row 311 only includes the touch pads TP. However, the touch pads TP are disposed on the bottom in FIG. 3B, that is, the display pads DP are disposed between the display area and the touch pads.

Figure 3C:
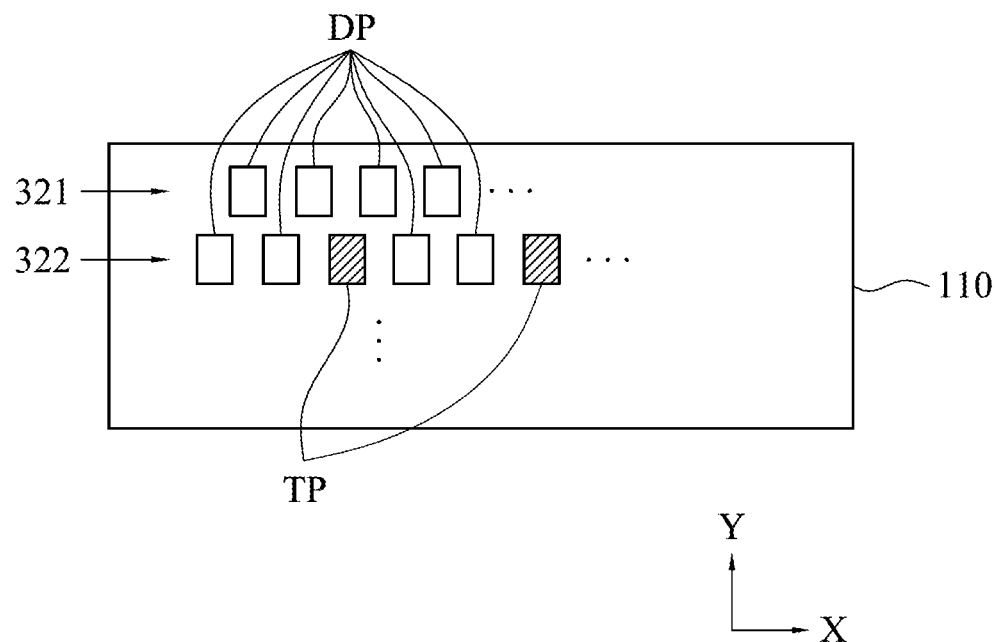
Figure 3D:
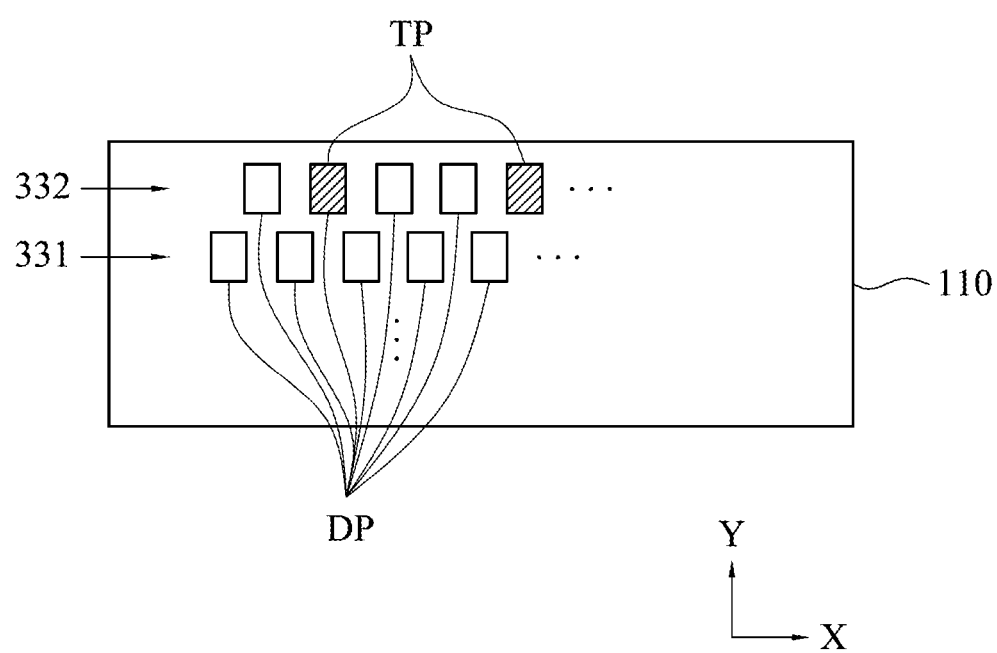

In FIG. 3C, the display pads and the touch pads are arranged, along the Y direction, as a first row 321 and a second row 322. The first row 321 only includes a portion of the display pads DP, and the second row 322 includes a portion of the display pad DP and the touch pads TP. The touch pads TP are inserted into the display pads DP of the second row 322 in FIG. 3C. The first row 321 is disposed on the top, that is, the first row 321 is disposed between the display area and the second row 322. FIG. 3D is similar to FIG. 3, but the difference between FIG. 3C and FIG. 3D is that the second row 332 having the touch pads TP and the display pads DP is disposed on the top, that is, the second row 332 is disposed between the display area and the first row 331. The touch pads TP are inserted into the display pads DP of the second row 332 as shown in FIG. 3D.

Figure 3E:
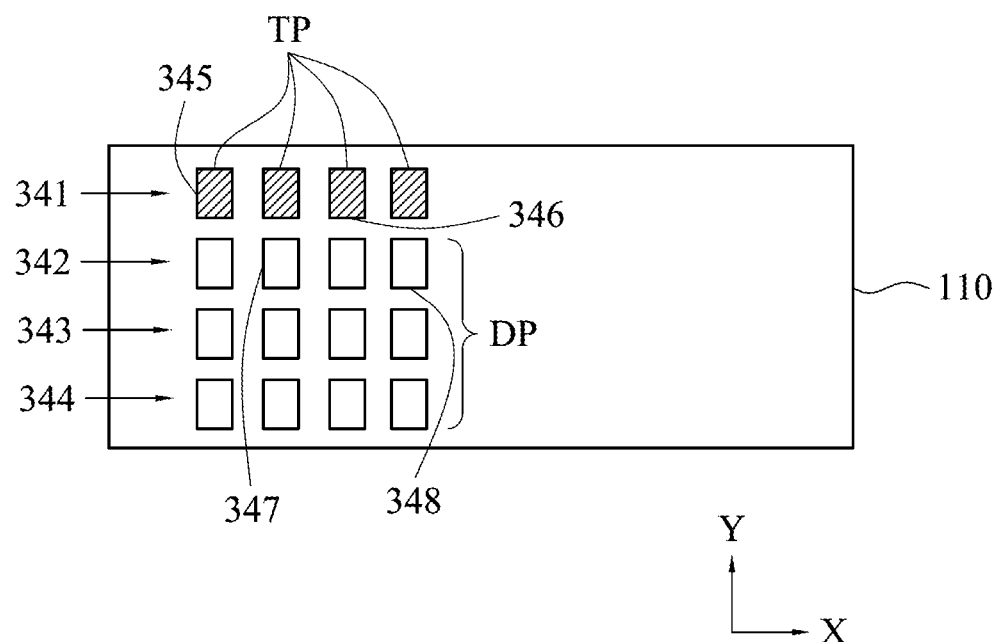

In FIG. 3E, the display pads and the touch pads are arranged, along Y direction, as a first row 341, a second row 342, a third row 343 and a fourth row 344. The first row 341 only includes touch pads TP; the second row 342, the third row 343 and the fourth row 344 only include display pads DP. Moreover, the touch pads TP are overlapped with the display pads DP along Y direction.

Figure 3F:
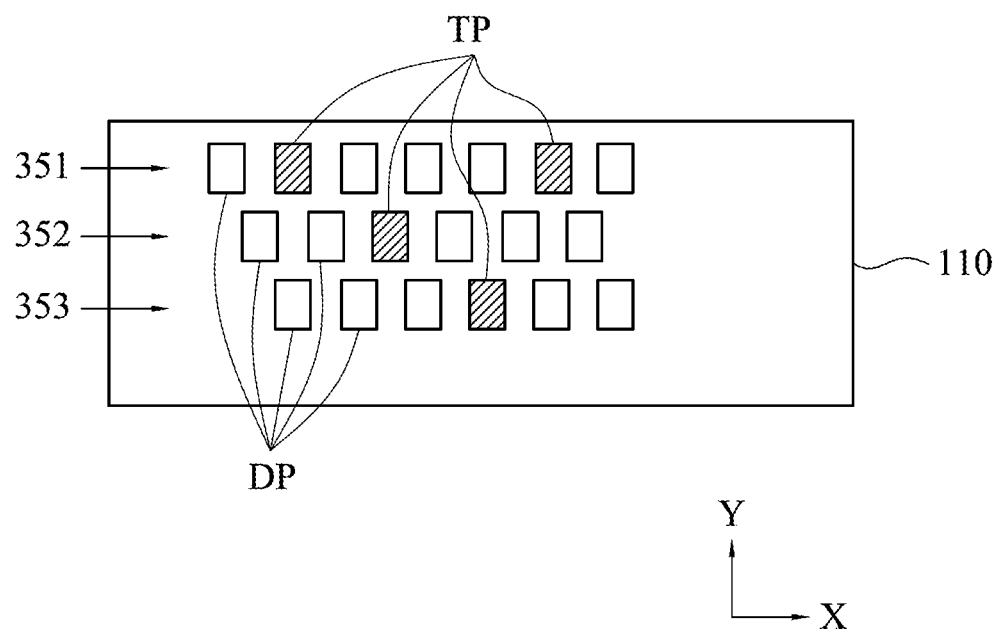

In FIG. 3F, the touch pads TP are evenly distributed in the first row 351, the second row 352 and the third row 353. In the same row, three display pads DP are disposed between two adjacent touch pads TP. In addition, the touch pads TP are overlapped with each other along Y direction.

Figure 3G:
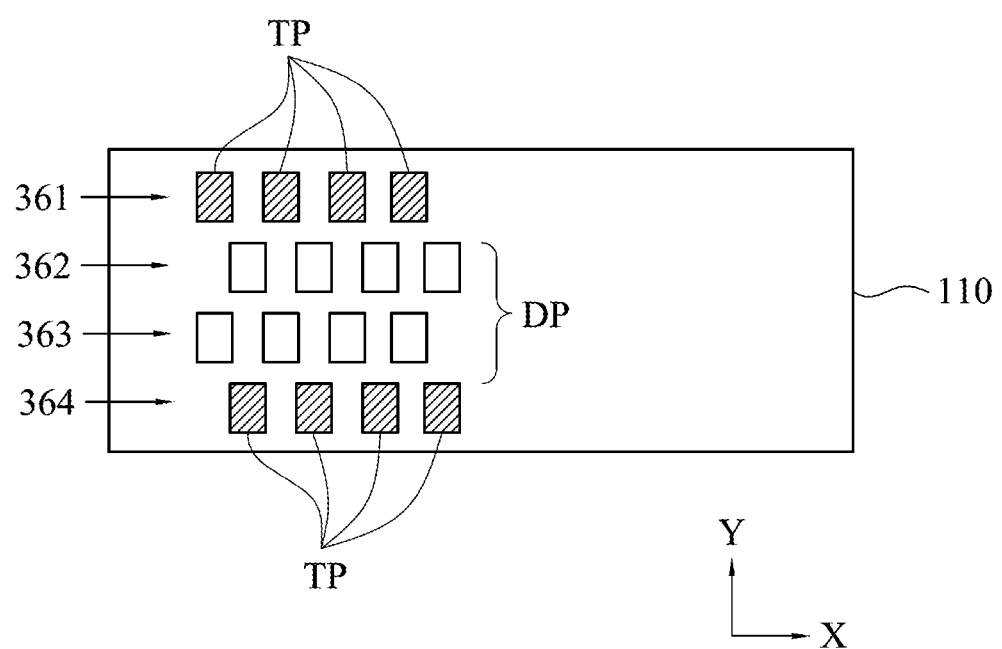

In FIG. 3G, a first row 361 only includes touch pads TP, a second row 362 and a third row 363 only include display pads DP, and a fourth row 364 only includes touch pads TP. Along Y direction, the touch pads TP in the first row 361 are overlapped with the touch pads TP in the fourth row 364, and the display pads DP in the second row 362 are overlapped with the display pads DP in the third row 363.

In the embodiments of FIG. 3A to FIG. 3G, the width of each touch pad TP along the X direction is equal to that of each display pad DP. However, in other embodiments, the width of each touch pad TP along the X direction may be wider than that of the display pad DP, which is not limited in the invention. Note that the description of "one display pad is disposed between two touch pads along X direction" may be interpreted as "the projection of one display pad onto X axis is disposed between the projections of two touch pads onto X axis", and thus it encompass the embodiments of FIG. 3A to FIG. 3G. For example, in FIG. 3E, the display pads 347 is disposed between the touch pads 345 and the touch pads 346 along X direction, and the touch pads 346 is disposed between the display pads 347 and the display pads 348. From another aspect, a projection of the display pads 347 onto X axis is located between two projections of the touch pads 345 and the touch pads 346 onto X axis. A projection of the touch pads 346 onto X axis is between two projections of the display pads 347 and the display pads 348 along X axis. The description may be applied to FIG. 3A to FIG. 3D, and FIG. 3F to FIG. 3G, and the description will not be repeated.

Figure 4:
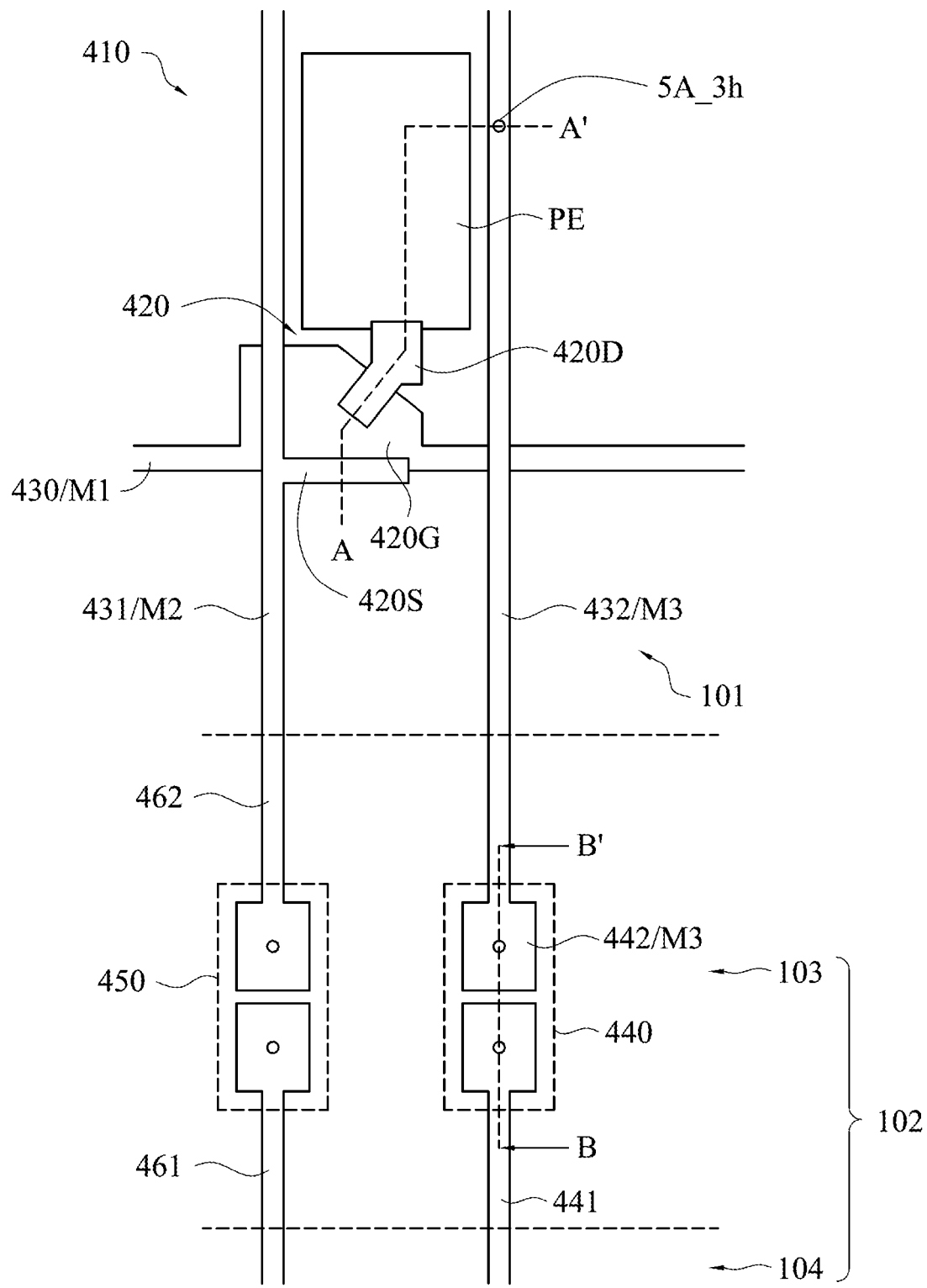
FIG. 4 is a top view of pixel structure in accordance with an embodiment.
Figure 5A:
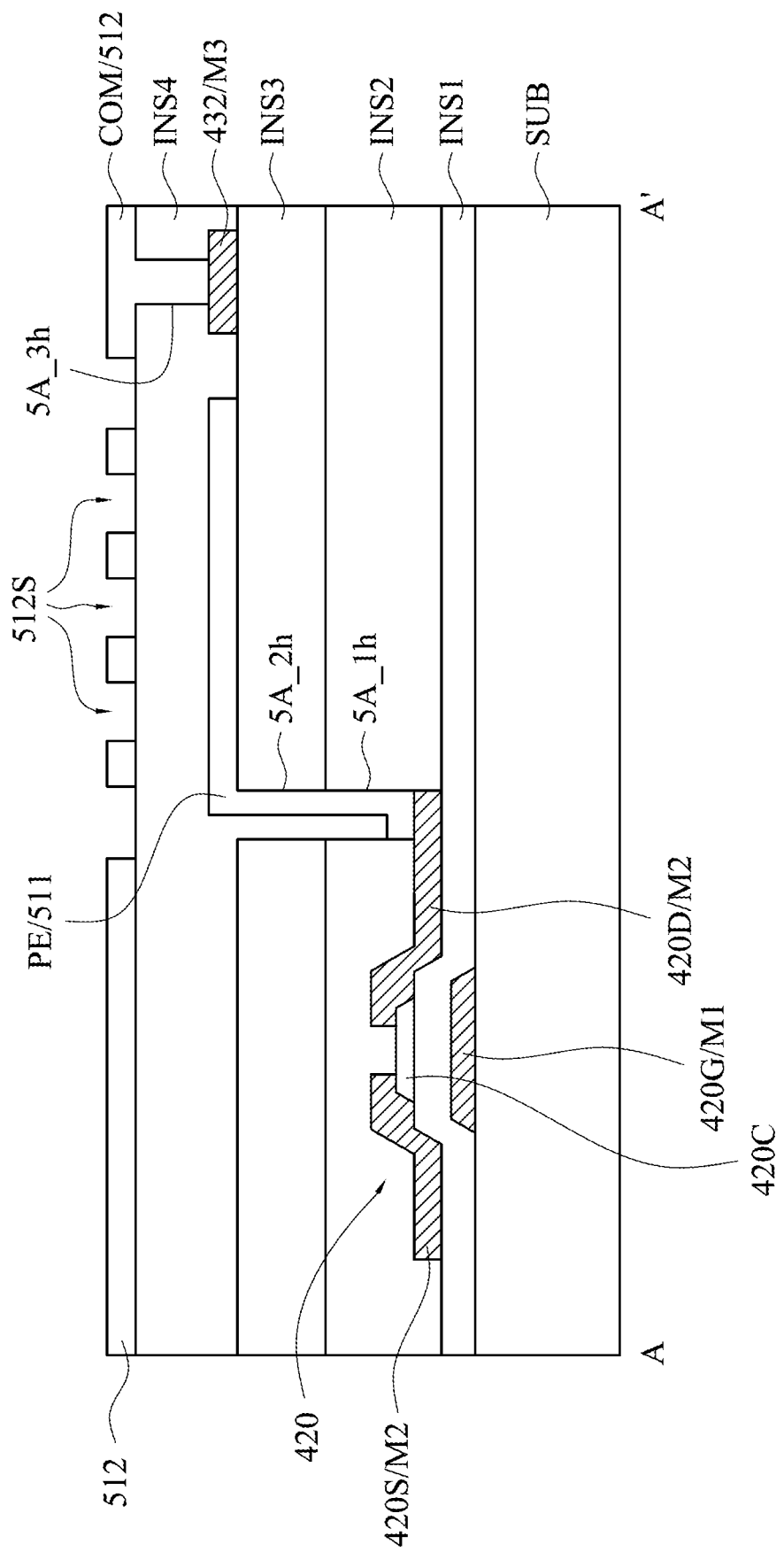
FIG. 5A and FIG. 5B are cross-sectional views of pixel structure along a cross-sectional line AA' of FIG. 4.

FIG. 4 is a top view of pixel structure in accordance with an embodiment. FIG. 5A is a cross-sectional view of pixel structure along a cross-sectional line AA' of FIG. 4. In the following description, the touch electrode in each pixel structure is referred to as the sub-common electrode. That is, each pixel electrode corresponds to one sub-common electrode which serves as a portion of the touch electrode in the touch sensing period. Referring to FIG. 4, a pixel structure 410 is taken as an example. The pixel structure 410 includes a TFT 420, a pixel electrode PE and a sub-common electrode COM (not shown in FIG. 4). The TFT 420 includes a gate 420G, a source 420S and a drain 420D. A gate line 430 formed in a first metal layer M1 is connected to the gate 420G. A data line 431 formed in a second metal layer M2 is connected to the source 420S. A touch sensing line 432 formed in a third metal layer M3 is connected to the sub-common electrode COM. Referring to FIG. 4 and FIG. 5A, the first metal layer M1 is formed on a substrate SUB, and the first metal layer M1 includes the gate 420G. A first insulation layer INS1 (also referred to gate insulation layer) is formed on the first metal layer M1. A semiconductor layer 420C is formed on the first insulation layer INS1 as a channel region of the TFT 420. The second metal layer M2 is formed on the semiconductor layer 420C. The second metal layer M2 includes a source 420S and a drain 420D. A second insulation layer INS2 is formed on the second metal layer M2, and has a first contact hole 5A_1h. A third insulation layer INS3 is formed on the second insulation layer INS2, and the third insulation layer INS3 has a second contact hole 5A_2h corresponding to the first contact hole 5A_1h. A third metal layer M3 is formed on the third insulation layer INS3. The touch sensing lines 432 are formed by the third metal layer M3 in the display area 101. A first transparent conductive layer 511 is also formed on the third insulation layer INS3. The first transparent conductive layer 511 includes a pixel electrode PE which is electrically connected to the drain 420D through the second contact hole 5A_2h and the first contact hole 5A_1h. A fourth insulation layer INS4 is formed on the third metal layer M3 and the first transparent conductive layer 511, and has a third contact hole 5A_3h to expose the touch sensing lines 432. A second transparent conductive layer 512 is formed on the fourth insulation layer INS4, and includes a sub-common electrode COM which has at least one slits 512S. In the display area 101, the touch sensing line 432 is electrically connected to the sub-common electrode COM through the contact hole 5A_3h. Consequently, the common voltage is applied to the sub-common electrode COM in the display period, and an electric field between the sub-common electrode COM and the pixel electrode PE is configured to control the orientation of the liquid crystal. In the touch sensing period, the sub-common electrode COM serves as a portion of the touch electrode, and the voltage on which is transmitted to the driving circuit through the touch sensing line 432 to generate the touch sensing signal.

There are four insulation layers in the embodiment of FIG. 5A, in which the first insulation layer INS1, the second insulation layer INS2, and the fourth insulation layer INS4 may be formed by silicon nitride, silicon oxide or other suitable insulation layer; and the third insulation layer INS3 may be an organic insulation layer. However, the invention is not limited thereto, the first insulation layer INS1 to the fourth insulation layer INS4 may be formed by any suitable material. In addition, the thickness of the third insulation layer INS3 may be greater than or equal to the thickness of the second insulation layer INS2. The thickness of the third insulation layer INS3 is 1.2 or more times of the thickness of the fourth insulation layer INS4, and thus the electric field between the sub-common electrode COM and the pixel electrode PE may not be interfered badly. Moreover, the thickness of the third insulation layer INS3 is greater than or equal to 5000 Å so that the third insulation layer INS3 can achieve better planarization. The sum of the thickness of the third insulation layer INS3 and the thickness of the fourth insulation layer INS4 is greater than or equal to 7000 Å. If the fourth insulation layer INS4 is too thick, the electric field effect would not be ideal.

The sub-common electrode COM is above the pixel electrode PE in the embodiment of FIG. 5A. However, the sub-common electrode COM may be below the pixel electrode PE in other embodiments. For example, referring to FIG. 5B, the second insulation layer INS2 is formed on the second metal layer M2, and the second insulation layer INS2 has a first contact hole 5E_1h. The third metal layer M3 is formed on the second insulation layer INS2. The touch sensing lines 432 are formed by the third metal layer M3 in the display area 101. The third insulation layer INS3 is formed on the second insulation layer INS2. The third insulation layer INS3 has a second contact hole 5E_2h to expose the touch sensing lines 432. The third insulation layer INS3 has a third contact hole 5E_3h corresponding to the first contact hole 5E_1h. The first transparent conductive layer 511 is formed on the third insulation layer INS3. The first transparent conductive layer 511 includes the sub-common electrode COM which is electrically connected to the touch sensing lines 432 through the second contact hole 5E_2h. The fourth insulation layer INS4 is formed on the transparent conductive layer 511, and has a fourth contact hole 5E_4h corresponding to the third contact hole 5E_3h. The second transparent conductive layer 512 is formed on the fourth insulation layer INS4. The second transparent conductive layer 512 includes the pixel electrode PE which has at least one slits 512S. The pixel electrode PE is electrically connected to the drain 420D through the fourth contact hole 5E_4h, the third contact hole 5E_3h and the first contact hole 5E_1h.

Figure 5B:
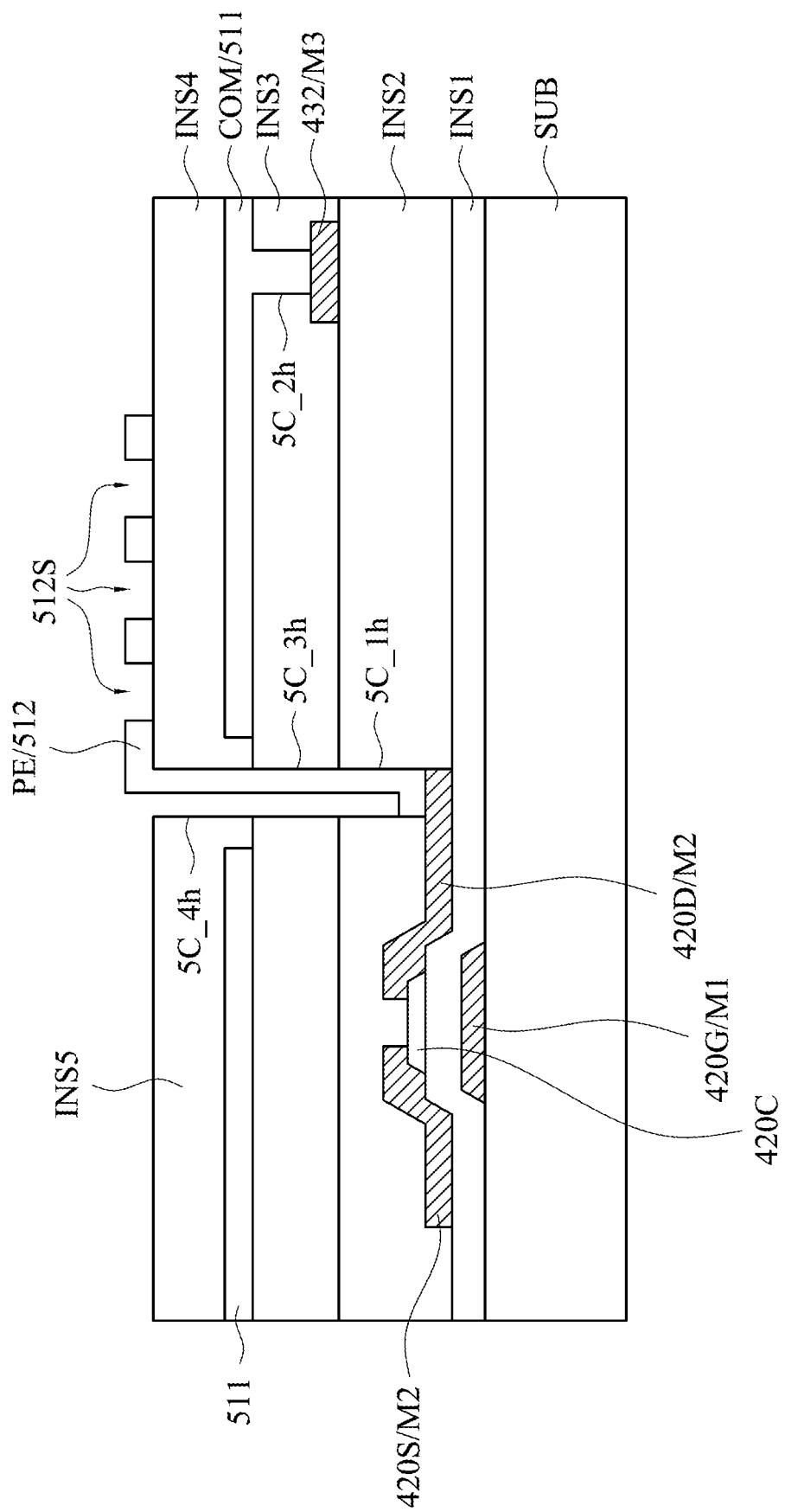
Figure 5C:
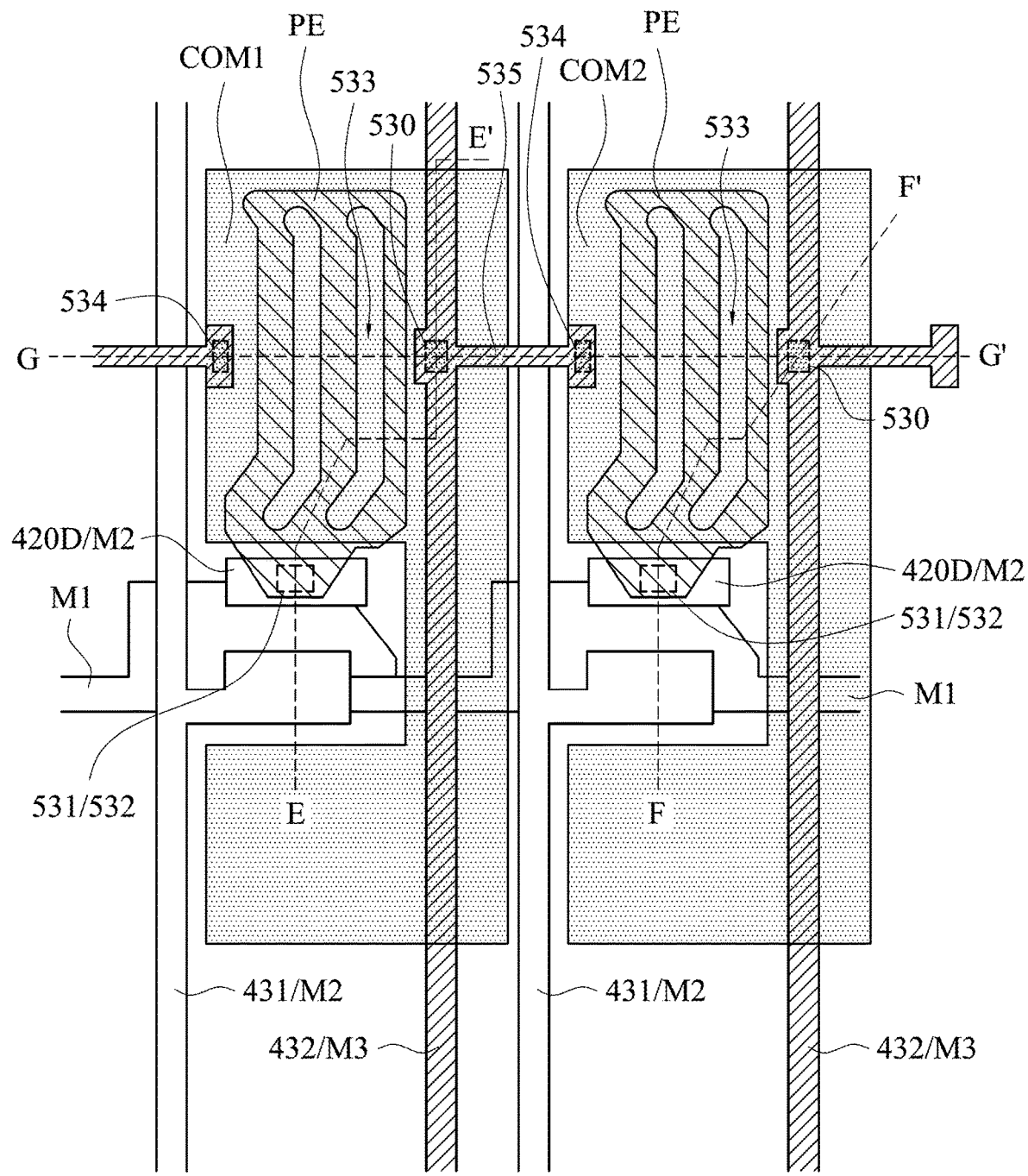
FIG. 5C and FIG. 5D are top views of multiple pixel structure in accordance with another embodiment.

In some embodiments, the sub-common electrode COM and the second metal layer M2 are formed in the same layer. For example, referring to FIG. 5C and FIG. 5E, FIG. 5C illustrates two pixel structure in an area 540 of FIG. 5E. In order to distinguish two sub-common electrodes COM of FIG. 5E, the sub-common electrodes in two adjacent pixel structures of FIG. 5C are labeled as a first sub-common electrode COM1 and a second sub-common electrode COM2. When the sub-common electrodes COM1, COM2 are disposed below the pixel electrode PE, the sub-common electrodes COM1, COM2 and the second metal layer M2 are formed directly on the same layer (the first insulation layer INS1), that is, the sub-common electrodes COM1, COM2 and the second metal layer M2 are in direct contact with the first insulation layer INS1. Consequently, the sub-common electrode COM1 cannot across the data lines 431 to electrically connect the sub-common electrode COM2. Therefore, multiple metal connection structures (e.g. metal connection structure 535) are disposed for electrically connecting the sub-common electrodes in two adjacent pixel structures. In addition, the metal connection structures are not formed in the second metal layer. In the embodiment of FIG. 5C, the metal connection structures are formed in the third metal layer M3.

Figure 5D:
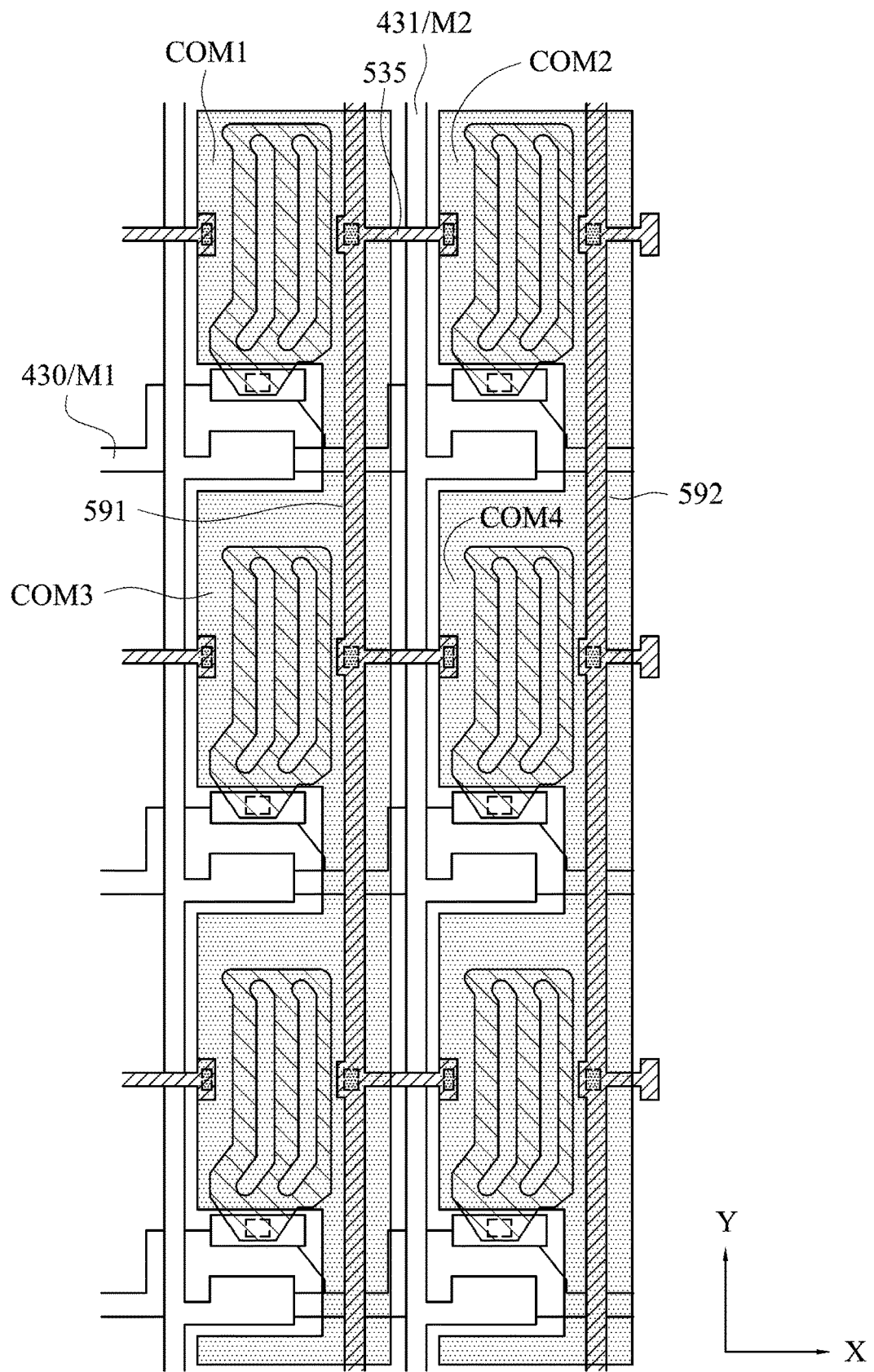
Figure 5E:
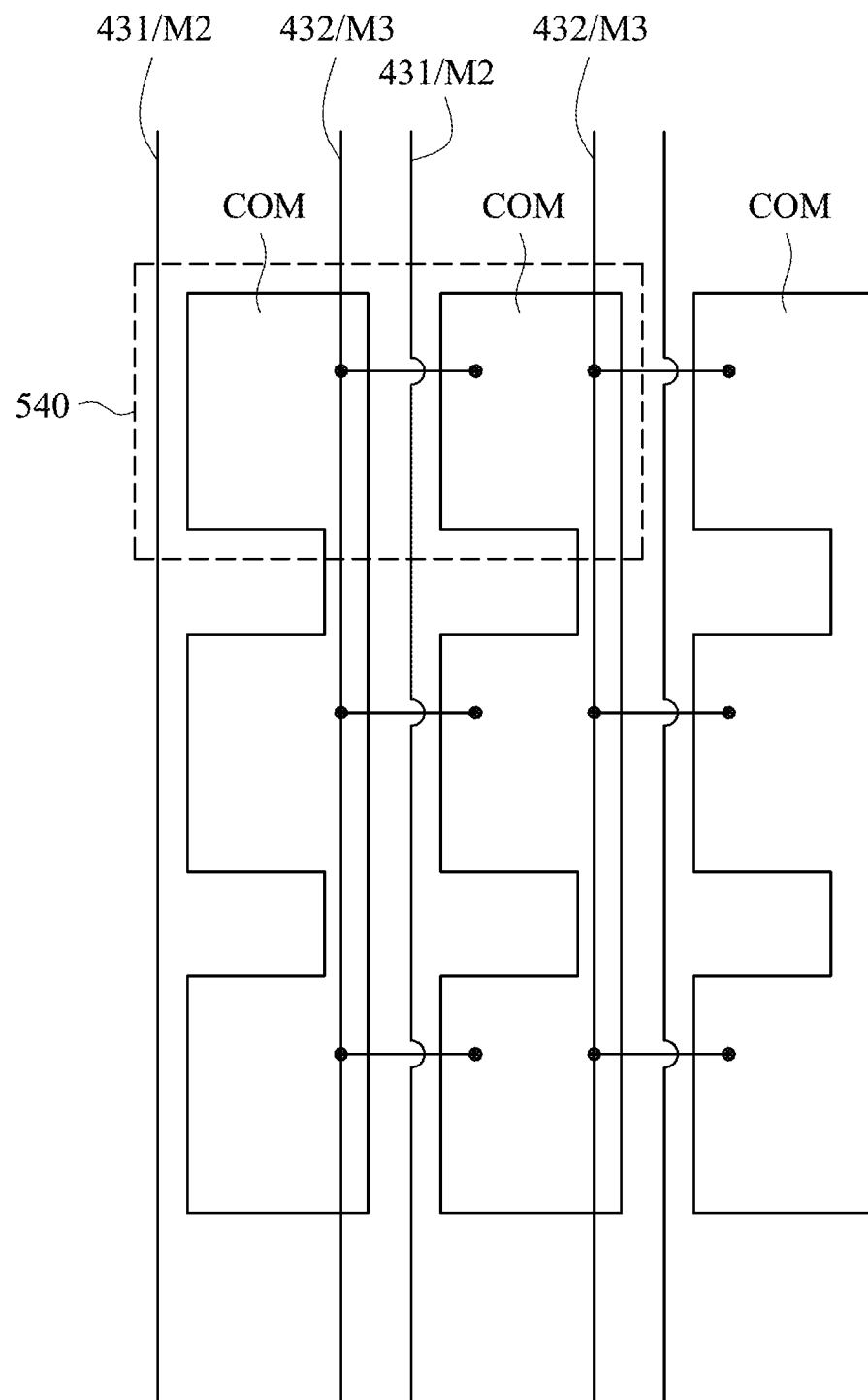
FIG. 5E is a circuit schematic diagram of the common electrodes of FIG. 5C.

Referring to FIG. 5D, the sub-common electrodes COM1 and COM2 are electrically connected to each other through a metal connection structure 535 along the X direction. However, the sub-common electrodes would not across the second metal layer in the same layer along the Y direction, and thus the sub-common electrodes are electrically connected to each other through an extending portion. In detail, the sub-common electrode COM1 and a sub-common electrode COM3, which are adjacent to each other along Y direction, are electrically connected to each other through an extending portion 591; the sub-common electrode COM2 and a sub-common electrode COM4, which are adjacent to each other along Y direction, are electrically connected to each other through an extending portion 592. The extending portions 591, 592 would across the gate lines 430, and the width of the extending portion along X direction is less than that of the sub-common electrodes COM1, COM2, COM3, and COM4.

Figure 5F:
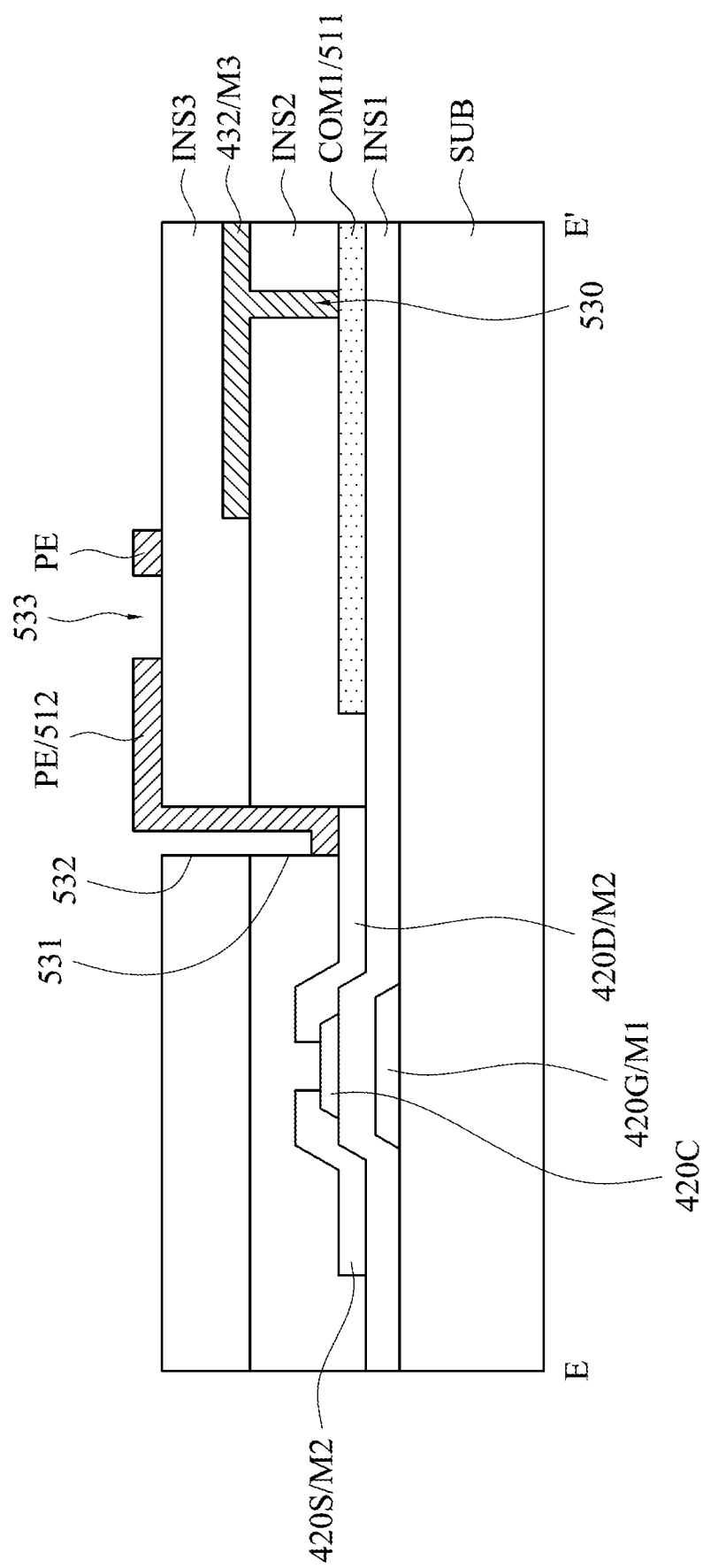
FIG. 5F is a cross-sectional view of pixel structure along a cross-sectional line EE' of FIG. 5C.
Figure 5G:
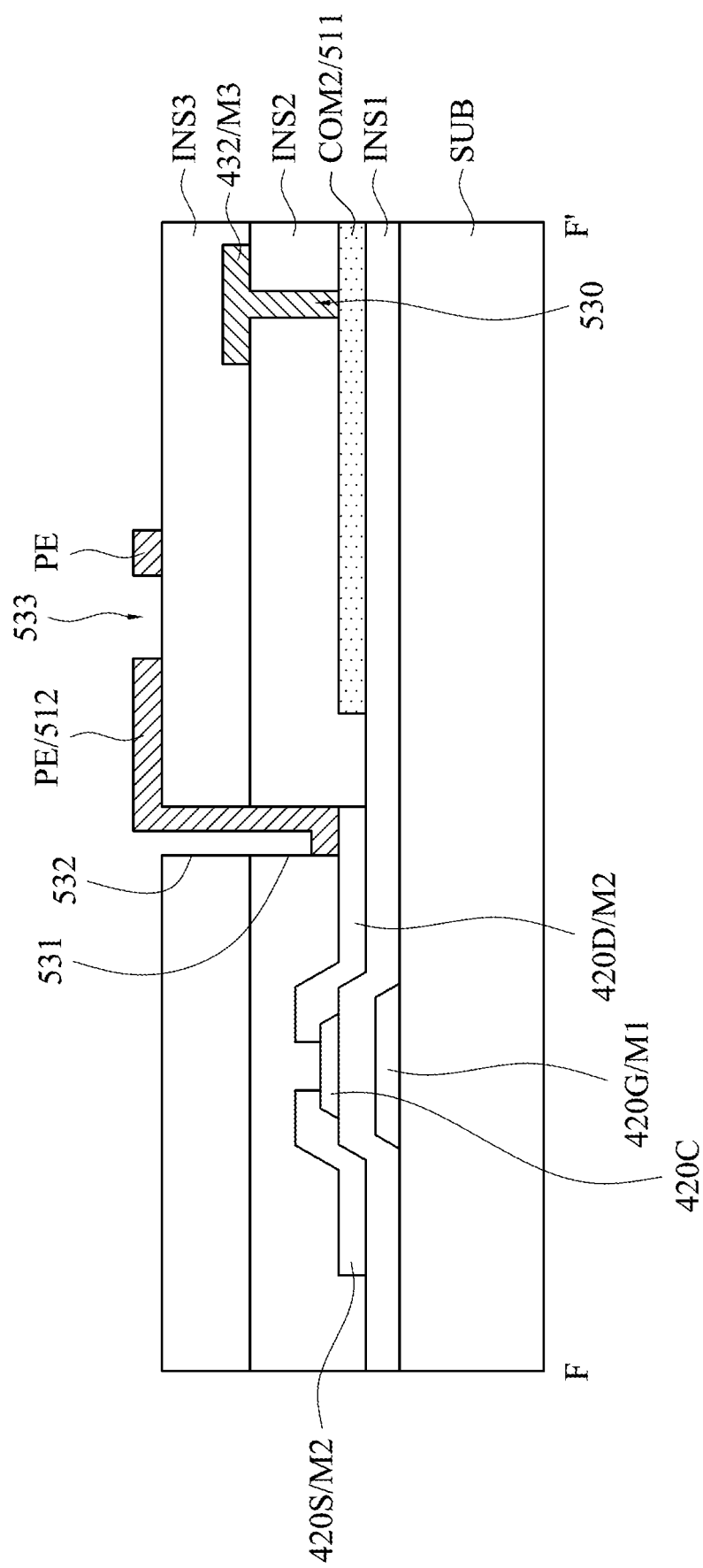
FIG. 5G is a cross-sectional view of pixel structure along a cross-sectional line FF' of FIG. 5C.
Figure 5H:
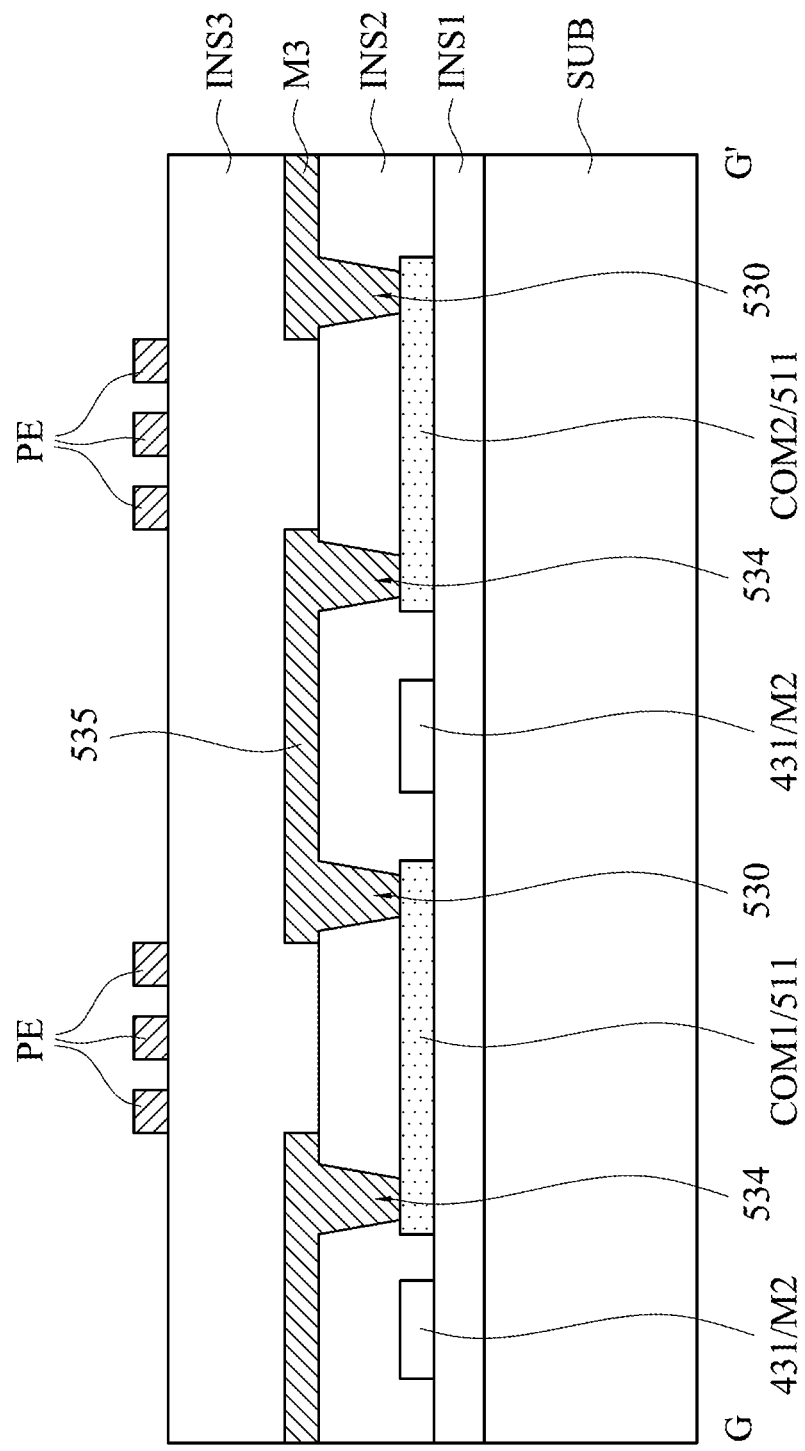
FIG. 5H is a cross-sectional view of pixel structure along across-sectional line GG' of FIG. 5C.

Referring to FIG. 5C, FIG. 5F, FIG. 5G and FIG. 5H, FIG. 5F is a cross-sectional view of pixel structure along a cross-sectional line EE' of FIG. 5C, FIG. 5G is a cross-sectional view of pixel structure along a cross-sectional line FF' of FIG. 5C, and FIG. 5G is a cross-sectional view of pixel structure along across-sectional line GG' of FIG. 5C. The units of FIG. 5F to FIG. 5G that are similar to that of FIG. 5A will not be described again. In FIG. 5F to FIG. 5G, the second metal layer M2 and the first transparent conductive layer 511 are both disposed on the first insulation layer INS1 and are in direct contact with the first insulation layer INS1. The first transparent conductive layer 511 includes the sub-common electrodes COM1, COM2. The second insulation layer INS2 is formed on the second metal layer M2 and the first transparent conductive layer 511. The second insulation layer INS2 includes a contact hole 530, a contact hole 531 and a contact hole 534. The contact hole 531 exposes the drain 420D. The contact holes 530, 534 which are in a single pixel structure are disposed at two sides of the sub-common electrode to expose the sub-common electrode of the pixel structure. For example, the contact holes 530, 534 are disposed at two sides of the sub-common electrode COM1, COM2. The third metal layer M3 is formed on the second insulation layer INS2. In the display area 101, the touch sensing line 432 is formed by the third metal layer M3. The touch sensing line 432 is electrically connected to the sub-common electrode COM1, COM2 through the contact hole 530. In addition, the third metal layer M3 also includes the metal connection structure 535 which is electrically connected to the touch sensing line 432 (also electrically connected to the sub-common electrode COM1), and extends to the contact hole 534 in the adjacent pixel structure from the contact hole 530, and is electrically connected to the sub-common electrode COM2 through the contact hole 534. As a result, two adjacent sub-common electrodes COM1, COM2 are electrically connected to each other through the metal connection structure 535. Moreover, the third insulation layer INS3 is formed on the second insulation layer INS2 and the third metal layer M3, and the third insulation layer INS3 has a contact hole 532 corresponding to the contact hole 531. The second transparent conductive layer 512 is formed on the third insulation layer INS3, and has the pixel electrode PE. In some embodiments, the pixel electrode PE has at least one slits 533. In addition, the pixel electrode PE is electrically connected to the drain 420D through the contact holes 532, 531.

Figure 5I:
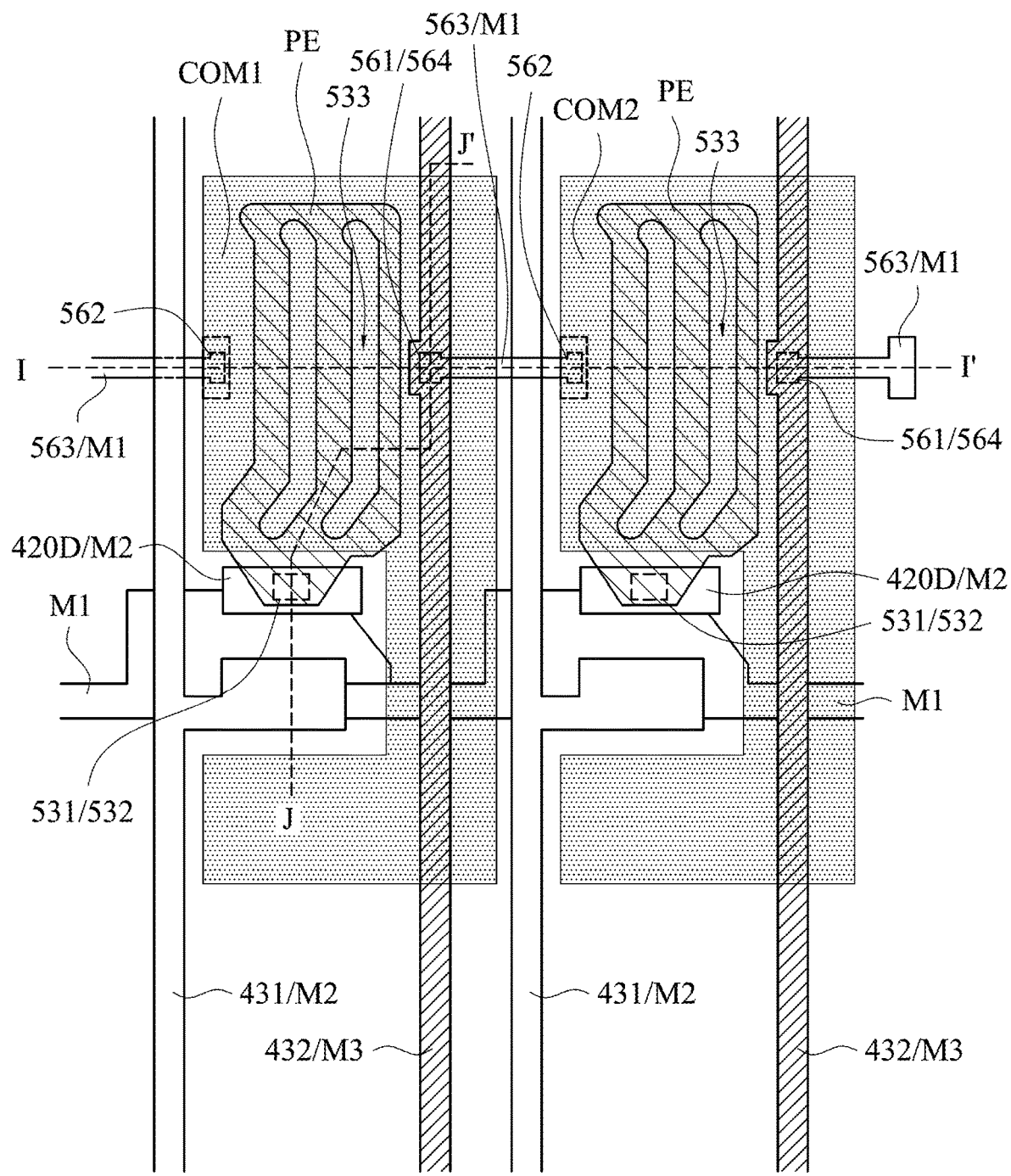
FIG. 5I is a top view of pixel structure in accordance with an embodiment.
Figure 5J:
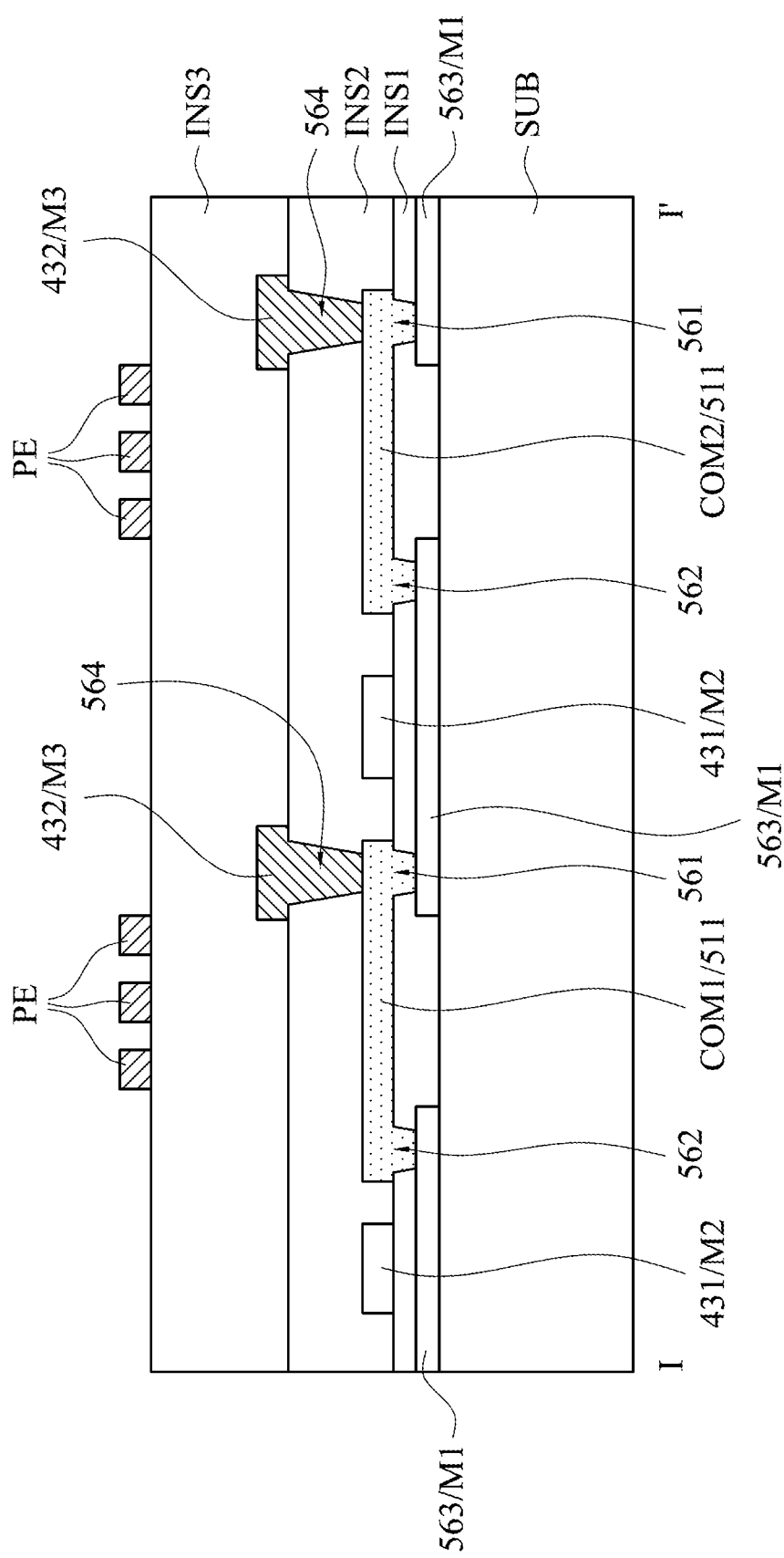
FIG. 5J is a cross-sectional view of the pixel structure along a cross-sectional line II' of FIG. 5I.
Figure 5K:
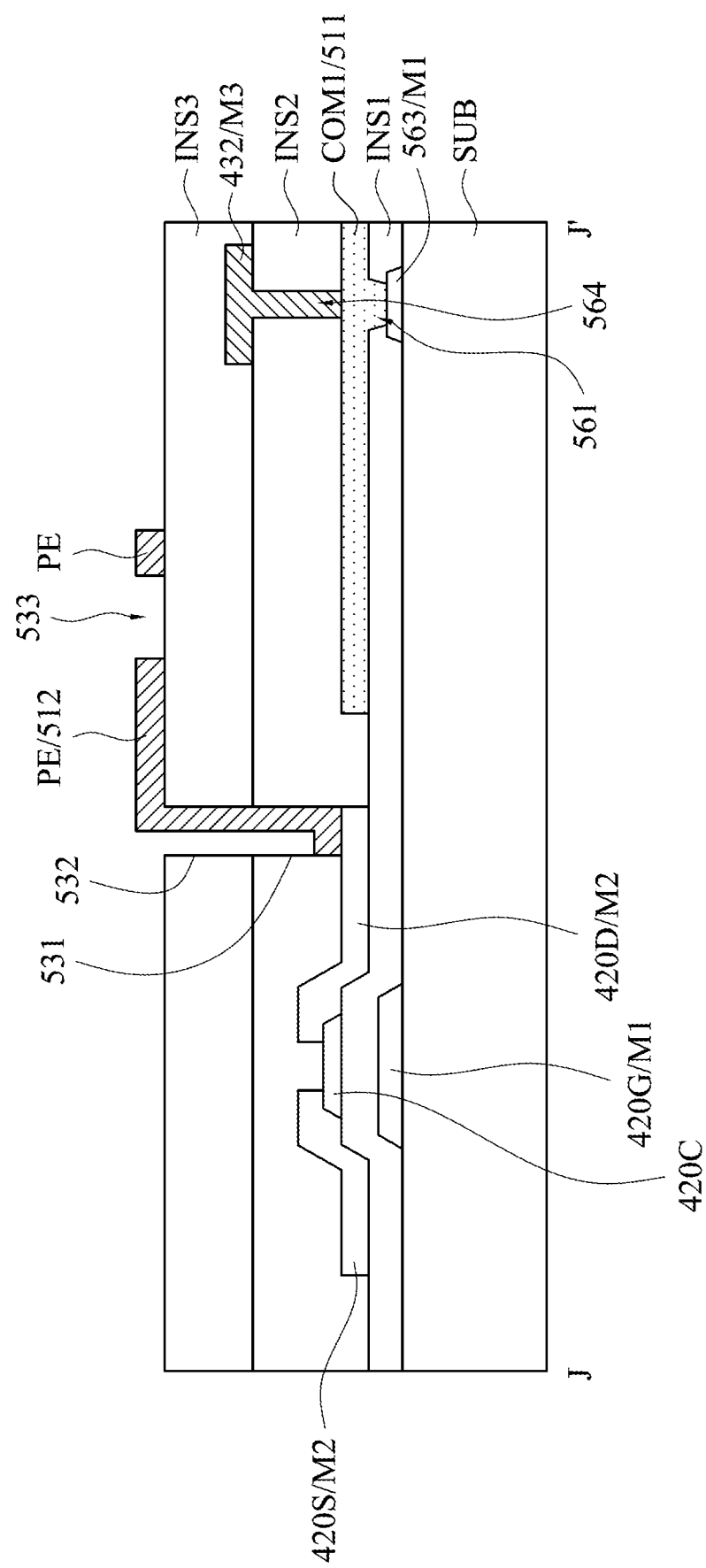
FIG. 5K is a cross-sectional view of pixel structure along a cross-sectional line JJ' of FIG. 5I.

In the embodiment of FIG. 5C, the metal connection structure 535 is formed by the third metal layer M3, but it may be formed by the first metal layer M1 in other embodiments. For example, referring to FIG. 5I, FIG. 5J and FIG. 5K. FIG. 5J is a cross-sectional view of the pixel structure along a cross-sectional line II' of FIG. 5I. FIG. 5K is a cross-sectional view of pixel structure along a cross-sectional line JJ' of FIG. 5I. FIG. In the embodiment, the first metal layer M1 includes the gate 420G and a metal connection structure 563. The first insulation layer INS1 includes contact holes 561, 562 to expose the metal connection structure 563. The first transparent conductive layer 511 includes the sub-common electrodes COM1, COM2. The sub-common electrode COM1 is electrically connected to the metal connection structure 563 through the contact hole 561. The metal connection structure 563 is electrically connected to the sub-common electrode COM2 through the contact hole 562. As a result, the sub-common electrodes COM1, COM2 are electrically connected to each other. The second insulation layer INS2 is formed on the second metal layer M2 and the first transparent conductive layer 511, and has a contact hole 564 to expose the sub-common electrodes COM1, COM2. The third metal layer M3 is formed on the second insulation layer INS2, and the touch sensing line 432 formed by the third metal layer M3 is electrically connected to the sub-common electrodes COM1, COM2 through the contact hole 564.

Figure 6:
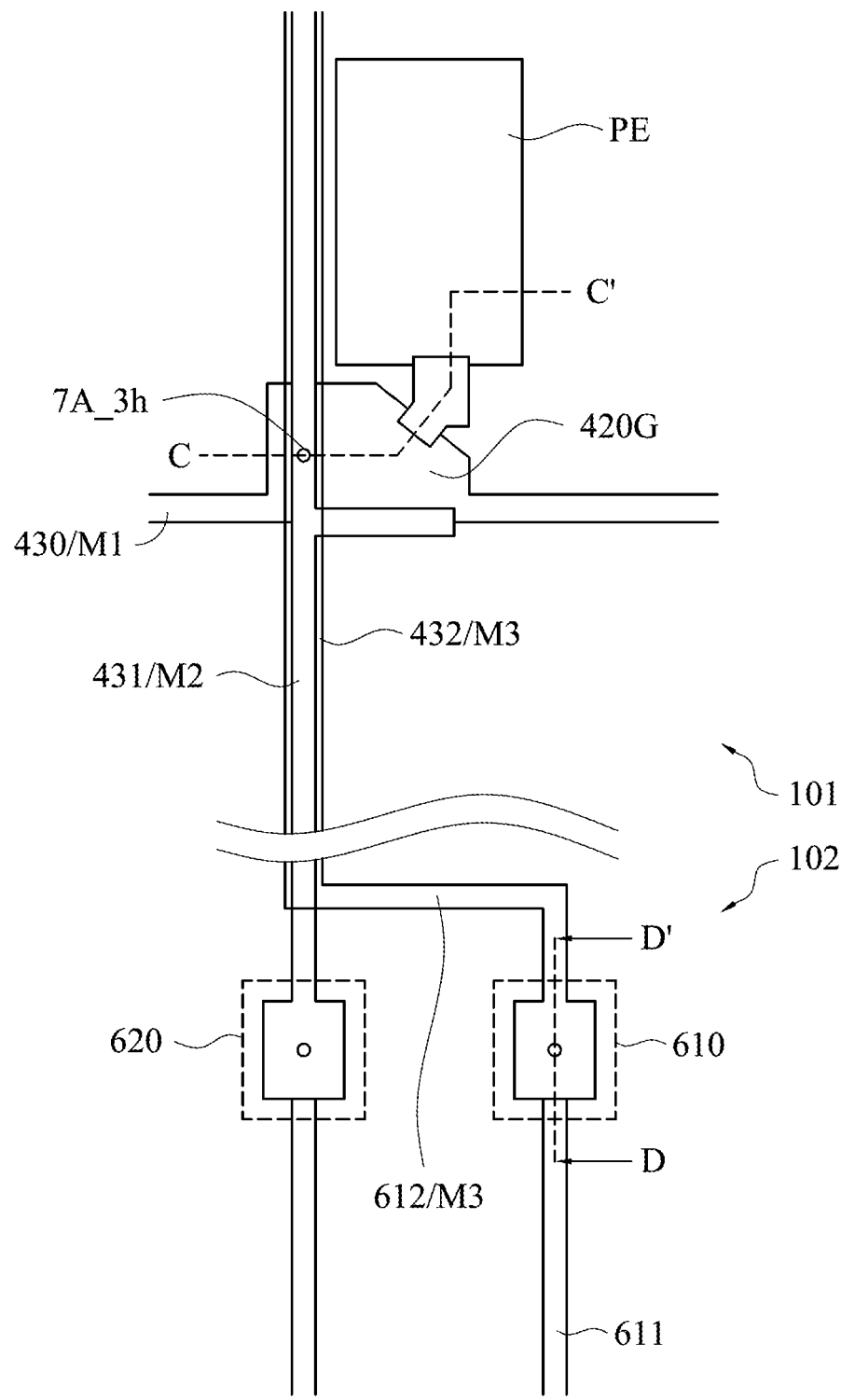
FIG. 6 is a diagram illustrating a top view of pixel structure according to another embodiment.
Figure 7A:
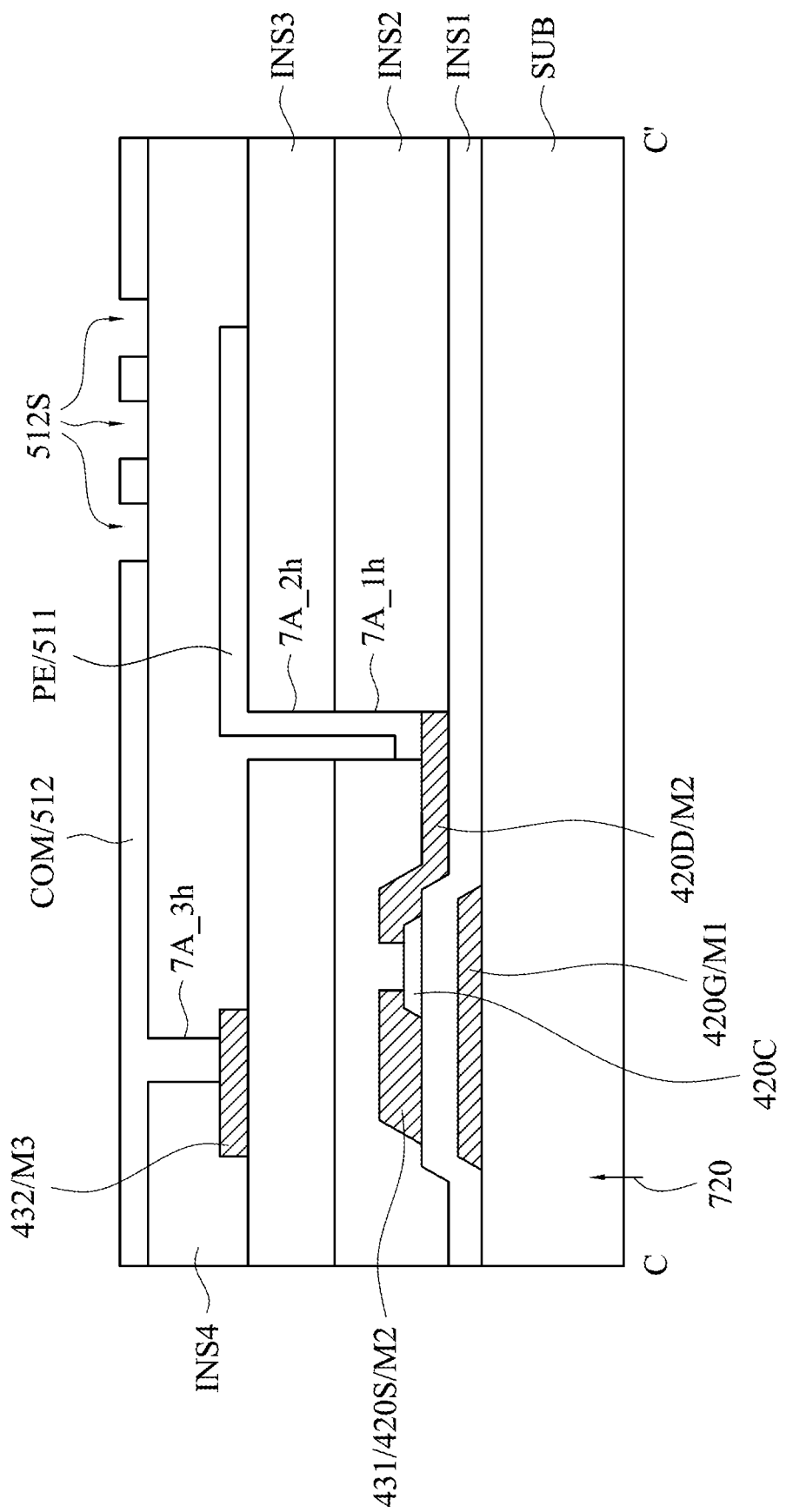
FIG. 7A and FIG. 7B are diagrams illustrating cross-sectional views of the pixel structure along a cross-sectional line CC' of FIG. 6.

In the embodiment of FIG. 4, FIG. 5A and FIG. 5B, the data line 431 and the touch sensing line 432 are not overlapped with each other along a normal vector of the in-cell touch display panel, but the touch sensing line 432 is made of metal that would decrease the aperture ratio of the pixel structure. In some embodiments, the data line 431 and the touch sensing line 432 are partially overlapped with each other along the normal vector of the in-cell touch display panel, and the data line 431 and the touch sensing line 432 are formed in different metal layers in the display area. For example, referring to FIG. 6 and FIG. 7A, FIG. 6 is a diagram illustrating a top view of pixel structure according to another embodiment, and FIG. 7A is a diagram illustrating a cross-sectional view of the pixel structure along a cross-sectional line CC' of FIG. 6. The first metal layer M1 is formed on the substrate SUB, and the first metal layer M1 includes the gate 420G. The first insulation layer INS1 is formed on the first metal layer M1. The semiconductor layer 420C is formed on the first insulation layer INS1 as the channel region of the TFT 420. The second metal layer M2 is formed on the semiconductor layer 420C, and includes the source 420S and the drain 420D. The second insulation layer INS2 is formed on the second metal layer M2. The second insulation layer INS2 includes a first contact hole 7A_1*h* to expose the drain 420D. The third insulation layer INS3 is formed on the second insulation layer INS2, and includes a second contact hole 7A_2*h* corresponding to the first contact hole 7A_1*h*. The first transparent conductive layer 511 is formed on the third insulation layer INS3. The second transparent conductive layer 511 includes the pixel electrode PE which is electrically connected to the drain 420D through the second contact hole 7A_2*h* and the first contact hole 7A_1*h*. The third metal layer M3 is formed on the third insulation layer INS3. The touch sensing line 432 is formed by the third metal layer M3 in the display area 101. The fourth insulation layer INS4 is formed on the third metal layer M3, and includes a third contact hole 7A_3*h* to expose the touch sensing line 432. The second transparent conductive layer 512 is formed on the fourth insulation layer INS4. The second transparent conductive layer 512 includes the sub-common electrode COM having at least one slits 512S. In the display area 101, the touch sensing line 432 is electrically connected to the sub-common electrode COM through the third contact hole 7A_3*h*. In particular, the touch sensing line 432 is at least partially overlapped with the data line 431 along a normal vector 720 of the display panel.

Figure 7B:
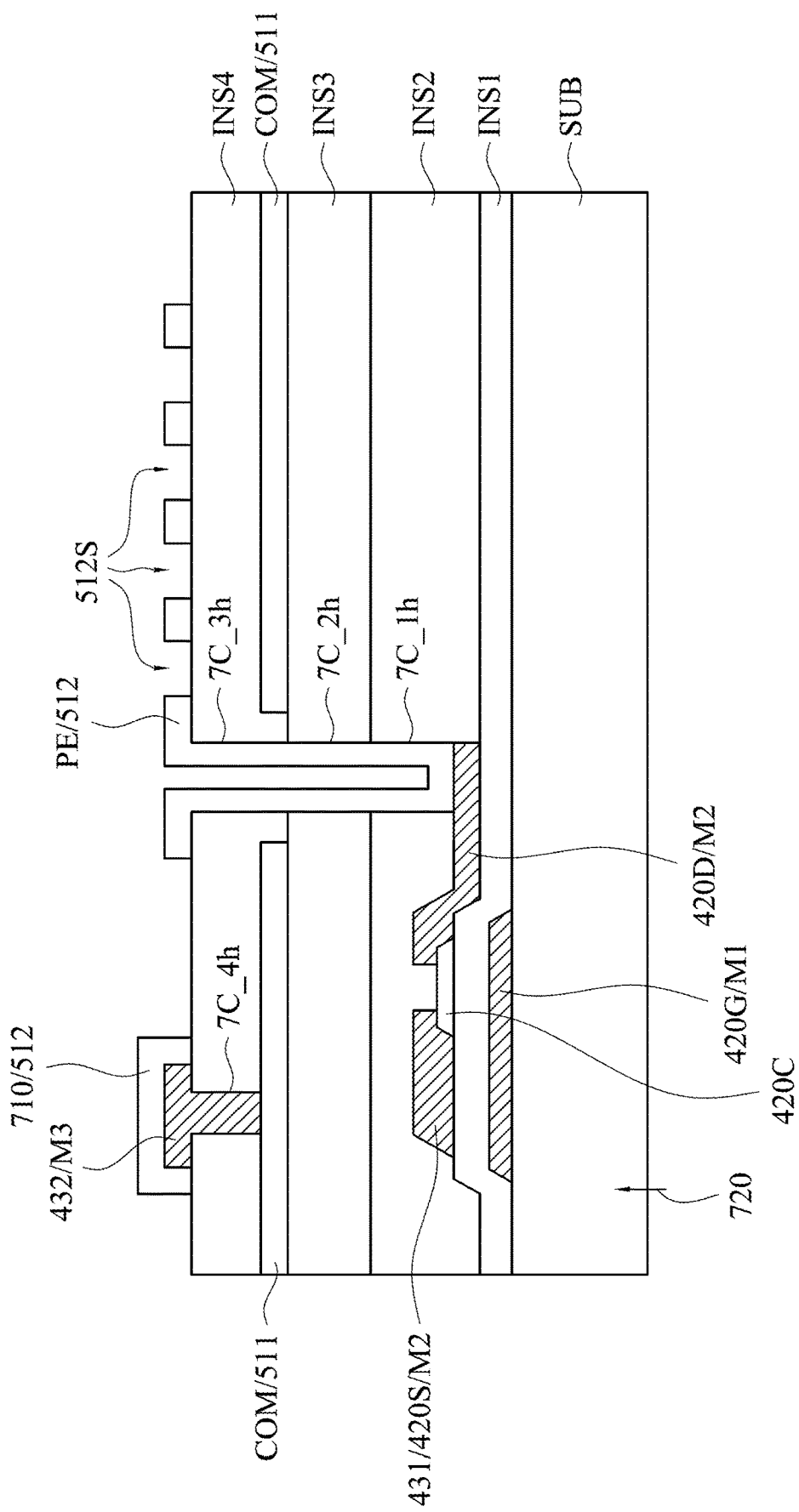

The sub-common electrode COM is formed above the pixel electrode PE in the embodiment of FIG. 7A, but the sub-common electrode COM may be formed below the pixel electrode PE in other embodiments. For example, referring to FIG. 7B, the second insulation layer INS2 has a first contact hole 7C_1*h* to expose the drain 420D. The third insulation layer INS3 is formed on the second insulation layer INS2, and includes a second contact hole 7C_2*h* corresponding to the third insulation layer INS3. The first transparent conductive layer 511 is formed on the third insulation layer INS3, and includes the sub-common electrode COM. The fourth insulation layer INS4 is formed on the first transparent conductive layer 511, and has a third contact hole 7C_3*h* corresponding to the second contact hole 7C_2*h* and a fourth contact hole 7C_4*h* to expose the sub-common electrode COM. The third metal layer M3 is formed on the fourth insulation layer INS4. The touch sensing line 432 is formed by the third metal layer M3 in the display area 101. The touch sensing line 432 is at least partially overlapped with the data lines 431 along the normal vector 720 of the in-cell touch display panel. The second transparent conductive layer 512 is formed on the fourth insulation layer INS4 and the third metal layer M3. The second transparent conductive layer 512 includes the pixel electrode PE having at least one slits 512S. The pixel electrode PE is electrically connected to the drain 420D through the third contact hole 7C_3*h*, the second contact hole 7C_2*h* and the first contact hole 7C_1*h*. In addition, the second transparent conductive layer 512 further includes a touch sensing line protection layer 710 to cover the touch sensing lines 432. Note that the touch sensing line protection layer 710 is electrically insulated from the pixel electrode PE. The touch sensing line protection layer 710 is configured to protect the touch sensing lines 432 from the erosion of subsequent processes.

The channel of the thin film transistor is amorphous silicon in the aforementioned embodiments, but the channel of the thin film transistor may be polysilicon in other embodiments. For example, referring to FIG. 7C, the semiconductor layer 520 is formed on the first substrate SUB. The semiconductor layer 520 includes a source 520S, a first lightly doped region (lightly doped drain, LDD) 520L_1, a second lightly doped region 520L_2, a channel region 520C, and the drain 520D. The channel region 520C is made of polysilicon formed by low temperature process (generally lower than 600° C.). The source 520S and the drain 520D are heavily doped. The channel region 520C is formed between the first lightly doped region 520L_1 and the second lightly doped region 520L_2. The first lightly doped region 520L_1 is formed between the source 520S and the channel region 520C. The second lightly doped region 520L_2 is formed between the channel region 520C and the drain 520D. The first insulation layer INS1 is formed on the semiconductor layer 520, and has a first contact hole 5G_1*h* and a second contact hole 5G_2*h* to expose the source 520S and the drain 520D respectively. The first metal layer M1 is formed on the first insulation layer INS1. The first metal layer M1 has a gate 521G which is at least partially overlapped with the channel region 520C along the normal vector 720 of the first substrate SUB. The second insulation layer INS2 is formed on the first insulation layer INS1, and has a third contact hole 5G_3*h* corresponding to the first contact hole 5G_1*h* and a fourth contact hole 5G_4*h* corresponding to the second contact hole 5G_2*h*. The gate 521G is located between the third contact hole 5G_3*h* and the fourth contact hole 5G_4*h*. The first transparent conductive layer 511 is formed on the second insulation layer INS2, and includes the pixel electrode PE. The second metal layer M2 is formed on the second insulation layer INS2. The data line 431 is formed by the second metal layer M2. The data line 431 is electrically connected to the source 520S through the third contact hole 5G_3*h* and the first contact hole 5G_1*h*. The second metal layer M2 also includes a filling structure 530 which is electrically connected to the pixel electrode PE, and is electrically connected to the drain 520D through the fourth contact hole 5G_4*h* and the second contact hole 5G_2*h*. The third insulation layer INS3 is formed on the second metal layer M2. The third metal layer M3 is formed on the third insulation layer INS3. The touch sensing line 432 is formed by the third metal layer M3 in the display area. The fourth insulation layer INS4 is formed on the third metal layer M3. The fourth insulation layer INS4 has a fifth contact hole 5G_5J to expose the touch sensing line 432. The second transparent conductive layer 512 is formed on the fourth insulation layer INS4, and is electrically connected to the touch sensing line 432 through the fifth contact hole 5G_5J. The second transparent conductive layer 512 includes the sub-common electrode COM having at least one slits 512S. The touch sensing line 432 is at least partially overlapped with the data line 431 along the normal vector of the first substrate SUB.

Figure 7C:
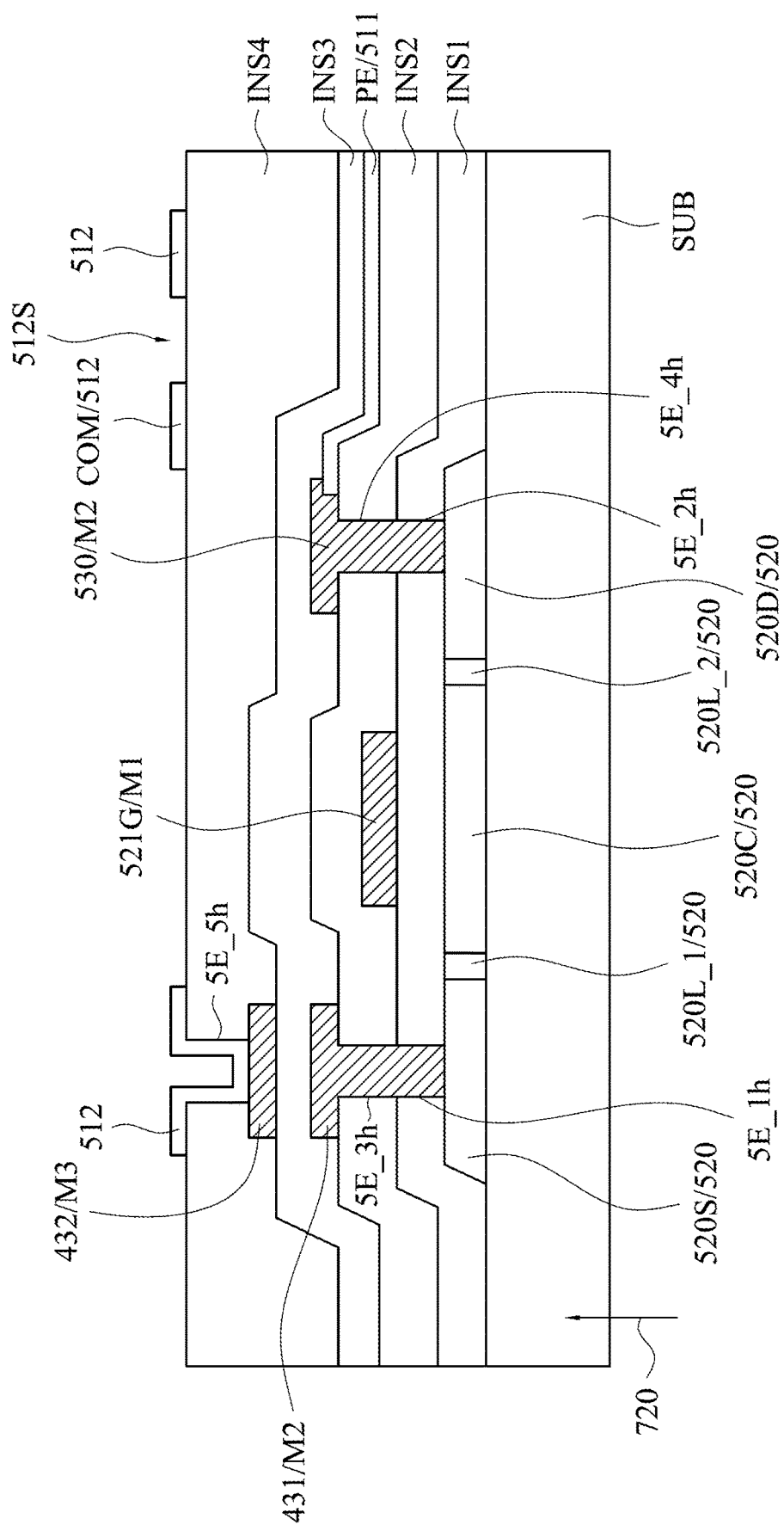
FIG. 7C to FIG. 7G are cross-sectional views of pixel structure in accordance with another embodiment.
Figure 7D:
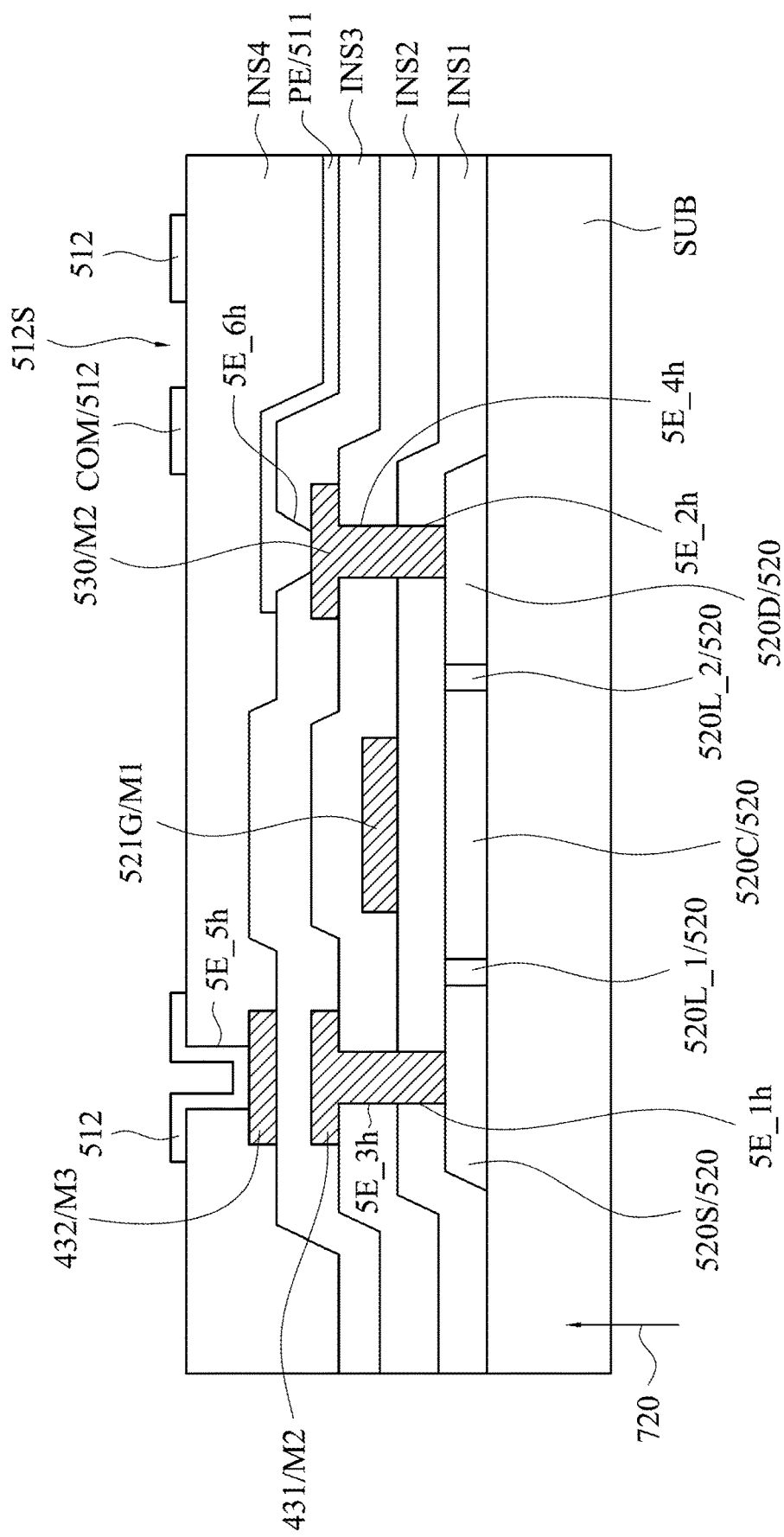

The second metal layer M2 is formed above the first transparent conductive layer 511 in the embodiment of FIG. 7C. However, the second metal layer M2 may be formed below the first transparent conductive layer 511 in other embodiments. For example, referring to FIG. 7D, the units of FIG. 7D that is similar to FIG. 7C will not be described again. In FIG. 7D, the third insulation layer INS3 has a sixth contact hole 5G_6*h* to expose the filling structure 530. The first transparent conductive layer 511 is formed on the third insulation layer INS3, and is electrically connected to the filling structure 530 through the sixth contact hole 5G_6*h*.

Figure 7E:
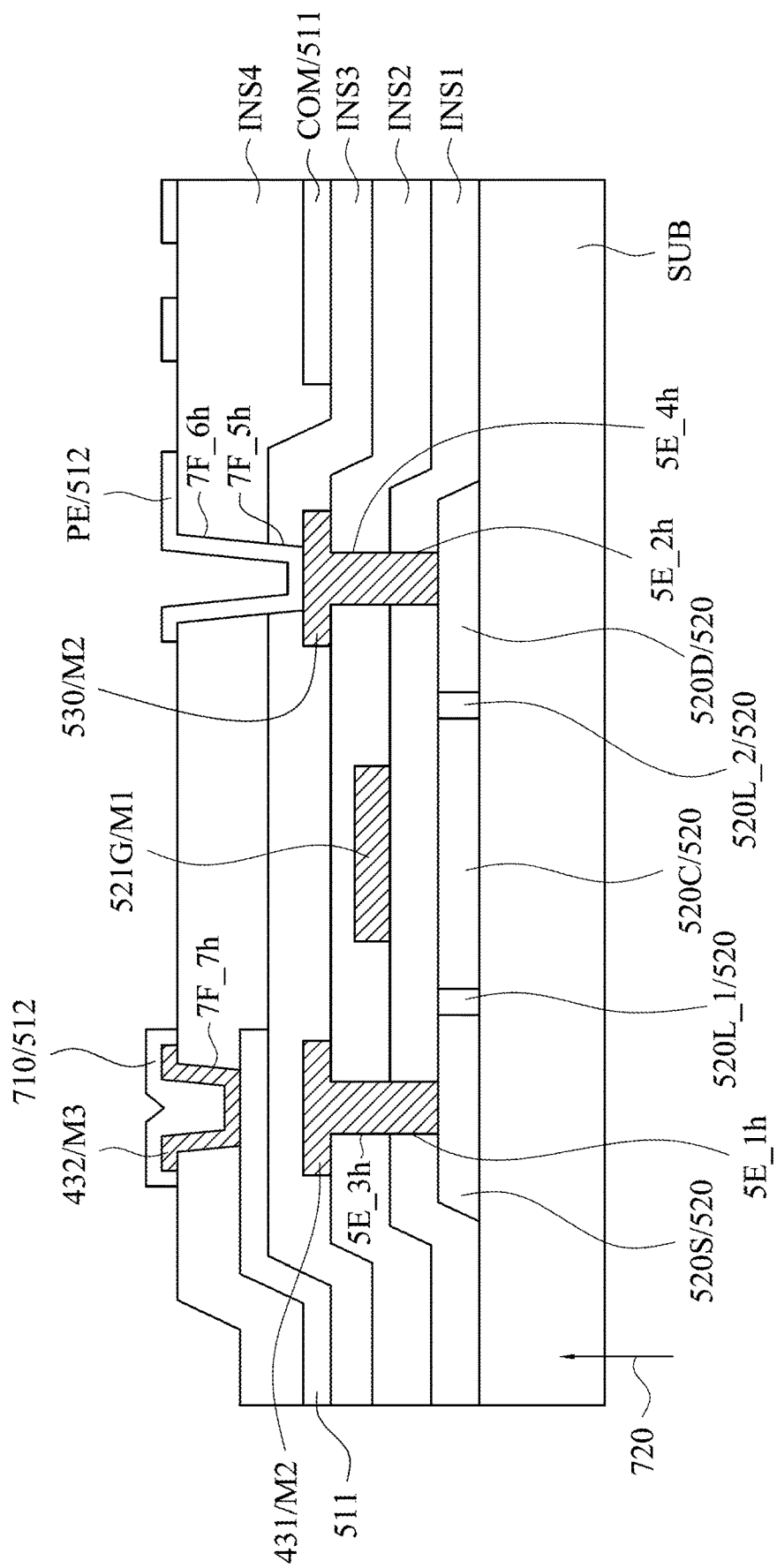

The sub-common electrode COM is formed above the pixel electrode PE in the embodiments of FIG. 7C and FIG. 7D, but the sub-common electrode COM may be formed below the pixel electrode PE in other embodiments. For example, referring to FIG. 7E, the units of FIG. 7E that is similar to FIG. 7C will not be described again. In the embodiment of FIG. 7E, the third insulation layer INS3 has a fifth contact hole 7F_5J to expose the filling structure 530. The first transparent conductive layer 511 is formed on the third insulation layer INS3, and includes the sub-common electrode COM. The fourth insulation layer INS4 is formed on the first transparent conductive layer 511, and has a sixth contact hole 7F_6h and a seventh contact hole 7F_7h. The sixth contact hole 7F_6h corresponds to the fifth contact hole 7F_5J. The seventh contact hole 7F_7h exposes a portion of the first transparent conductive layer 511. The third metal layer M3 is formed on the fourth insulation layer INS4. The touch sensing lines 432 is formed by the third metal layer M3 in the display area. The touch sensing lines 432 is electrically connected to the first transparent conductive layer 511 through the seventh contact hole 7F_7h. The second transparent conductive layer 512 is formed on the fourth insulation layer INS4, and includes the pixel electrode PE and the touch sensing line protection layer 710. The touch sensing line protection layer 710 covers the touch sensing line 432. The pixel electrode PE is electrically connected to the filling structure 530 through the sixth contact hole 7F_6h and the seventh contact hole 7F_7h. The touch sensing line 432 is at least partially overlapped with the data line 431 along the normal vector 720 of the first substrate SUB.

In some embodiments, the channel of the thin film transistor is made of metal oxide such as indium gallium zinc oxide (IGZO). For example, referring to FIG. 7F, the first metal layer M1 is formed on the first substrate SUB. The first metal layer M1 includes the gate 420G of the thin film transistor. The first insulation layer INS1 is formed on the first metal layer M1. The semiconductor layer 420C is formed on the first insulation layer INS1. The semiconductor layer 420C includes metal oxide including indium, gallium, and zinc. The second insulation layer INS2 is formed on the semiconductor layer 420C, and has a first contact hole 5K_1h and a second contact hole 5K_2h to expose the semiconductor layer 420C. The second metal layer M2 is also formed on the second insulation layer INS2. The second metal layer M2 includes the data line 431, the source 420S, the drain 420D, and the touch sensing line 432. The source 420S (i.e. data line 431) is electrically connected to the semiconductor layer 420C through the first contact hole 5K_1h. The drain 420D is electrically connected to the semiconductor layer 420C through the second contact hole 5K_2h. The third insulation layer INS3 is formed on the second metal layer M2, and has a third contact hole 5K_3h to expose the touch sensing line 432 and a fourth contact hole 5K_4h to expose the drain 420D. The first transparent conductive layer 511 is formed on the third insulation layer INS3, and includes the pixel electrode PE which is electrically connected to the drain 420D through the fourth contact hole 5K_4h. The fourth insulation layer INS4 is formed on the third insulation layer INS3, and has a fifth contact hole 5K_5J corresponding to the third contact hole 5K_3h. The second transparent conductive layer 512 is formed on the third insulation layer INS4, and includes the sub-common electrode COM which is electrically connected to the touch sensing line 432 through the fifth contact hole 5K_5J and the third contact hole 5K_3h.

Figure 7F:
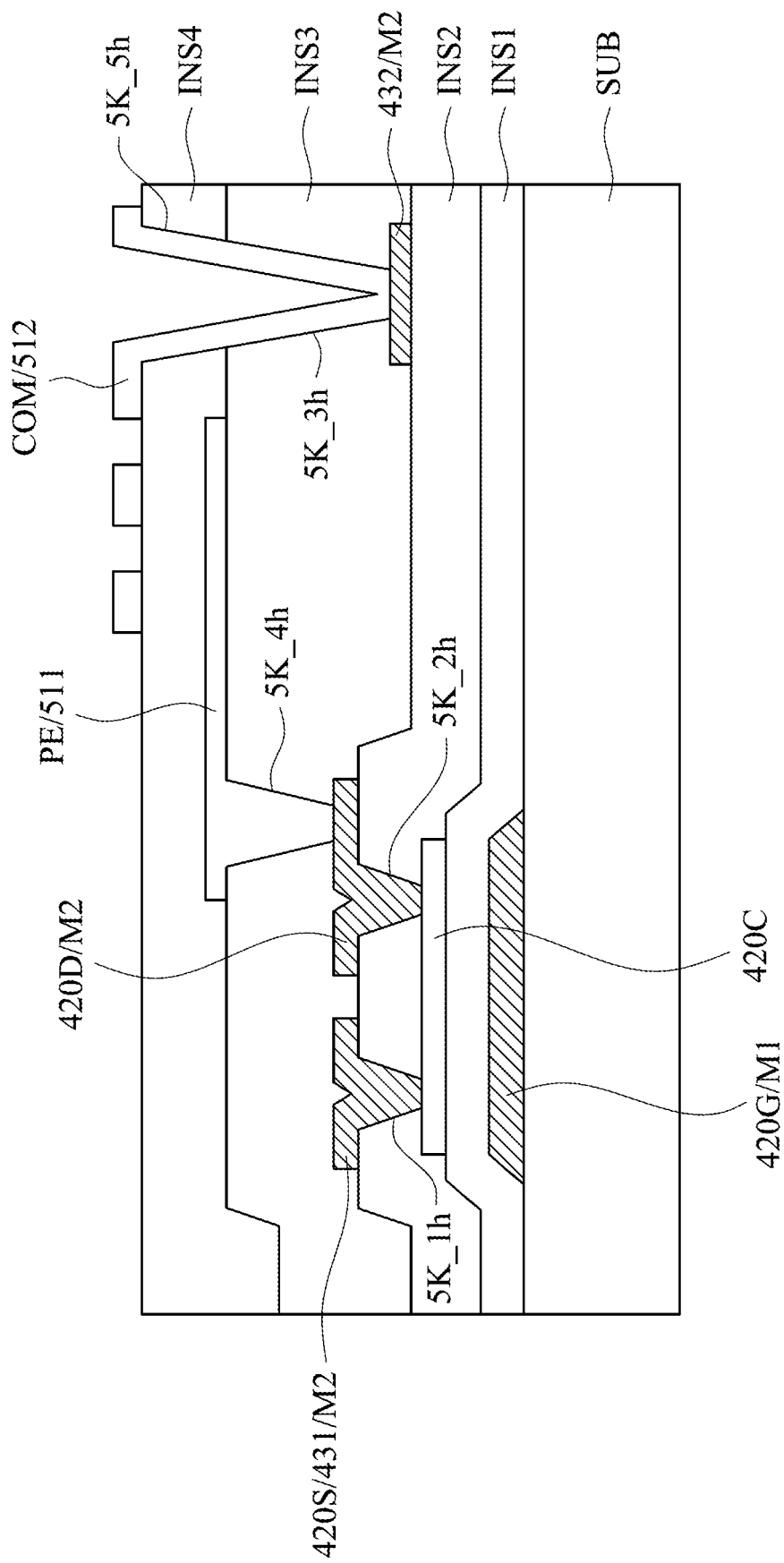
Figure 7G:
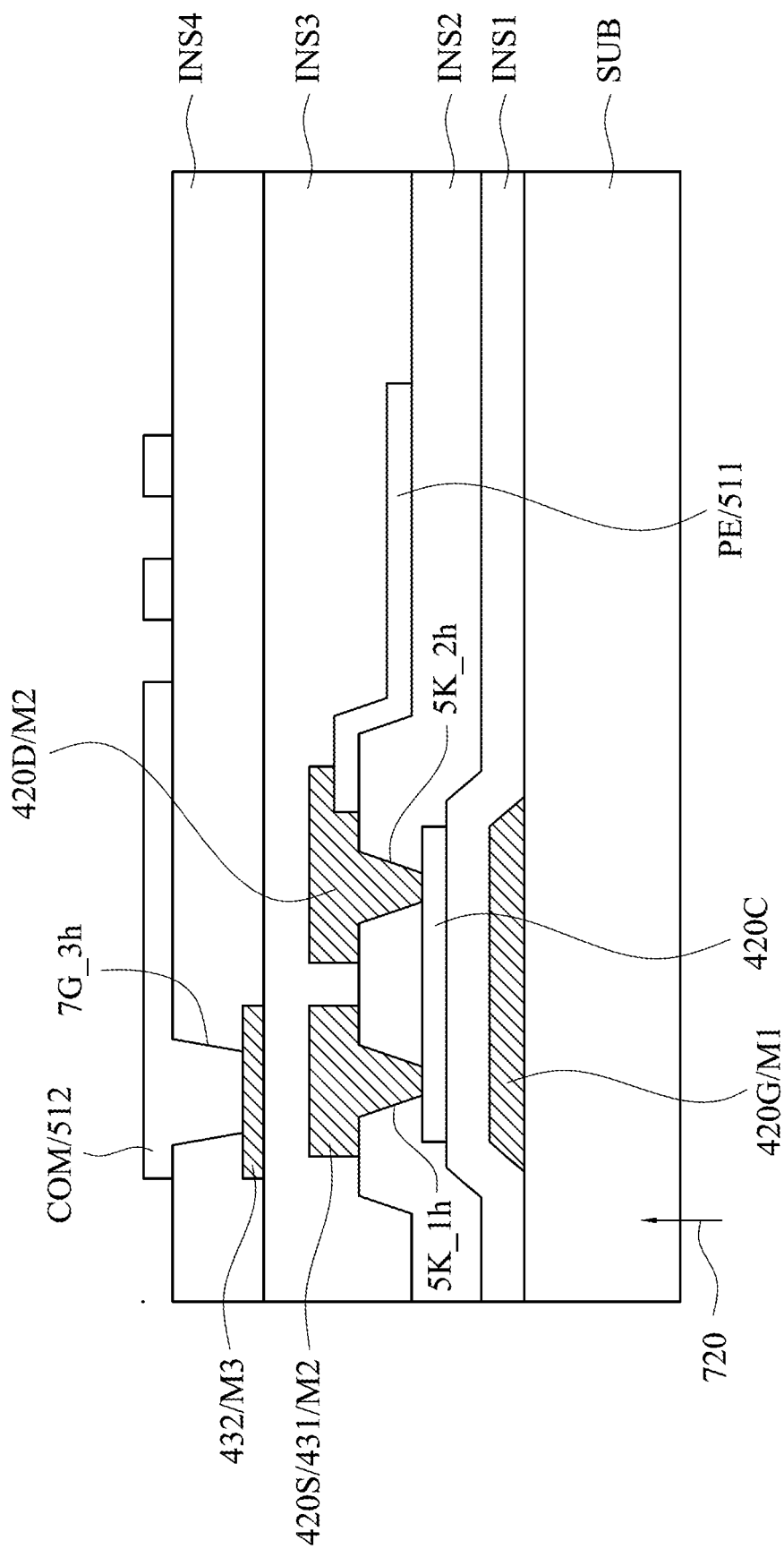

The sub-common electrode COM is formed above the pixel electrode PE in the embodiment of FIG. 7F, but the sub-common electrode COM may be formed below the pixel electrode PE in other embodiments. For example, referring to FIG. 7G, the units of FIG. 7G that is similar to FIG. 7F will not be described again. In FIG. 7G, the pixel electrode PE is formed on the second insulation layer INS2. The second metal layer M2 is formed on the second insulation layer INS2 to form the source 420S, the drain 420D, and the data line 431. The source 420S and the drain 420D are electrically connected to the semiconductor layer 420C through the first contact hole 5K_1h and the second contact hole 5K_2h respectively. The drain 420D is electrically connected to the pixel electrode PE. The third insulation layer INS3 is formed on the second metal layer M2. The third metal layer M3 is formed on the third insulation layer INS3. The touch sensing line 432 is formed by the third metal layer M3 in the display area. The fourth insulation layer INS4 is formed on the third metal layer M3, and has a third contact hole 7G_3h to expose the touch sensing line 432. The sub-common electrode COM is formed on the fourth insulation layer INS4. The sub-common electrode COM is electrically connected to the touch sensing line 432 through the third contact hole 7G_3h. The touch sensing line 432 is at least partially overlapped with the data line 431 along the normal vector 720 of the in-cell touch display panel.

Referring to FIG. 4, the touch sensing line 432 includes a first portion 441 and a second portion 442. The second portion 442 is formed by the third metal layer M3, but the first portion 441 may be formed by the first metal layer, the second metal layer or the third metal layer. A connection structure 440 is disposed in the signal line transferring area 103 for electrically connecting the first portion 441 to the second portion 442. Multiple embodiments are provided below.

Figure 8A:
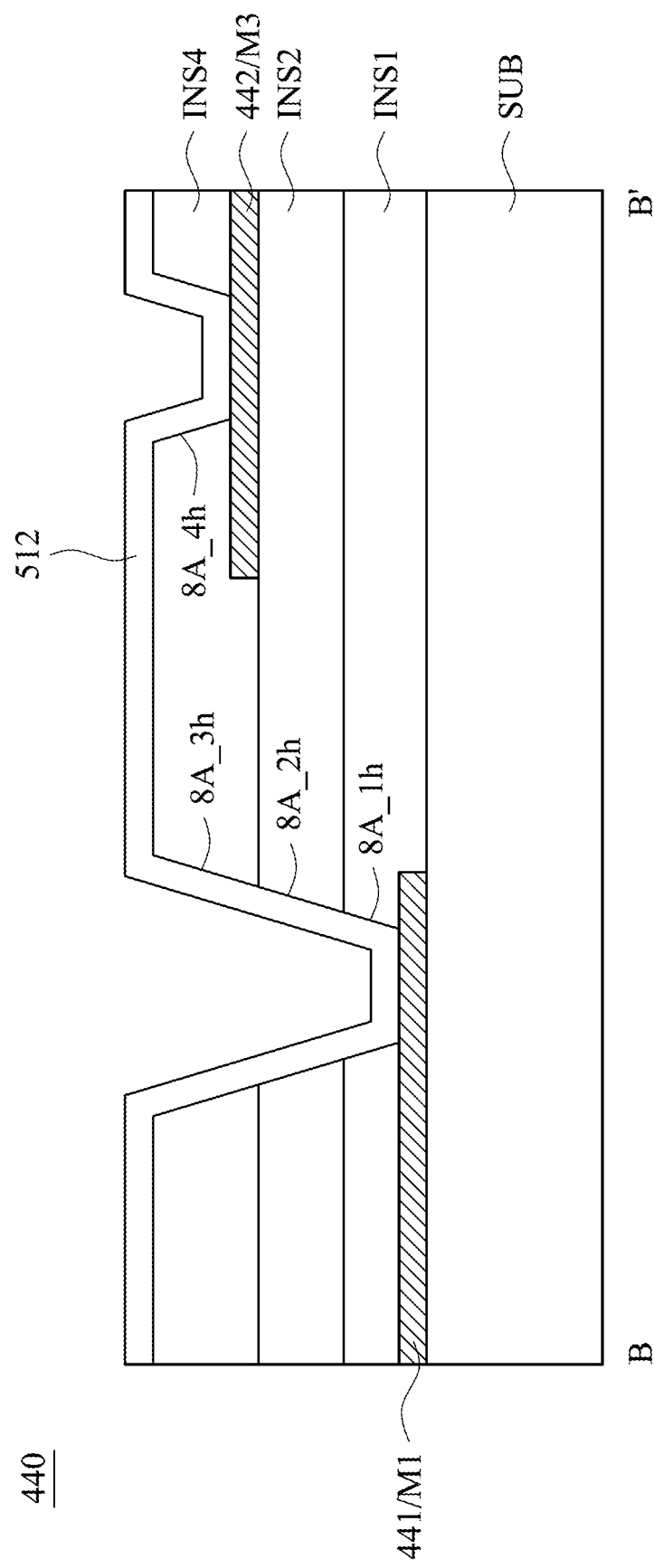
FIG. 8A to FIG. 8C are diagrams illustrating cross-sectional views of the connection structure 440 along a cross-sectional line BB' of FIG. 4.

FIG. 8A is a diagram illustrating a cross-sectional view of the connection structure 440 along a cross-sectional line BB' of FIG. 4. The first portion 441 is formed in the first metal layer M1 in the embodiment of FIG. 8A. To be specific, the first portion 441 is formed on the substrate SUB. The first insulation layer INS1 is formed on the first metal layer M1, and includes a first contact hole 8A_1h to expose the first portion 441. The second insulation layer INS2 is formed on the first insulation layer INS1, and includes a second contact hole 8A_2h which is corresponding to the first contact hole 8A_1h. The second portion 442 is formed on the second insulation layer INS2. The fourth insulation layer INS4 is formed on the third metal layer M3 and the second insulation layer INS2, and includes a third contact hole 8A_3h and a fourth contact hole 8A_4h. The third contact hole 8A_3h is corresponding to the second contact hole 8A_2h, and the fourth contact hole 8A_4h exposes the second portion 442. The second transparent conductive layer 512 is formed on the fourth insulation layer INS4, and is electrically connected to the second portion 442 through the fourth contact hole 8A_4h, and is electrically connected to the first portion 441 through the first contact hole 8A_1h, the second contact hole 8A_1h and the third contact hole 8A_3h. As a result, the first portion 441 is electrically connected to the second portion 442.

Figure 8B:
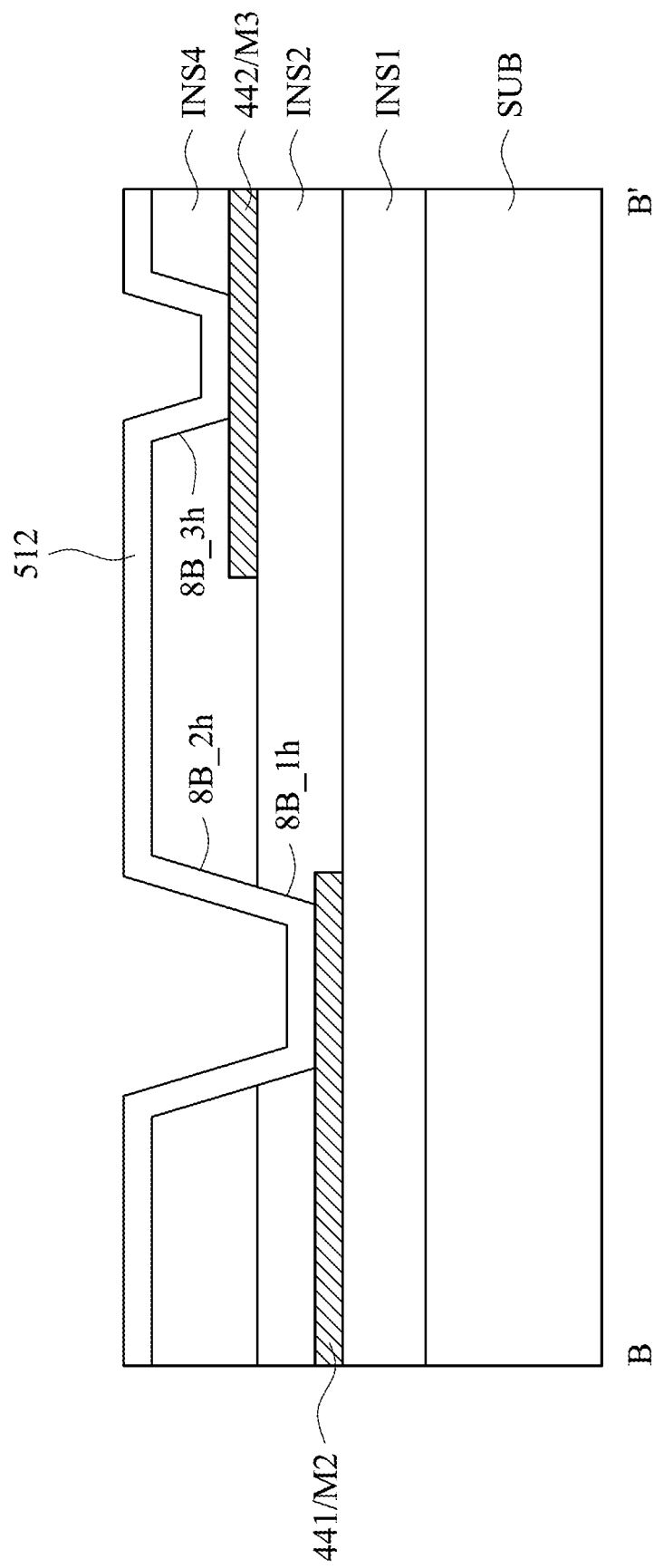

FIG. 8B is a diagram illustrating a cross-sectional view of the connection structure 440 along a cross-sectional line BB' of FIG. 4. In the embodiment of FIG. 8B, the first portion 441 is formed in the second metal layer M2. To be specific, the first insulation layer INS1 is formed on the substrate SUB. The first portion 441 is formed on the first insulation layer INS1. The second insulation layer INS2 includes a first contact hole 8B_1h to expose the first portion 441. The second portion 442 is formed on the second insulation layer INS2. The fourth insulation layer INS4 is formed on the third metal layer M3, and includes a second contact hole 8B_2h and a third contact hole 8B_3h. The second contact hole 8B_2h corresponds to the first contact hole 8B_1h. The third contact hole 8B_3h exposes the second portion 442. The second transparent conductive layer 512 is electrically connected to the second portion 442 through the third contact hole 8B_3h, and is electrically connected to the first portion 441 through the first contact hole 8B_1h and the second contact hole 8B_2h.

Figure 8C:
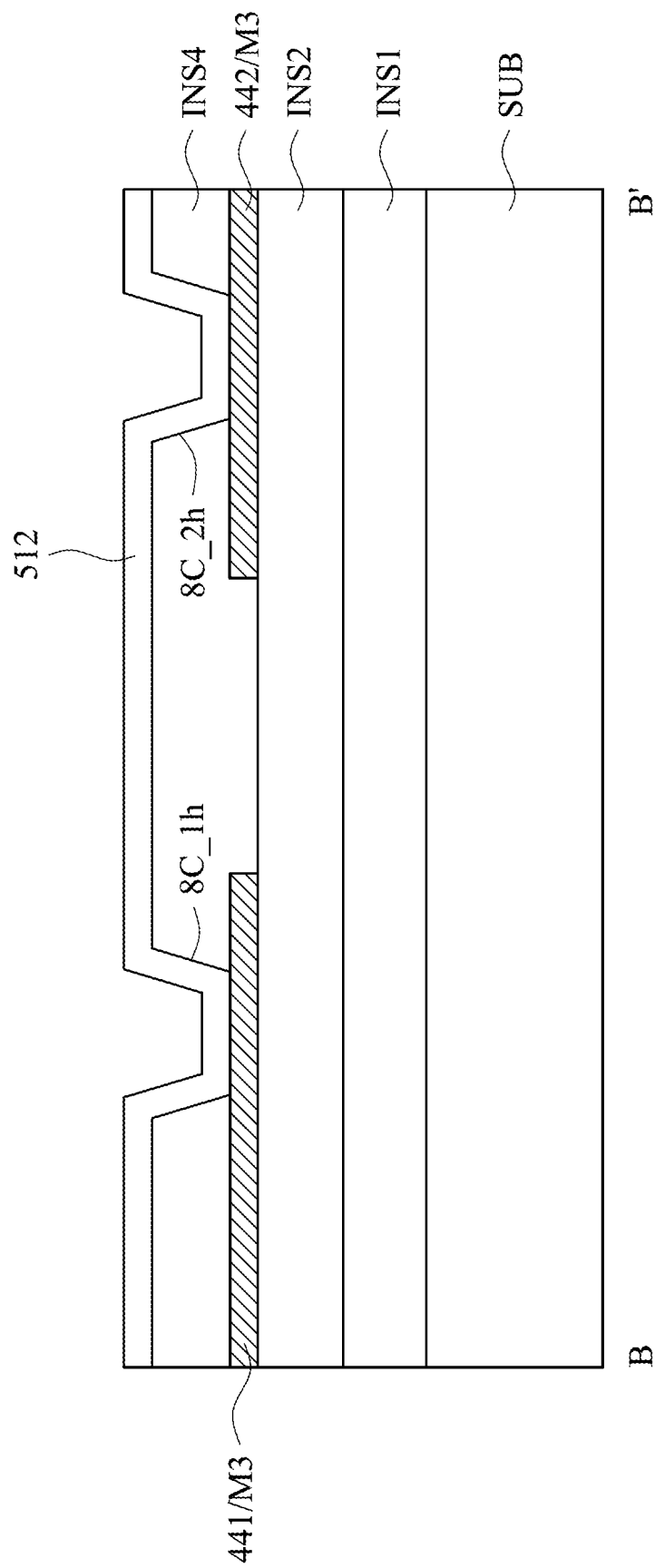

FIG. 8C is a diagram illustrating a cross-sectional view of the connection structure 440 along a cross-sectional line BB' of FIG. 4. In the embodiment of FIG. 8C, the first portion 441 is formed in the third metal layer M3. To be specific, the first portion 441 and the second portion 442 are formed on the second insulation layer INS2. The fourth insulation layer INS4 includes a first contact hole 8C_1h to expose the first portion 441, and a second contact hole 8C_2h to expose the second portion 442. The second transparent conductive layer 512 is electrically connected to the first portion 441 through the first contact hole 8C_1h, and is electrically connected to the second portion 442 through the second contact hole 8C_2h.

Figure 8D:
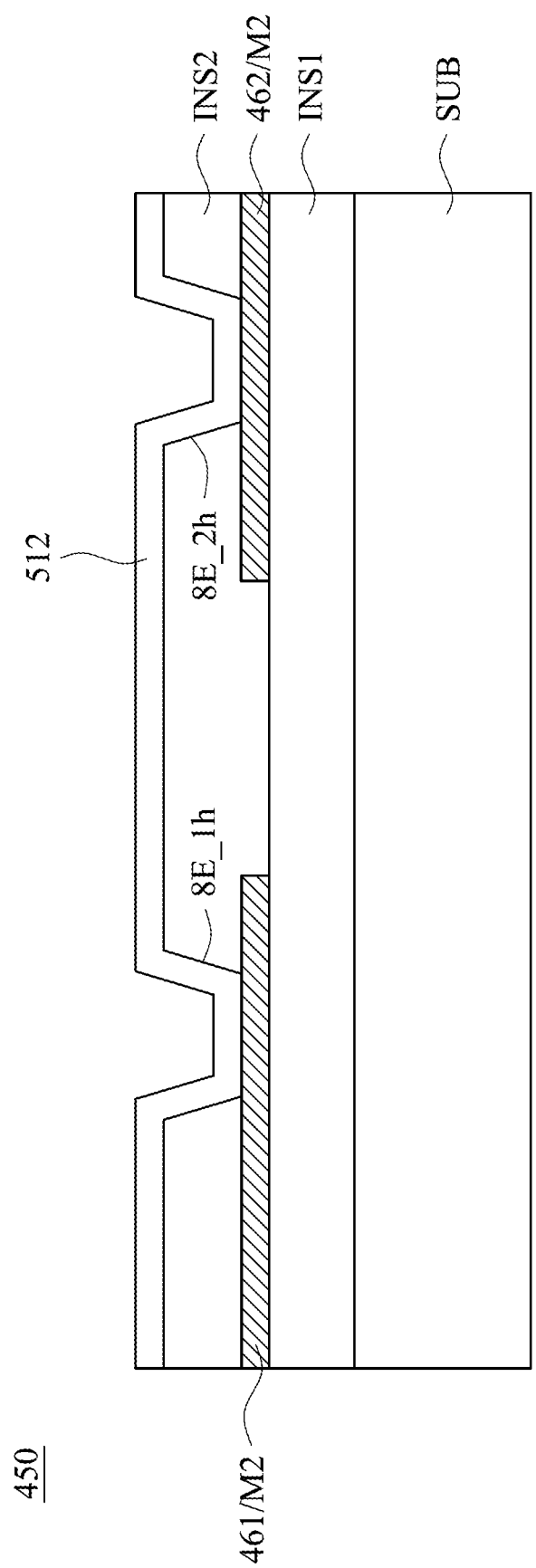
FIG. 8D and FIG. 8E are cross-sectional views of the connection structure in accordance with another embodiment.

Referring to FIG. 4, the data line 431 has a first portion 461 and a second portion 462. A connection structure 450 is electrically connected to the first portion 461 and the second portion 462. The second portion 462 is formed by the second metal layer, and the first portion 461 is formed by the first metal layer or the second metal layer. For example, referring to FIG. 8D, the first insulation layer INS1 is formed on the first substrate SUB. The second metal layer M2 is formed on the first insulation layer INS1, and includes the first portion 461 and the second portion 462. The second insulation layer INS2 is formed on the second metal layer M2, and includes a first contact hole 8E_1 to expose the first portion 461 and a second contact hole 8E_2h to expose the second portion 462. The second transparent conductive layer 512 is formed on the second insulation layer INS2, and is electrically connected to the first portion 461 through the first contact hole 8E_1, and is electrically connected to the second portion 462 through the second contact hole 8E_2h.

Figure 8E:
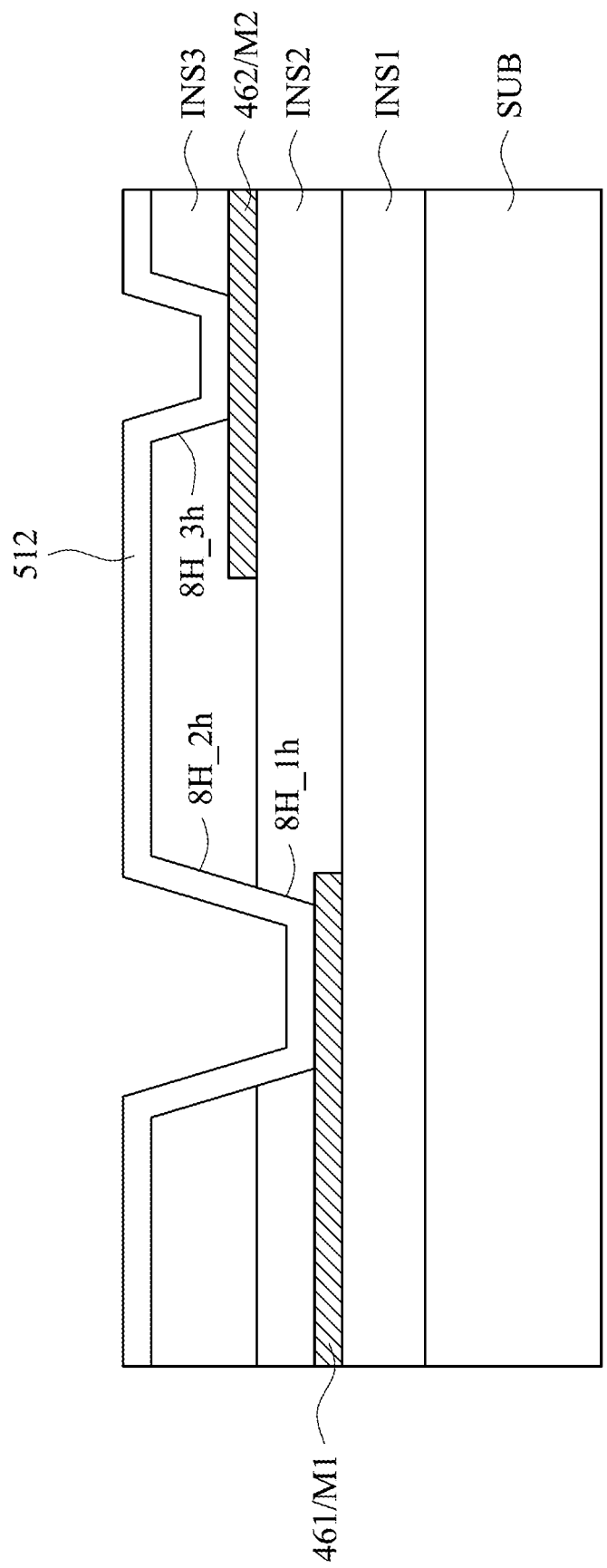

On the other hand, the embodiment of FIG. 8E may be applied to the embodiments of FIG. 7C to FIG. 7E. To be specific, the first insulation layer INS1 is formed on the first substrate SUB. The first metal layer M1 includes the first portion 461, and is formed on the first insulation layer INS1. The second insulation layer INS2 is formed on the first metal layer M1, and has a first contact hole 8H_1h to expose the first portion 461. The second metal layer M2 includes the second portion 462, and is formed on the second insulation layer INS2. The third insulation layer INS3 is formed on the second metal layer M2, and has a second contact hole 8H_2h corresponding to the first contact hole 8H_1h and a third contact hole 8H_3h to expose the second portion 462. The second transparent conductive layer 512 is formed on the third insulation layer INS3, and is electrically connected to the first portion 461 through the second contact hole 8H_2h and the first contact hole 8H_1h, and is electrically connected to the second portion 462 through the third contact hole 8H_3h.

The embodiments of FIG. 8A to FIG. 8D may be applied to the examples of FIG. 5A and FIG. 5B, in which the third insulation layer INS3 is not formed in FIG. 8A to FIG. 8D because the third insulation layer INS3 is an organic insulation layer in some embodiments. The thickness of the organic insulation layer is generally large, and thus the third insulation layer INS3 is not formed in the connection structure to avoid deep contact hole.

Referring to FIG. 4, in some embodiments, the data line 431 is transferred to the first metal layer or the third metal layer, or remains in the second metal layer by a connection structure 450. The connection structure 450 is similar to the connection structure 440, and both of them electrically connect different metal layers through a transparent conductive layer. However, people in the art should be able to implement the connection structure 450 according to the disclosure in FIG. 8A to FIG. 8C. On the other hand, in the embodiment of FIG. 8C, although both of the first part 441 and the second part 442 are formed in the third metal layer M3, the disposition of the connection structure 440 can achieve the impedance matching between the touch sensing line 432 and the data line 431.

Referring to FIG. 6, in the embodiment of FIG. 6, the touch sensing line 432 has a first portion 611 and a second portion 612. The second portion 612 is formed by the third metal layer, but the first portion 611 is formed by the first metal layer, second metal layer, or the third metal layer. The connection structure 610 is disposed in the non-display area 102 for electrically connecting the first portion 611 and the second portion 612. Multiple embodiments will be provided to describe the connection structure 610.

Figure 9A:
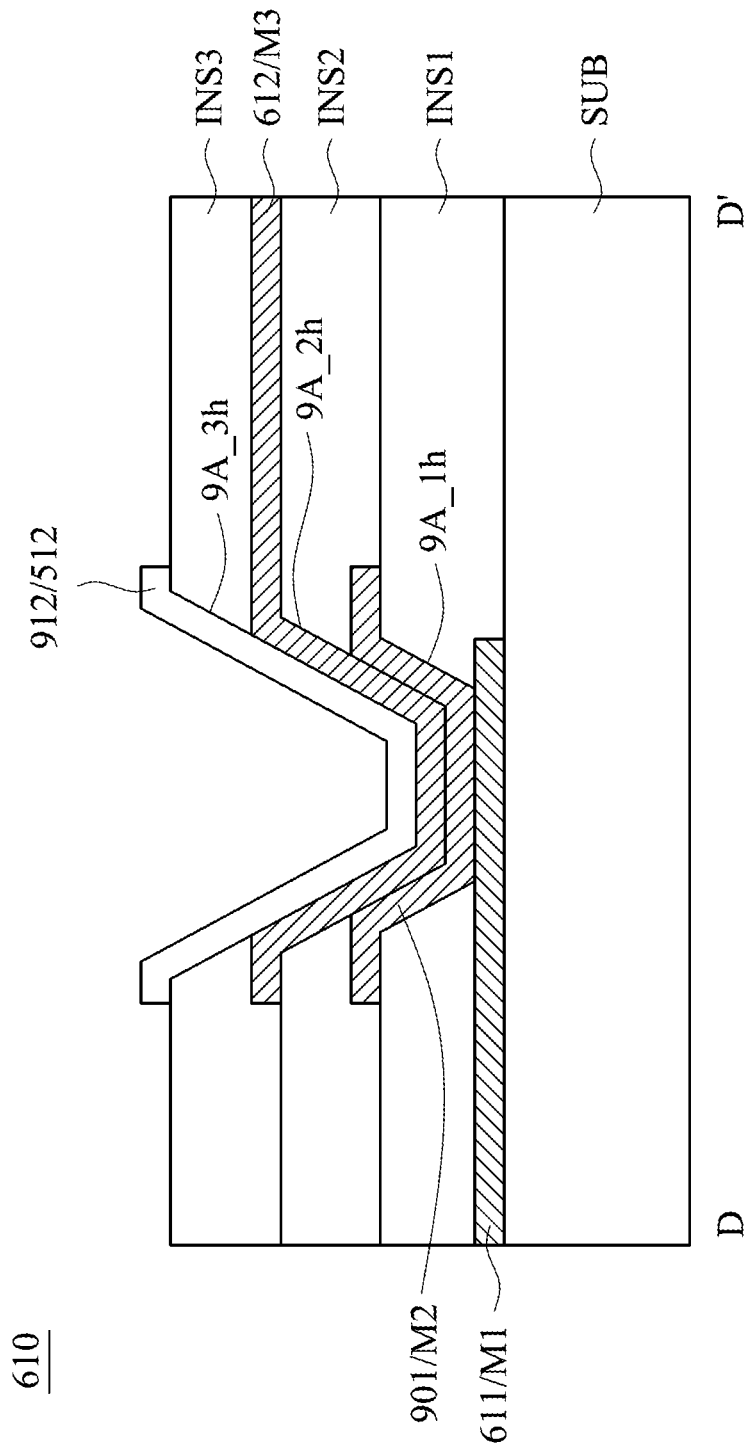
FIG. 9A to FIG. 9C are cross-sectional views of the connection structure 610 along a cross-sectional line DD' of FIG. 6.

Referring to FIG. 6 and FIG. 9A, FIG. 9A is a cross-sectional view of the connection structure 610 along a cross-sectional line DD' of FIG. 6. In the embodiment of FIG. 9A, the first portion 611 is formed by the first metal layer M1. To be specific, the first portion 611 of the first metal layer M1 is formed on the first substrate SUB. The first insulation layer INS1 is formed on the first metal layer M1, and has a first contact hole 9A_1h to expose the first portion 611. A metal electrode 901 formed by the second metal layer M2 is electrically connected to the first portion 611 through the first contact hole 9A_1h. The metal electrode 901 is not electrically connected to the data lines, the source, or the drain of the second metal layer M2. The second insulation layer INS2 is formed on the metal electrode 901. The second insulation layer INS2 has a second contact hole 9A_2h to expose the metal electrode 901. The second portion 612 of the third metal layer M3 is formed on the second insulation layer INS2, and is electrically connected to the metal electrode 901 through the second contact hole 9A_2h. The fourth insulation layer INS4 is formed on the third metal layer M3. The fourth insulation layer INS4 has a third contact hole 9A_3h to expose the second portion 612. An electric connecting portion 912, which is formed by the second transparent conductive layer 512, is electrically connected to the second portion 612 through the third contact hole 9A_3h. The electric connecting portion 912 is not electrically connected to the pixel electrode or the sub-common electrode in the same second transparent conductive layer 512. As a result, the second portion 612 is electrically connected to the first portion 611 through the metal electrode 901. The function of the metal electrode 901 is to avoid deep contact hole configured in the connection structure 610, and the electric connecting portion 912 is configured to prevent the second portion 612 from the erosion of subsequent processes.

Figure 9B:
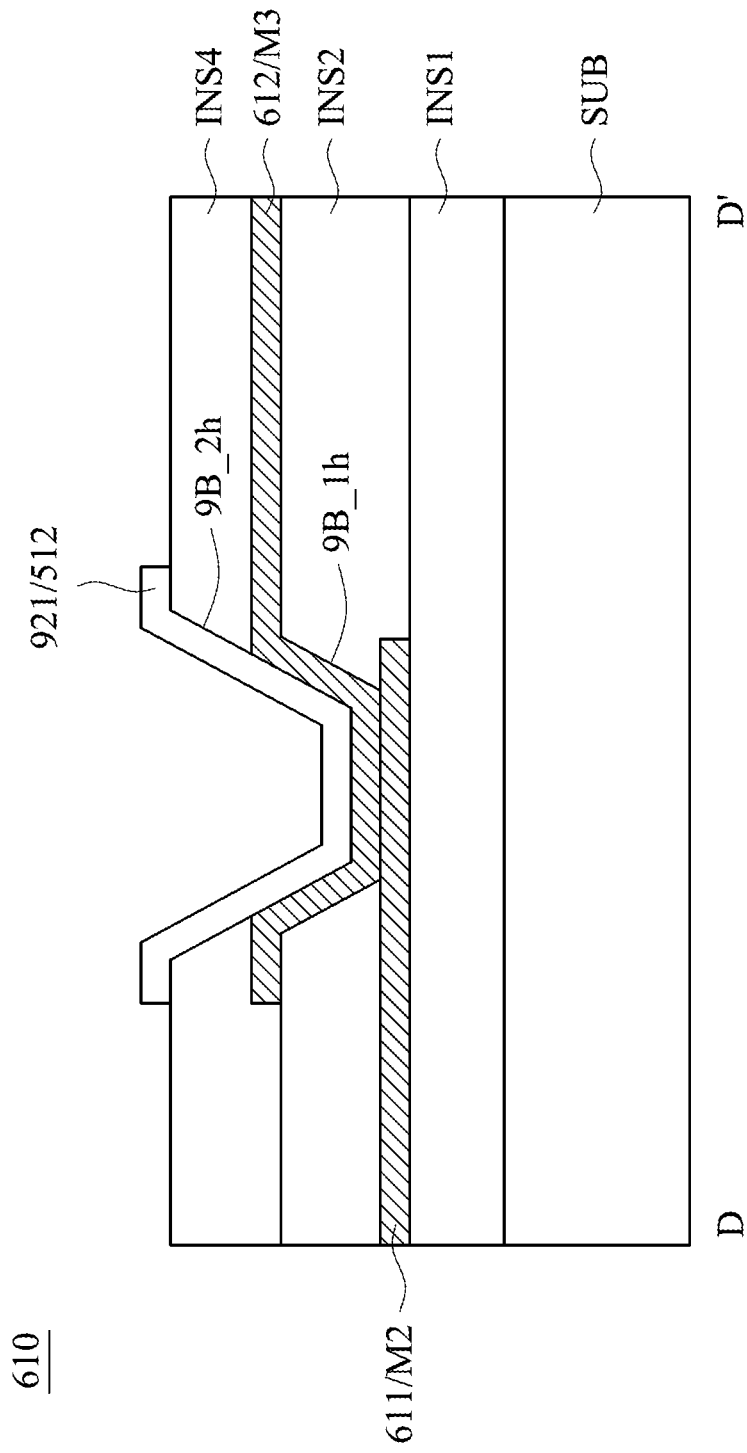

Referring to FIG. 6 and FIG. 9B, in the embodiment of FIG. 9B, the first portion 611 is formed by the second metal layer M2. To be specific, the first insulation layer INS1 is formed on the first substrate SUB. The first portion 611 is formed on the first insulation layer INS1. The second insulation layer INS2 has a first contact hole 96_1h to expose the first portion 611. The second portion 612 is formed on the second insulation layer INS2, and is electrically connected to the first portion 611 through the first contact hole 9B_1h. The fourth insulation layer INS4 has a second contact hole 9B_2h to expose the second portion 612. An electric connecting portion 921, which is formed by the second transparent conductive layer 512, is electrically connected to the second portion 612 through the second contact hole 96_2h. The electric connecting portion 921 is not electrically connected to the pixel electrode or the sub-common electrode in the same second transparent conductive layer 512. The electric connecting portion 921 is configured to prevent the second portion 612 from the erosion of subsequent processes.

Figure 9C:
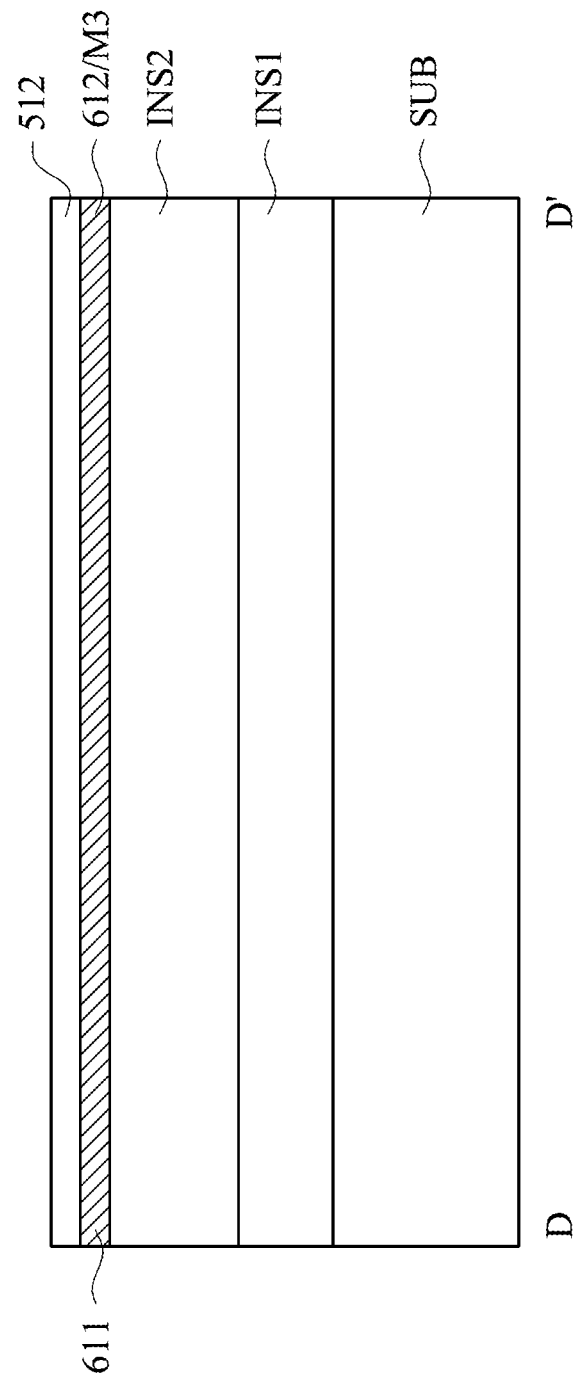

Referring to FIG. 6 and FIG. 9C, in the embodiment of FIG. 9C, the first portion 611 and the second portion 612 are both formed by the third metal layer M3. As shown in FIG. 9C, the first insulation layer INS1, the second insulation layer INS2, the third metal layer M3, and the second transparent conductive layer 512 are sequentially formed on the first substrate SUB. The second transparent conductive layer 512 is configured to prevent the third metal layer M3 form the erosion of subsequent processes.

In the embodiment of FIG. 6, a connection structure 620 is disposed on the data line 431 for transferring data line 431 to the first metal layer M1 or the third metal layer M3, or keep in the second metal layer M2. People in the related art should be able to design the connection structure 620 based on the description of the connection structure 610. The data line 431 and the touch sensing line 432 are in different metal layers after the transferring of the connection structures 610 and 620.

Referring to FIG. 4 and FIG. 6, the connection structure 440 is used in FIG. 4, and the connection structure 610 is used in FIG. 6 in the embodiments described above, but the invention is not limited thereto. The connection structure 440 may also be applied to the embodiment of FIG. 6, and the connection structure 610 may be applied to the embodiment of FIG. 4. On the other hand, the pixel electrode may be disposed above the common electrode, and vice versa. In other words, there are three options in these embodiments: whether the touch sensing line 432 covers the data line 431; whether the pixel electrode is above the sub-common electrode; and whether the connection structure 440 or the connection structure 610 is used. These options can be arbitrarily chosen. In addition, whether the data line 431 and the touch sensing line 432 are transferred to the first metal layer M1, the second metal layer M2 or the third metal layer M3 is not limited in the invention. In a preferred embodiment, the data line 431 and the touch sensing line 432 are formed in different metal layers in the non-display area 102, and thus the pitch between them could be reduced.

The signal line transferring area 103 exists in the embodiments above, and the connection structure therein is used to transfer the data lines/touch sensing lines to different metal layers. However, in some embodiments, if the resolution requirement of the panel is relatively lower, then the function of the connection structure may be implemented in the touch pads and/or display pads.

The self-conductive capacitance is used for sensing in the in-cell touch display panel in the specification. That is, a transmitter (TX) sensing signal and a receiver (RC) sensing signal is transmitted to the touch electrodes and the touch pads through the touch sensing lines. The metal layer in the specification may be a single layer of metal including aluminum, copper, titanium, tungsten, etc. or a composite metal layer including molybdenum/aluminum/molybdenum, titanium/aluminum/titanium, titanium/copper/titanium or other suitable composite metal layer, which is not limited in the invention. On the other hand, the insulation layer in the specification may be silicon nitride, silicon oxide, silicon oxynitride or other suitable insulation layer. In addition, a single insulation layer in the figures may include more than one stacked insulation layers with different material. Moreover, some of the contact holes or openings have vertical sidewalls, and some of the contact holes or openings have tapered sidewalls, but it should be appreciated that all contact holes of openings have tapered sidewalls in practice. The figures are just for schematic illustration. When "contact hole to expose" is described, it means to partially expose the component beneath or to completely expose the component beneath, which is not limited in the invention.

Figure 10A:
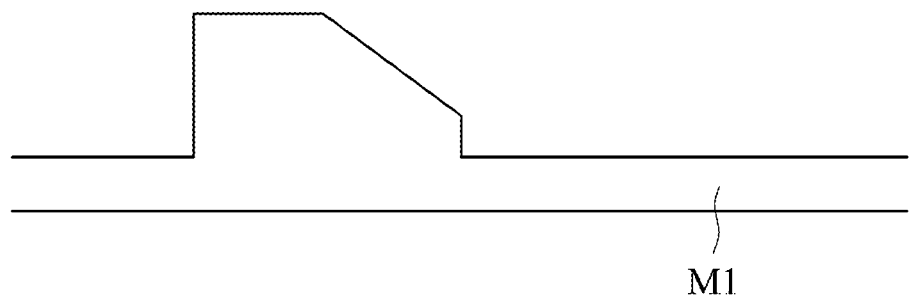
FIG. 10A to FIG. 10G are top views of intermediary stages for manufacturing pixel stricture in accordance with an embodiment.
Figure 10B:
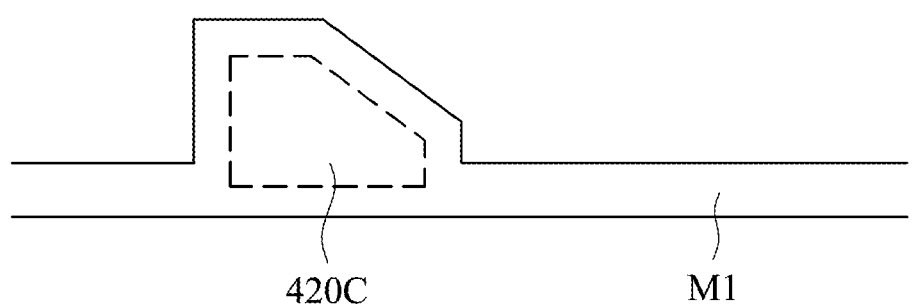

Herein, examples are provided to describe the method for manufacturing the in-cell touch display panel. FIG. 10A to FIG. 10G are top views of intermediary stages for manufacturing pixel stricture in accordance with an embodiment. Referring to FIG. 4, FIG. 5A and FIG. 10A, the first metal layer M1 is first formed. Referring to FIG. 4, FIG. 5A and FIG. 10B, the first insulation layer INS1 (not shown in FIG. 4 and FIG. 10B) is formed on the first metal layer M1, and then the semiconductor layer 420C and ohmic contacts (not shown) on the semiconductor layer 420C are formed. The first insulation layer INS1 may be silicon nitride, silicon oxide or other suitable insulation layer. The semiconductor layer 420C may be a-si, polysilicon, or metal oxide, which is not limited in the invention. The ohmic contacts may be N-type doped polysilicon or metal oxide with high conductivity for electrically connecting the semiconductor layer 420C and the subsequent second metal layer M2.

Figure 10C:
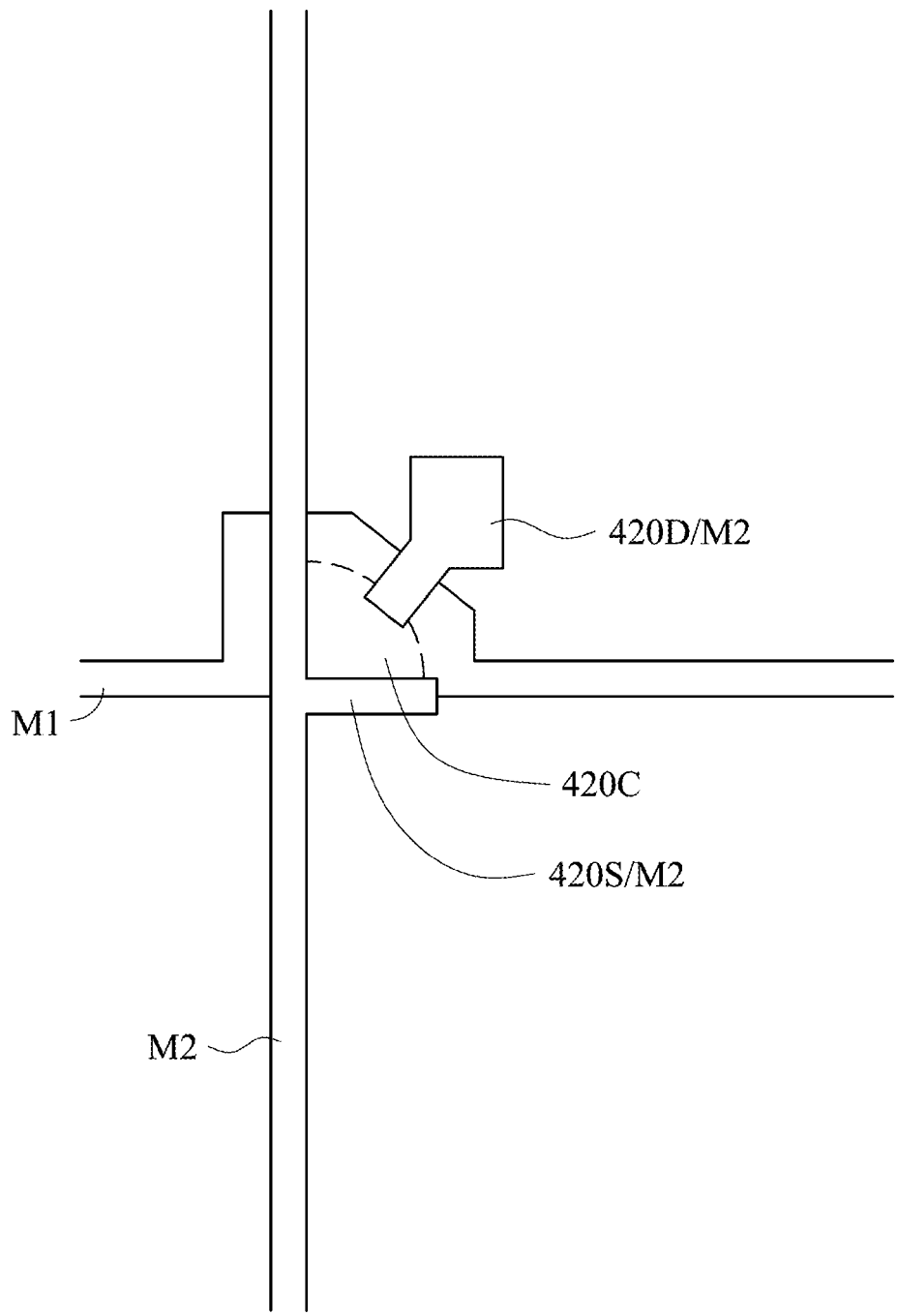

Referring to FIG. 4, FIG. 5A and FIG. 10C, the second metal layer M2 is formed. The second metal layer M2 includes the drain 420D and the source 420S. Next, the second insulation layer INS2 and the third insulation layer INS3 are formed on the second metal layer M2. For simplification, the second insulation layer INS2 and the third insulation layer INS3 are not shown in FIG. 10C. The second insulation layer INS 2 may be silicon nitride, silicon oxide, silicon oxynitride, or other suitable insulation layer. The third insulation layer INS3 may be an organic insulation layer.

Figure 10D:
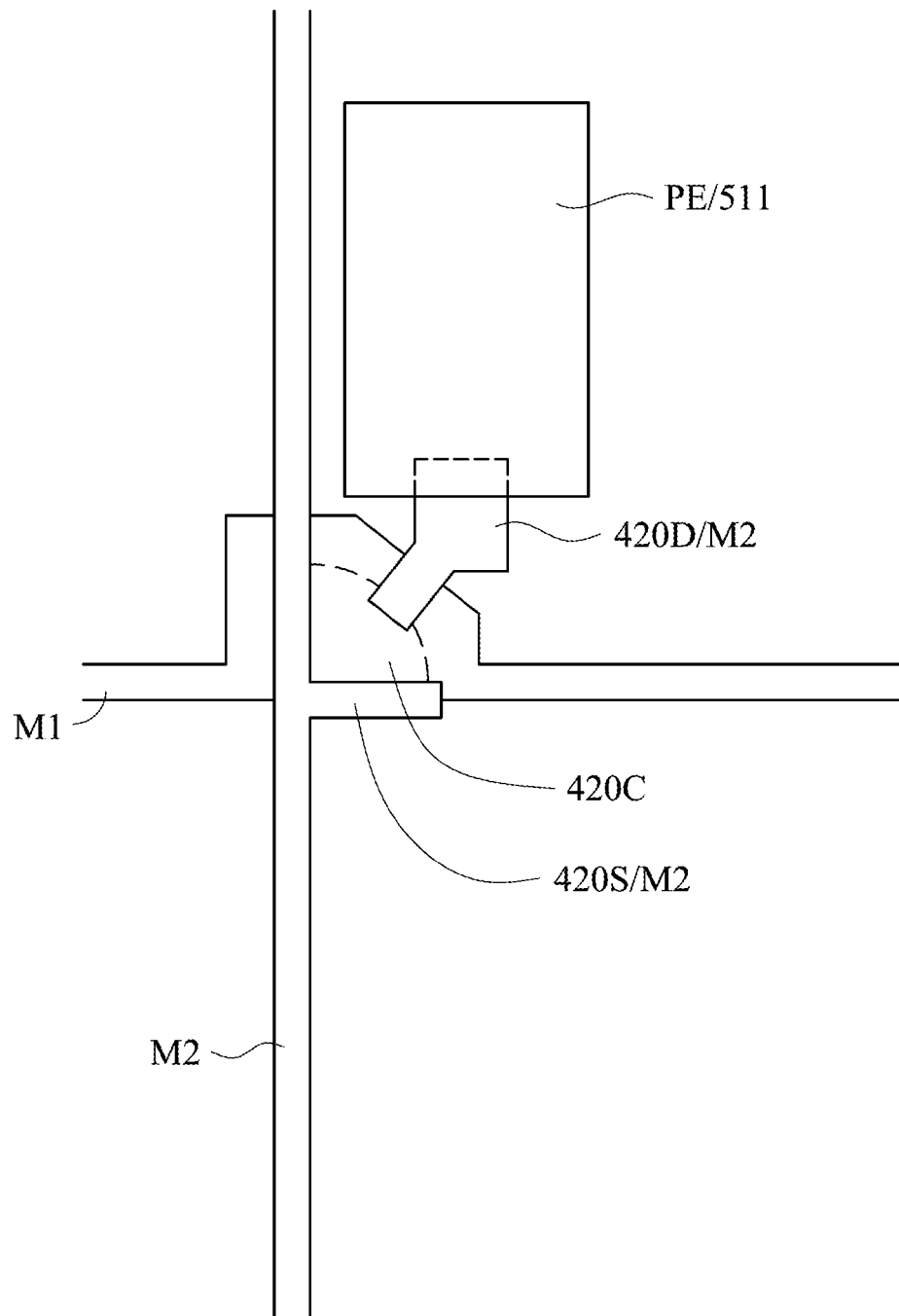

Referring to FIG. 4, FIG. 5A and FIG. 10D, the first transparent conductive layer 511 is formed. The first transparent conductive layer 511 includes the pixel electrode PE. The first transparent conductive layer 511 may be indium tin oxide (ITO), indium zinc oxide (IZO), antimony tin oxide (ATO), fluorine tin oxide (FTO) or other conductive and transparent material.

Figure 10E:
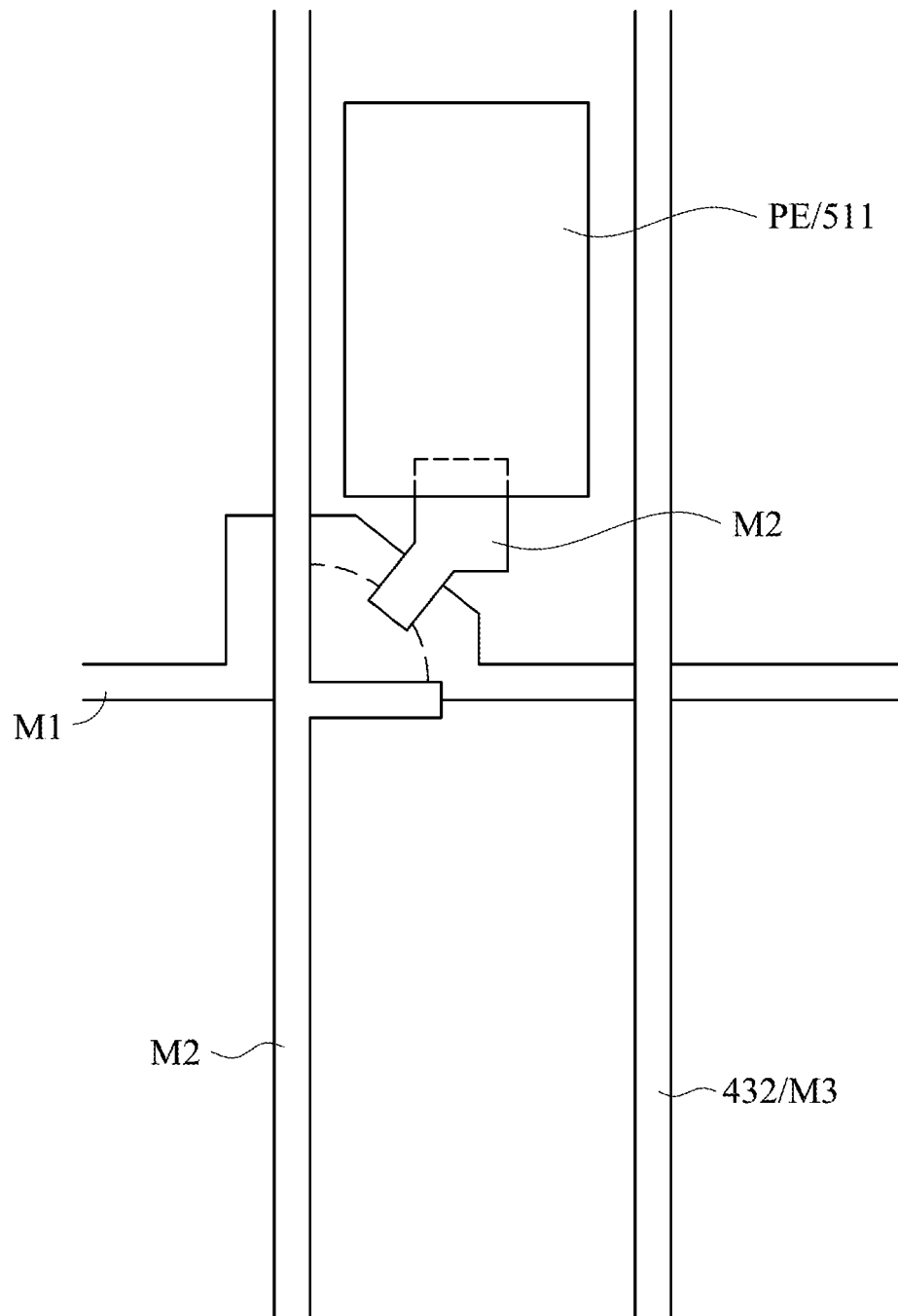
Figure 10F:
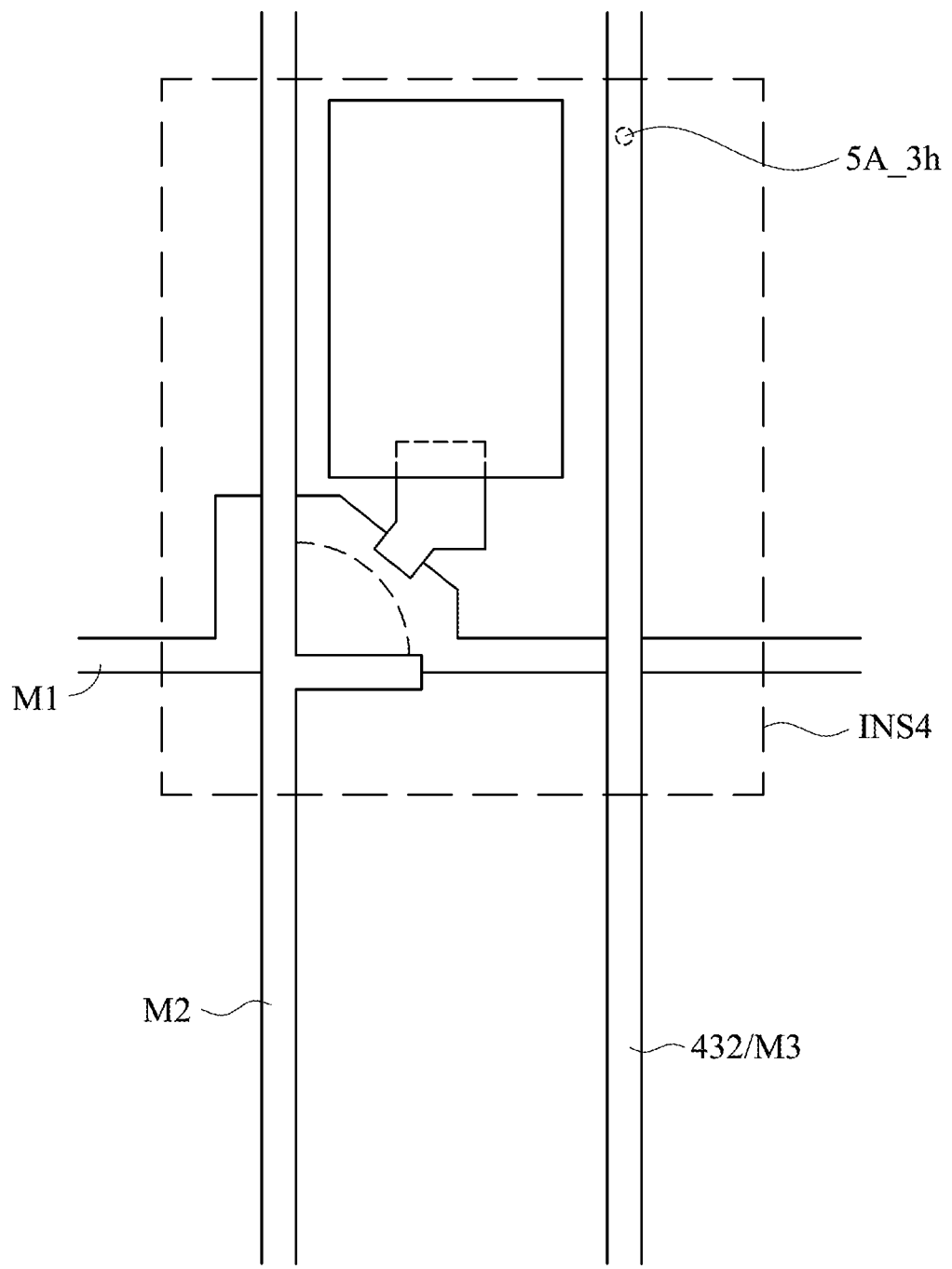

Referring to FIG. 4, FIG. 5A and FIG. 10E, the third metal layer M3 is formed. The third metal layer M3 includes the touch sensing line 432. Referring to FIG. 4, FIG. 5A, and FIG. 10F, the fourth insulation layer INS4 is formed on the third metal layer M3. The fourth insulation layer INS4 has a contact hole 5A_3h to expose a portion of the touch sensing line 432. The fourth insulation layer INS4 may be silicon nitride, silicon oxide, silicon oxynitride, or other suitable insulation layer.

Figure 10G:
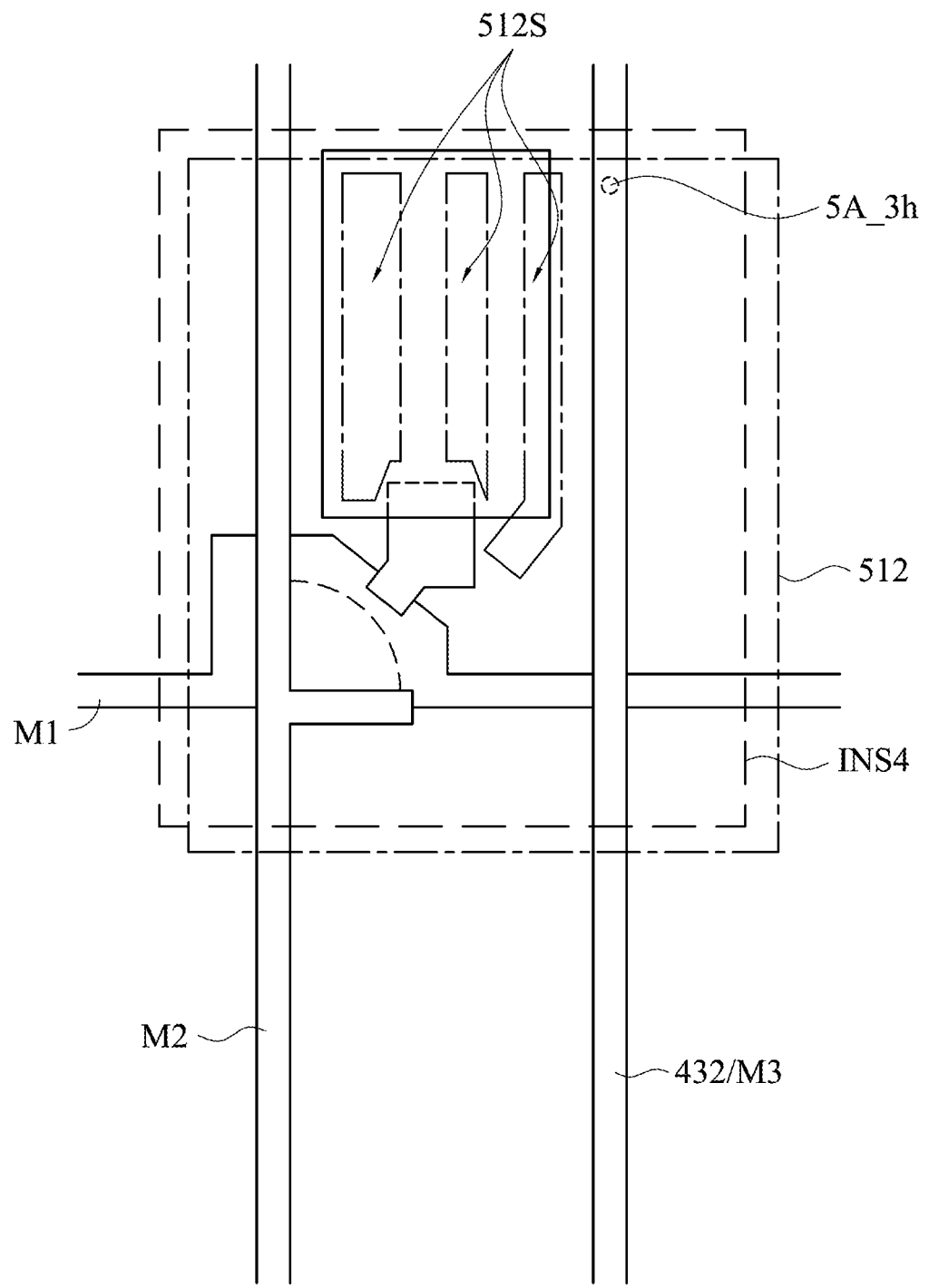

Referring to FIG. 4, FIG. 5A and FIG. 10G, the second transparent conductive layer 512 is formed on the fourth insulation layer INS4. The second transparent conductive layer 512 is electrically connected to the touch sensing line 432 through the contact hole 5A_3. The second transparent conductive layer 512 is taken as the sub-common electrode COM in the pixel structure, and it includes at least one slits 512S. The second transparent conductive layer 512 may be indium tin oxide (ITO), indium zinc oxide (IZO), antimony tin oxide (ATO), fluorine tin oxide (FTO) or other conductive and transparent material.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An in-cell touch display panel having a display area and a non-display area, wherein the in-cell touch display panel comprises:
   a first substrate;
   a plurality of gate lines and a plurality of data lines that are intersected with each other on the first substrate;
   a plurality of touch sensing lines disposed on the first substrate, wherein the touch sensing lines are not spatially connected with the data lines in the display area;
   a plurality of pixel regions disposed in areas of the display area enclosed by the gate lines that are intersected with the data lines, wherein each of the pixel regions has a pixel structure, and each of the pixel structures comprises a pixel electrode formed by a first transparent conductive layer;
   a common electrode formed by a patterned second transparent conductive layer, wherein the common electrode comprises a plurality of touch electrodes in the display area, each of the touch electrodes corresponds to more than one of the pixel electrodes, each of the pixel electrodes corresponds to a sub-common electrode which is a portion of the touch electrode, and each of the touch electrodes is electrically connected to at least one of the touch sensing lines;
   a thin film transistor disposed in one of the pixel structures, wherein the thin film transistor comprises a gate, a source, a drain and a semiconductor layer, the source is electrically connected to one of the data lines, and one of the pixel electrodes is electrically connected to the drain;
   a plurality of display pads and a plurality of touch pads disposed in the non-display area;
   a second substrate, wherein a liquid crystal layer is disposed between the first substrate and the second substrate;
   a first insulation layer disposed between the gate and the semiconductor layer;
   a second insulation layer disposed on the first insulation layer;
   a third insulation layer disposed on the second insulation layer;
   a fourth insulation layer disposed on the third insulation layer;
   a first metal layer disposed on the first substrate, wherein the first metal layer comprises the gate, the first insulation layer is disposed on the first metal layer, and the semiconductor layer is disposed on the first insulation layer;
   a second metal layer disposed on the semiconductor layer, the second metal layer comprises the source and the drain, the second insulation layer is disposed on the second metal layer, and the second insulation layer has a first contact hole to expose the drain; and
   a third metal layer disposed on the second insulation layer, wherein the touch sensing lines are formed by the third metal layer in the display area,
   wherein the sub-common electrodes are disposed on one of the third insulation layer and fourth insulation layer;
   a thickness of the third insulation layer is greater than or equal to a thickness of the second insulation layer;
   a thickness of the third insulation layer is 1.2 or more times of a thickness of the fourth insulation layer;
   the thickness of the third insulation layer is greater than or equal to 5000 Å;
   a sum of the thickness of the third insulation layer and the thickness of the fourth insulation layer is greater than or equal to 7000 Å;
   the third insulation layer is disposed on the third metal layer, the third insulation layer has a second contact hole to expose the touch sensing lines, and the third insulation layer has a third contact hole corresponding to the first contact hole;
   the sub-common electrodes are disposed on the third insulation layer, one of the sub-common electrodes is electrically connected to one of the touch sensing lines through the second contact hole;
   the fourth insulation layer is disposed on the sub-common electrodes, and the fourth insulation layer has a fourth contact hole corresponding to the third contact hole; and
   the pixel electrodes are disposed on the fourth insulation layer, one of the pixel electrodes is electrically connected to the drain through the fourth contact hole, the third contact hole and the first contact hole.

2. The in-cell touch display panel of claim 1, wherein each of the data lines is electrically connected to one of the display pads;
   each of the touch sensing lines is electrically connected to one of the touch pads;
   the non-display area comprises a signal line transferring area and a fan-out area, wherein the signal line transferring area is located between the display area and the fan-out area, and the touch pads and the display pads are disposed in the fan-out area; and
   one of the display pads is disposed between two of the touch pads, and one of the touch pads is disposed between two of the display pads.

3. The in-cell touch display panel of claim 1, wherein the number of the touch pads is less than the number of the display pads, the display pads and the touch pads are arranged as a plurality of rows, and one of the rows consists of a portion of the touch pads.

4. The in-cell touch display panel of claim 1, wherein the display pads are disposed between the touch pads and the display area.

5. The in-cell touch display panel of claim 1, wherein the touch pads are disposed between the display pads and the display area.

6. The in-cell touch display panel of claim 1, wherein the display pads and the touch pads are arranged as a plurality of rows, a first row of the rows consists of a portion of the display pads, and a second row of the rows comprises a portion of the display pads and a portion of the touch pads.

7. The in-cell touch display panel of claim 1, further comprising a driving circuit that is disposed in the non-display area and is electrically connected to the display pads and the touch pads,
   wherein in a display period, the driving circuit transmits pixel data to one of the pixel electrodes through one of the data lines and the thin film transistor; and
   in the touch sensing period, the driving circuit generates a touch sensing signal according to a voltage variation of the touch electrode.

8. The in-cell touch display panel of claim 1, wherein one of the touch sensing lines comprises a first portion and a second portion, the first portion is formed by the first metal layer, the second portion is formed by the third metal layer, and the in-cell touch display panel further comprises:
- a connection structure disposed in the signal line transferring area and being electrically connected to the first portion and the second portion, wherein the connection structure comprises:
- the first portion disposed on the first substrate;
- the first insulation layer disposed on the first metal layer and having a first contact hole to expose the first portion;
- a metal electrode formed by the second metal layer, and being electrically connected to the first portion through the first contact hole;
- the second insulation layer disposed on second metal layer, and having a second contact hole to expose the first portion;
- the second portion being electrically connected to the first portion through the second contact hole;
- the third insulation layer having a third contact hole to expose the second portion; and
- an electric connecting portion formed by the second transparent conductive layer and being electrically connected to the second portion through the third contact hole.

9. The in-cell touch display panel of claim 1, wherein one of the touch sensing lines comprises a first portion and a second portion, the first portion is formed by the second metal layer, the second portion is formed by the third metal layer, and the in-cell touch display panel further comprises:
- a connection structure disposed in the signal line transferring area and being electrically connected to the first portion and the second portion, wherein the connection structure comprises:
- the first insulation layer disposed on the first substrate;
- the first portion disposed on the first insulation layer;
- the second insulation layer disposed on the first portion and having a first contact hole to expose the first portion;
- the second portion disposed on the second insulation layer and being electrically connected to the first portion through the first contact hole;
- the fourth insulation layer having a second contact hole to expose the second portion; and
- the second transparent conductive layer being electrically connected to the second portion through the second contact hole.

10. The in-cell touch display panel of claim 1, wherein the data lines are parallel with the touch sensing lines in the display area, and are not overlapped with each other in the fan-out area.

11. The in-cell touch display panel of claim 1, wherein the data lines and the touch sensing lines are overlapped with each other in the display area along a normal vector of the in-cell touch display panel,
wherein the data lines and the touch sensing lines are formed by different metal layers in the display area.

12. The in-cell touch display panel of claim 1, wherein at least two of the touch sensing lines are electrically connected to each other and are electrically connected to one of the touch pads through a conducting line in the fan-out area.

13. An in-cell touch display panel having a display area and a non-display area, wherein the in-cell touch display panel comprises:
- a first substrate;
- a plurality of gate lines and a plurality of data lines that are intersected with each other on the first substrate;
- a plurality of touch sensing lines disposed on the first substrate, wherein the touch sensing lines are not spatially connected with the data lines in the display area;
- a plurality of pixel regions disposed in areas of the display area enclosed by the gate lines that are intersected with the data lines, wherein each of the pixel regions has a pixel structure, and each of the pixel structures comprises a pixel electrode formed by a first transparent conductive layer;
- a common electrode formed by a patterned second transparent conductive layer, wherein the common electrode comprises a plurality of touch electrodes in the display area, each of the touch electrodes corresponds to more than one of the pixel electrodes, each of the pixel electrodes corresponds to a sub-common electrode which is a portion of the touch electrode, and each of the touch electrodes is electrically connected to at least one of the touch sensing lines;
- a thin film transistor disposed in one of the pixel structures, wherein the thin film transistor comprises a gate, a source, a drain and a semiconductor layer, the source is electrically connected to one of the data lines, and one of the pixel electrodes is electrically connected to the drain;
- a plurality of display pads and a plurality of touch pads disposed in the non-display area;
- a second substrate, wherein a liquid crystal layer is disposed between the first substrate and the second substrate;
- a first insulation layer disposed between the gate and the semiconductor layer;
- a second insulation layer disposed on the first insulation layer;
- a third insulation layer disposed on the second insulation layer; and
- a fourth insulation layer disposed on the third insulation layer,
wherein the sub-common electrodes are disposed on one of the third insulation layer and fourth insulation layer;
- a thickness of the third insulation layer is greater than or equal to a thickness of the second insulation layer;
- a thickness of the third insulation layer is 1.2 or more times of a thickness of the fourth insulation layer;
- the thickness of the third insulation layer is greater than or equal to 5000 Å; and
- a sum of the thickness of the third insulation layer and the thickness of the fourth insulation layer is greater than or equal to 7000 Å; and
- one of the touch sensing lines comprises a first portion and a second portion, the first portion is formed by a first metal layer, the second portion is formed by a third metal layer, and the in-cell touch display panel further comprises a connection structure disposed in the signal line transferring area and being electrically connected to the first portion and the second portion, wherein the connection structure comprises:
- the first portion disposed on the first substrate;
- the first insulation layer having a first contact hole to expose the first portion;
- the second insulation layer having a second contact hole corresponding to the first contact hole;
- the second portion disposed on the second insulation layer;
- the fourth insulation layer having a third contact hole and a fourth contact hole, wherein the third contact hole corresponds to the second contact hole, and the fourth contact hole exposes the second portion; and the second transparent conductive layer being electrically connected to the second portion through the fourth contact hole, and being electrically connected to the first portion through the first contact hole, the second contact hole, and the third contact hole.

14. The in-cell touch display panel of claim 13, further comprising:

the first metal layer disposed on the first substrate, wherein the first metal layer comprises the gate, the first insulation layer is disposed on the first metal layer, and the semiconductor layer is disposed on the first insulation layer;

a second metal layer disposed on the semiconductor layer, wherein the second metal layer comprises the source and the drain, the second insulation layer is disposed on the second metal layer, and the second insulation layer has a first contact hole to expose the drain, wherein the third insulation layer is disposed on the second insulation layer, and the third insulation layer has a second contact hole corresponding to the first contact hole; and the pixel electrodes are disposed on the third insulation layer, and one of the pixel electrodes is electrically connected to the drain through the second contact hole and the first contact hole; and the third metal layer disposed on the third insulation layer, wherein the third metal layer comprises the touch sensing lines;

wherein the fourth insulation layer is disposed on the third metal layer, and the fourth insulation layer has a third contact hole to expose the touch sensing lines; and the sub-common electrodes are disposed on the fourth insulation layer, and one of the sub-common electrodes is electrically connected to one of the touch sensing lines through the third contact hole.

15. An in-cell touch display panel having a display area and a non-display area, wherein the in-cell touch display panel comprises:

a first substrate;

a plurality of gate lines and a plurality of data lines that are intersected with each other on the first substrate;

a plurality of touch sensing lines disposed on the first substrate, wherein the touch sensing lines are not spatially connected with the data lines in the display area;

a plurality of pixel regions disposed in areas of the display area enclosed by the gate lines that are intersected with the data lines, wherein each of the pixel regions has a pixel structure, and each of the pixel structures comprises a pixel electrode formed by a first transparent conductive layer;

a common electrode formed by a patterned second transparent conductive layer, wherein the common electrode comprises a plurality of touch electrodes in the display area, each of the touch electrodes corresponds to more than one of the pixel electrodes, each of the pixel electrodes corresponds to a sub-common electrode which is a portion of the touch electrode, and each of the touch electrodes is electrically connected to at least one of the touch sensing lines;

a thin film transistor disposed in one of the pixel structures, wherein the thin film transistor comprises a gate, a source, a drain and a semiconductor layer, the source is electrically connected to one of the data lines, and one of the pixel electrodes is electrically connected to the drain;

a plurality of display pads and a plurality of touch pads disposed in the non-display area;

a second substrate, wherein a liquid crystal layer is disposed between the first substrate and the second substrate;

a first insulation layer disposed between the gate and the semiconductor layer;

a second insulation layer disposed on the first insulation layer;

a third insulation layer disposed on the second insulation layer; and a fourth insulation layer disposed on the third insulation layer, wherein the sub-common electrodes are disposed on one of the third insulation layer and fourth insulation layer;

a thickness of the third insulation layer is greater than or equal to a thickness of the second insulation layer;

a thickness of the third insulation layer is 1.2 or more times of a thickness of the fourth insulation layer;

the thickness of the third insulation layer is greater than or equal to 5000 Å;

a sum of the thickness of the third insulation layer and the thickness of the fourth insulation layer is greater than or equal to 7000 Å; and one of the touch sensing lines comprises a first portion and a second portion, the first portion is formed by a second metal layer, the second portion is formed by a third metal layer, and the in-cell touch display panel further comprises a connection structure disposed in the signal line transferring area and being electrically connected to the first portion and the second portion, wherein the connection structure comprises:

the first insulation layer disposed on the first substrate;

the first portion disposed on the first insulation layer;

the second insulation layer disposed on the first portion and having a first contact hole to expose the first portion;

the second portion disposed on the second insulation layer;

the fourth insulation layer having a second contact hole and a third contact hole, wherein the second contact hole corresponds to the first contact hole, and the third contact hole exposes the second portion; and the second transparent conductive layer being electrically connected to the second portion through the third contact hole, and being electrically connected to the first portion through the first contact hole and the second contact hole.

16. The in-cell touch display panel of claim 15, further comprising:

a first metal layer disposed on the first substrate, wherein the first metal layer comprises the gate, the first insulation layer is disposed on the first metal layer, and the semiconductor layer is disposed on the first insulation layer;

the second metal layer disposed on the semiconductor layer, wherein the second metal layer comprises the source and the drain, the second insulation layer is disposed on the second metal layer, and the second insulation layer has a first contact hole to expose the drain, wherein the third insulation layer is disposed on the second insulation layer, and the third insulation layer has a second contact hole corresponding to the first contact hole; and the pixel electrodes are disposed on the third insulation layer, and one of the pixel electrodes is electrically connected to the drain through the second contact hole and the first contact hole; and the third metal layer disposed on the third insulation layer, wherein the third metal layer comprises the touch sensing lines;

wherein the fourth insulation layer is disposed on the third metal layer, and the fourth insulation layer has a third contact hole to expose the touch sensing lines; and the sub-common electrodes are disposed on the fourth insulation layer, and one of the sub-common electrodes is electrically connected to one of the touch sensing lines through the third contact hole.

17. An in-cell touch display panel having a display area and a non-display area, wherein the in-cell touch display panel comprises:
a first substrate;
a plurality of gate lines and a plurality of data lines that are intersected with each other on the first substrate;
a plurality of touch sensing lines disposed on the first substrate, wherein the touch sensing lines are not spatially connected with the data lines in the display area;
a plurality of pixel regions disposed in areas of the display area enclosed by the gate lines that are intersected with the data lines, wherein each of the pixel regions has a pixel structure, and each of the pixel structures comprises a pixel electrode forming by a first transparent conductive layer;
a common electrode formed by a patterned second transparent conductive layer, wherein the common electrode comprises a plurality of touch electrodes in the display area, each of the touch electrodes corresponds to more than one of the pixel electrodes, each of the pixel electrodes corresponds to a sub-common electrode which is a portion of the touch electrode, and each of the touch electrodes is electrically connected to at least one of the touch sensing lines;
a thin film transistor disposed in one of the pixel structures, wherein the thin film transistor comprises a gate, a source, a drain and a semiconductor layer, the source is electrically connected to one of the data lines, and one of the pixel electrodes is electrically connected to the drain;
a plurality of display pads and a plurality of touch pads disposed in the non-display area;
a second substrate, wherein a liquid crystal layer is disposed between the first substrate and the second substrate;
a first insulation layer disposed between the gate and the semiconductor layer;
a second insulation layer disposed on the first insulation layer;
a third insulation layer disposed on the second insulation layer; and
a fourth insulation layer disposed on the third insulation layer,
wherein the sub-common electrodes are disposed on one of the third insulation layer and fourth insulation layer;
a thickness of the third insulation layer is greater than or equal to a thickness of the second insulation layer;
a thickness of the third insulation layer is 1.2 or more times of a thickness of the fourth insulation layer;
the thickness of the third insulation layer is greater than or equal to 5000 Å;
a sum of the thickness of the third insulation layer and the thickness of the fourth insulation layer is greater than or equal to 7000 Å; and one of the touch sensing lines comprises a first portion and a second portion, the first portion and the second portion are formed by a third metal layer, and the in-cell touch display panel further comprises a connection structure disposed in the signal line transferring area and being electrically connected to the first portion and the second portion, wherein the connection structure comprises:
the first insulation layer disposed on the first substrate;
the second insulation layer disposed on the first insulation layer;
the first portion and the second portion disposed on the second insulation layer;
the fourth insulation layer disposed on the second insulation layer and having a first contact hole to expose the first portion and a second contact hole to expose the second portion; and
the second transparent conductive layer being electrically connected to the first portion through the first contact hole, and being electrically connected to the second portion through the second contact hole.

18. The in-cell touch display panel of claim 17, further comprising:
a first metal layer disposed on the first substrate, wherein the first metal layer comprises the gate, the first insulation layer is disposed on the first metal layer, and the semiconductor layer is disposed on the first insulation layer;
a second metal layer disposed on the semiconductor layer, wherein the second metal layer comprises the source and the drain, the second insulation layer is disposed on the second metal layer, and the second insulation layer has a first contact hole to expose the drain,
wherein the third insulation layer is disposed on the second insulation layer, and the third insulation layer has a second contact hole corresponding to the first contact hole; and
the pixel electrodes are disposed on the third insulation layer, and one of the pixel electrodes is electrically connected to the drain through the second contact hole and the first contact hole; and
the third metal layer disposed on the third insulation layer, wherein the third metal layer comprises the touch sensing lines;
wherein the fourth insulation layer is disposed on the third metal layer, and the fourth insulation layer has a third contact hole to expose the touch sensing lines; and
the sub-common electrodes are disposed on the fourth insulation layer, and one of the sub-common electrodes is electrically connected to one of the touch sensing lines through the third contact hole.

19. An in-cell touch display panel having a display area and a non-display area, wherein the in-cell touch display panel comprises:
a first substrate;
a plurality of gate lines and a plurality of data lines that are intersected with each other on the first substrate;
a plurality of touch sensing lines disposed on the first substrate, wherein the touch sensing lines are not spatially connected with the data lines in the display area;
a plurality of pixel regions disposed in areas of the display area enclosed by the gate lines that are intersected with the data lines, wherein each of the pixel regions has a pixel structure, and each of the pixel structures comprises a pixel electrode formed by a first transparent conductive layer;

a common electrode formed by a patterned second transparent conductive layer, wherein the common electrode comprises a plurality of touch electrodes in the display area, each of the touch electrodes corresponds to more than one of the pixel electrodes, each of the pixel electrodes corresponds to a sub-common electrode which is a portion of the touch electrode, and each of the touch electrodes is electrically connected to at least one of the touch sensing lines;

a thin film transistor disposed in one of the pixel structures, wherein the thin film transistor comprises a gate, a source, a drain and a semiconductor layer, the source is electrically connected to one of the data lines, and one of the pixel electrodes is electrically connected to the drain;

a plurality of display pads and a plurality of touch pads disposed in the non-display area;

a second substrate, wherein a liquid crystal layer is disposed between the first substrate and the second substrate;

a first insulation layer disposed between the gate and the semiconductor layer;

a second insulation layer disposed on the first insulation layer;

a third insulation layer disposed on the second insulation layer; and a fourth insulation layer disposed on the third insulation layer, wherein the sub-common electrodes are disposed on one of the third insulation layer and fourth insulation layer;

a thickness of the third insulation layer is greater than or equal to a thickness of the second insulation layer;

a thickness of the third insulation layer is 1.2 or more times of a thickness of the fourth insulation layer;

the thickness of the third insulation layer is greater than or equal to 5000 Å;

a sum of the thickness of the third insulation layer and the thickness of the fourth insulation layer is greater than or equal to 7000 Å; and one of the touch sensing lines comprises a first portion and a second portion, the first portion and the second portion are formed by a second metal layer, and the in-cell touch display panel further comprises a connection structure disposed in the signal line transferring area and being electrically connected to the first portion and the second portion, wherein the connection structure comprises:

the first insulation layer disposed on the first substrate;

the first portion and the second portion disposed on the first insulation layer;

the second insulation layer disposed on the first insulation layer; and having a first contact hole to expose the first portion and a second contact hole to expose the second portion; and the first transparent conductive layer being electrically connected to the first portion through the first contact hole, and being electrically connected to the second portion through the second contact hole.

20. The in-cell touch display panel of claim 19, further comprising:

a first metal layer disposed on the first substrate, wherein the first metal layer comprises the gate, the first insulation layer is disposed on the first metal layer, and the semiconductor layer is disposed on the first insulation layer;

the second metal layer disposed on the semiconductor layer, wherein the second metal layer comprises the source and the drain, the second insulation layer is disposed on the second metal layer, and the second insulation layer has a first contact hole to expose the drain, wherein the third insulation layer is disposed on the second insulation layer, and the third insulation layer has a second contact hole corresponding to the first contact hole; and the pixel electrodes are disposed on the third insulation layer, and one of the pixel electrodes is electrically connected to the drain through the second contact hole and the first contact hole; and a third metal layer disposed on the third insulation layer, wherein the third metal layer comprises the touch sensing lines;

wherein the fourth insulation layer is disposed on the third metal layer, and the fourth insulation layer has a third contact hole to expose the touch sensing lines; and the sub-common electrodes are disposed on the fourth insulation layer, and one of the sub-common electrodes is electrically connected to one of the touch sensing lines through the third contact hole.

21. An in-cell touch display panel having a display area and a non-display area, wherein the in-cell touch display panel comprises:

a first substrate;

a plurality of gate lines and a plurality of data lines that are intersected with each other on the first substrate;

a plurality of touch sensing lines disposed on the first substrate, wherein the touch sensing lines are not spatially connected with the data lines in the display area;

a plurality of pixel regions disposed in areas of the display area enclosed by the gate lines that are intersected with the data lines, wherein each of the pixel regions has a pixel structure, and each of the pixel structures comprises a pixel electrode formed by a first transparent conductive layer;

a common electrode formed by a patterned second transparent conductive layer, wherein the common electrode comprises a plurality of touch electrodes in the display area, each of the touch electrodes corresponds to more than one of the pixel electrodes, each of the pixel electrodes corresponds to a sub-common electrode which is a portion of the touch electrode, and each of the touch electrodes is electrically connected to at least one of the touch sensing lines;

a thin film transistor disposed in one of the pixel structures, wherein the thin film transistor comprises a gate, a source, a drain and a semiconductor layer, the source is electrically connected to one of the data lines, and one of the pixel electrodes is electrically connected to the drain;

a plurality of display pads and a plurality of touch pads disposed in the non-display area;

a second substrate, wherein a liquid crystal layer is disposed between the first substrate and the second substrate;

a first insulation layer disposed between the gate and the semiconductor layer;

a second insulation layer disposed on the first insulation layer;

a third insulation layer disposed on the second insulation layer; and a fourth insulation layer disposed on the third insulation layer, wherein the sub-common electrodes are disposed on one of the third insulation layer and fourth insulation layer;
a thickness of the third insulation layer is greater than or equal to a thickness of the second insulation layer;
a thickness of the third insulation layer is 1.2 or more times of a thickness of the fourth insulation layer;
the thickness of the third insulation layer is greater than or equal to 5000 Å;
a sum of the thickness of the third insulation layer and the thickness of the fourth insulation layer is greater than or equal to 7000 Å; and
one of the touch sensing lines comprises a first portion and a second portion, the first portion iso formed by a first metal layer, the second portion is formed by a second metal layer, and the in-cell touch display panel further comprises a connection structure disposed in the signal line transferring area and being electrically connected to the first portion and the second portion, wherein the connection structure comprises:
the first insulation layer disposed on the first substrate;
the first portion disposed on the first insulation layer;
the second insulation layer disposed on the first portion, and having a first contact hole to expose the first portion;
the second portion disposed on the second insulation layer;
the third insulation layer having a second contact hole and a third contact hole, wherein the second contact hole corresponds to the first contact hole, and the third contact hole exposes the second portion; and
the first transparent conductive layer being electrically connected to the second portion through the third contact hole, and being electrically connected to the first portion through the first contact hole and the second contact hole.

22. The in-cell touch display panel of claim 21, further comprising:
the first metal layer disposed on the first substrate, wherein the first metal layer comprises the gate, the first insulation layer is disposed on the first metal layer, and the semiconductor layer is disposed on the first insulation layer;
the second metal layer disposed on the semiconductor layer, wherein the second metal layer comprises the source and the drain, the second insulation layer is disposed on the second metal layer, and the second insulation layer has a first contact hole to expose the drain,
wherein the third insulation layer is disposed on the second insulation layer, and the third insulation layer has a second contact hole corresponding to the first contact hole; and
the pixel electrodes are disposed on the third insulation layer, and one of the pixel electrodes is electrically connected to the drain through the second contact hole and the first contact hole; and
a third metal layer disposed on the third insulation layer, wherein the third metal layer comprises the touch sensing lines;
wherein the fourth insulation layer is disposed on the third metal layer, and the fourth insulation layer has a third contact hole to expose the touch sensing lines; and
the sub-common electrodes are disposed on the fourth insulation layer, and one of the sub-common electrodes is electrically connected to one of the touch sensing lines through the third contact hole.

\* \* \* \* \*